(12) United States Patent
Reyes et al.

(10) Patent No.: US 8,192,709 B2
(45) Date of Patent: Jun. 5, 2012

(54) SEPARATION OF METHANE FROM HIGHER CARBON NUMBER HYDROCARBONS UTILIZING ZEOLITIC IMIDAZOLATE FRAMEWORK MATERIALS

(75) Inventors: Sebastian C. Reyes, Branchburg, NJ (US); Jose G. Santiesteban, legal representative, Hellertown, PA (US); Zheng Ni, Clinton, NJ (US); Charanjit S. Paur, South Bround Brook, NJ (US); Pavel Kortunov, Flemington, NJ (US); John Zengel, Clinton, NJ (US); Harry W. Deckman, Clinton, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 254 days.

(21) Appl. No.: 12/322,364

(22) Filed: Jan. 30, 2009

(65) Prior Publication Data
US 2009/0216059 A1    Aug. 27, 2009

Related U.S. Application Data

(60) Provisional application No. 61/066,550, filed on Feb. 21, 2008.

(51) Int. Cl.
*B01D 53/02*    (2006.01)
*C01B 39/00*    (2006.01)
*B01J 20/22*    (2006.01)

(52) U.S. Cl. ............... 423/245.1; 423/210; 423/700; 423/701; 423/702; 423/704; 423/705; 423/706; 423/708; 502/400; 502/401; 95/43; 95/45; 95/50; 95/90; 95/141; 95/143; 95/144; 95/145; 95/273; 95/274; 95/902

(58) Field of Classification Search ............... 423/210, 423/245.1, 700, 701, 702, 704, 705, 706, 423/708; 502/400, 401; 95/43, 45, 50, 90, 95/141, 143, 144, 145, 273, 274, 902
See application file for complete search history.

(56) References Cited

U.S. PATENT DOCUMENTS 3,885,927 A    5/1975    Sherman et al.
(Continued)

FOREIGN PATENT DOCUMENTS

DE    2926524    6/1979
(Continued)

OTHER PUBLICATIONS

Hideki Hayashi, Adrien P. Cote, Hiroyasu Furukawa, Michael O'Keeffe, Omar M. Yaghi, "Zeolite A imidazolate frameworks,"Nature Materials, vol. 6, Jul. 2007, pp. 501-506.
(Continued)

*Primary Examiner* — Stuart Hendrickson
*Assistant Examiner* — Daniel Berns
(74) *Attorney, Agent, or Firm* — Bruce M. Bordelon; David M. Weisberg

(57) ABSTRACT

The present invention relates to the selective separation of methane ("$CH_4$") from higher carbon number hydrocarbons ("HHC"s) in streams containing both methane and higher carbon number hydrocarbons (e.g. ethylene, ethane, propylene, propane, etc.) utilizing a zeolitic imidazolate framework ("ZIF") material. Preferably, the stream to be separated is fed to the present process in a substantially gaseous phase. In preferred embodiments, the current invention is utilized in a process to separate methane from higher carbon number hydrocarbons in natural gas streams.

22 Claims, 31 Drawing Sheets

ZIF-7 Adsorption Loading for Various Hydrocarbons
@ 301 K and 106.6 kPa

U.S. PATENT DOCUMENTS

| | | | |
|---|---|---|---|
| 4,775,396 | A | 10/1988 | Rastelli et al. |
| 4,857,078 | A | 8/1989 | Watler |
| 4,869,883 | A | 9/1989 | Thorogood et al. |
| 5,171,333 | A | 12/1992 | Maurer |
| 5,642,630 | A | 7/1997 | Abdelmalek et al. |
| 5,726,118 | A | 3/1998 | Ivey et al. |
| 5,753,011 | A | 5/1998 | Sircar et al. |
| 6,011,192 | A | 1/2000 | Baker et al. |
| 6,531,569 | B1 | 3/2003 | Tachiki et al. |
| 6,617,467 | B1 | 9/2003 | Muller et al. |
| 6,624,318 | B1 | 9/2003 | Muller et al. |
| 6,893,564 | B2 | 5/2005 | Mueller et al. |
| 6,929,679 | B2 | 8/2005 | Muller et al. |
| 6,930,193 | B2 | 8/2005 | Yaghi et al. |
| 7,056,482 | B2 | 6/2006 | Hakka et al. |
| 7,078,235 | B2 | 7/2006 | Spencer et al. |
| 7,196,210 | B2 | 3/2007 | Yaghi et al. |
| 7,202,385 | B2 | 4/2007 | Mueller et al. |
| 2002/0104435 | A1 | 8/2002 | Baker et al. |
| 2003/0004364 | A1 | 1/2003 | Yaghi et al. |
| 2003/0078311 | A1 | 4/2003 | Muller et al. |
| 2003/0148165 | A1 | 8/2003 | Muller et al. |
| 2003/0222023 | A1 | 12/2003 | Mueller et al. |
| 2004/0225134 | A1 | 11/2004 | Yaghi et al. |
| 2004/0249189 | A1 | 12/2004 | Mueller et al. |
| 2004/0265670 | A1 | 12/2004 | Muller et al. |
| 2005/0004404 | A1 | 1/2005 | Muller et al. |
| 2005/0124819 | A1 | 6/2005 | Yaghi et al. |
| 2005/0154222 | A1 | 7/2005 | Muller et al. |
| 2005/0192175 | A1 | 9/2005 | Yaghi et al. |
| 2006/0079725 | A1 | 4/2006 | Li et al. |
| 2006/0135824 | A1 | 6/2006 | Mueller et al. |
| 2006/0154807 | A1 | 7/2006 | Yaghi et al. |
| 2006/0185388 | A1 | 8/2006 | Muller et al. |
| 2006/0252641 | A1 | 11/2006 | Yaghi et al. |
| 2007/0068389 | A1 | 3/2007 | Yaghi |
| 2007/0202038 | A1 | 8/2007 | Yaghi et al. |
| 2008/0184883 | A1* | 8/2008 | Zhou et al. ............ 95/127 |

FOREIGN PATENT DOCUMENTS

| | | | |
|---|---|---|---|
| EP | 0 700 708 | A1 | 3/1996 |
| EP | 1 148 025 | A1 | 10/2001 |
| EP | 0 790 263 131 | B1 | 2/2002 |
| EP | 1 674 555 | A1 | 12/2005 |
| EP | 1674555 | * | 6/2006 |
| EP | 1 383 775 131 | B1 | 8/2006 |
| WO | WO 02/088148 | A1 | 11/2002 |
| WO | WO 03/035717 | A1 | 5/2003 |
| WO | WO 03/064030 | A1 | 8/2003 |
| WO | WO 03/101975 | A1 | 12/2003 |
| WO | WO 03/102000 | A1 | 12/2003 |
| WO | WO 2004/037895 | A1 | 5/2004 |
| WO | WO 2004/101575 | A2 | 11/2004 |
| WO | WO 2005/003069 | A2 | 1/2005 |
| WO | WO 2005/003622 | A1 | 1/2005 |
| WO | WO 2005/068474 | A1 | 7/2005 |
| WO | WO 2006/028479 | A1 | 3/2006 |
| WO | WO 2006/047423 | A2 | 5/2006 |
| WO | WO 2006/050898 | A1 | 5/2006 |
| WO | WO 2006/089908 | A1 | 8/2006 |
| WO | WO 2006/110740 | A2 | 10/2006 |
| WO | WO 2007/038508 | A2 | 4/2007 |
| WO | WO 2007/101241 | A2 | 9/2007 |

OTHER PUBLICATIONS

Rahul Banerjee, Anh Phan, Bo Wang, Carolyn Knobler, Hiroyasu Furukawa, Michael O'Keefe, Omar M. Yaghi, "High-Throughput Synthesis of Zeolitic Imidazolate Frameworks and Application of CO2 Capture," Science, vol. 319, Feb. 15, 2008, pp. 939-943.

Kyo Sung Park et al.; "Exceptional Chemical and thermal stability of zeolitic imidazolate frameworks," PNAS, Jul. 5, 2006, vol. 103, No. 27, pp. 10186-10191.

Yun-Qi Tian et al.; "The Silica-Like Extended Polymorphism of Cobalt (II) Imidazolate Three-Dimensional Frameworks: X-ray Single Crystal Structures and Magnetic Properties," Chem. Eur. J. 2003, 9, pp. 5673-5685.

Yun-Qi Tian et al.; "[$Co_5(im)_{10}$•2MB]∞: A Metal-Organic Open-Framework with Zeolite-Like Topology," Angew. Chem. Int. Ed. 2002, 41, No. 8, pp. 1384-1386.

Xiao-Chun Huang et al., "Ligand-Directed Strategy for Zeolite-Type Metal-Organic Frameworks: Zinc(II) Imidazolates with Unusual Zeolitic Topologies," Angew. Chem. Int. Ed. 2006, 45, pp. 1557-1559.

Ziaochun Huang et al.; "[$Zn(bim)_x$] • $(H_2O)_{1.67}$: A metal-organic open-framework with sodalite topology"; Chinese Science Bulletin, vol. 48, No. 15, Aug. 2003, pp. 1531-1534.

Yun-Qi Tian et al.; "Design and Generation of Extended Zeolitic Metal-Organic Frameworks (ZMOFs): Syntheis and Crystal Structures of Zinc(ii) Imidazolate Polymers with Zeolitic Topologies"; Chem. Eur. J., 2007, 13, pp. 4146-4154.

Yun-Qi Tian et al.; "[$Co^{II}Cu^{I}_2(Im)_4$]∞: A Layered Bimetallic Imidazolate Polymer, the First Hydridized Cobalt (ii) Imidazolate," Z.Anorg. Allg. Chem., 2004, 630, pp. 1371-1373.

Yun-Qi Tian et al., "Determination of the Solvothermal Synthesis Mechanism of Metal Imidazolates by X-ray Single-Crystal Studies of a Photoluminescent Cadmium(II) Imidazolate and Its Imtermediate Involving Piperazine," Eur. J. Inorg. Chem., 2004, pp. 1039-1044.

Zhong-Lin Lu et al.; "Synthesis and crystal structure of an imidazolate-bridged dicopper tris(2-aminoethyl)amine complex"; Transition Met. Chem., 22, 1997, pp. 549-552.

Yun-Qi Tian et al.; "Two Polymorphs of Cobalt(II) Imidazolate Polymers Synthesized Solvothermally by Using One Organic Template N,N-Dimethylacetamide"; Inorg. Chem. 2004, 43, pp. 4631-4635.

Xiao-Chun Huang, Jie-Peng Zhang, Xiao-Ming Chen; "One-Dimensional Supramolecular Isomerism of Copper(I) and Silver(I) Imidazolates Based on theLigand Orientations," Crystal Growth & Design, 2006, vol. 6, No. 5, pp. 1194-1198.

Yunling Liu, Victor CH. Kravtsov, Randy Larsen, Mohamed Eddaoudi; "Molecular building blocks approach to the assembly of zeolite-like metal-organic frameworks (ZMOFs) with extra-large cavities"; Chem. Commun., 2006, pp. 1488-1490.

Philip L. Llewellyn et al.; "How Hydration Drastically Improves Adsorption Selectivity for $CO_2$ over CH4 in the Flexible Chromium Terephthlate MIL-53"; Angew. Chem. Int. Ed., 2006, 45, pp. 7751-7754.

Atsushi Kondo et al.; "Novel Expansion/Shrinkage Modulation of 2D Layered MOF Triggered by Clathrate Formation with $CO_2$ Molecules"; Nano Letters, 2006, vol. 6, No. 11, pp. 2581-2584.

Katharine Sanderson, "Space Invaders," news feature in Nature, vol. 448, Aug. 16, 2007, pp. 746-748.

* cited by examiner

Powder X-ray Diffraction Pattern of ZIF-7

Thermogravimetric Analyses of ZIF-7

Thermogravimetric Analyses of ZIF-9

Powder X-ray Diffraction Pattern of ZIF-1

Powder X-ray Diffraction Pattern of ZIF-11

ZIF-7 Isotherms for normal-Butane @ 301 K, @ 323 K and @ 348 K

ZIF-9 Isotherm for $C_2H_4$ @ 301 K

Scanning Electron Microscopy Image of ZIF-1 (acetonitrile-exchanged)

Scanning Electron Microscopy Image of ZIF-1 (toluene-exchanged)

Scanning Electron Microscopy Image of ZIF-11

Scanning Electron Microscopy Image of ZIF-8

SEPARATION OF METHANE FROM HIGHER CARBON NUMBER HYDROCARBONS UTILIZING ZEOLITIC IMIDAZOLATE FRAMEWORK MATERIALS

CROSS-REFERENCE TO RELATED APPLICATIONS

This application claims the benefit of U.S. Provisional Application No. 61/066,550, filed Feb. 21, 2008.

FIELD OF THE INVENTION

The present invention relates to the selective separation of methane ("$CH_4$") from higher carbon number hydrocarbons ("HHC"s) in streams containing both methane and higher carbon number hydrocarbons (e.g. ethylene, ethane, propylene, propane, etc.) utilizing a zeolitic imidazolate framework ("ZIF") material. Preferably, the stream to be separated is fed to the present process in a substantially gaseous phase. In preferred embodiments, the current invention is utilized in a process to separate methane from higher carbon number hydrocarbons present in natural gas streams.

BACKGROUND OF THE INVENTION

Gas separation is an important process utilized in various industries, particularly in the production of fuels, chemicals, petrochemicals and specialty products. A gas separation can be accomplished by a variety of methods that, assisted by heat, solids, or other means, generally exploits the differences in physical and/or chemical properties of the components to be separated. For example, gas separation can be achieved by partial liquefaction or by utilizing a solid adsorbent material that preferentially retains or adsorbs a more readily adsorbed component relative to a less readily adsorbed component of the gas mixture, or by several other gas separation techniques known in the industry. One such commercially practiced gas separation process is pressure swing adsorption ("PSA"). PSA processes, when operated under certain conditions, allow a selective component or components in a gas mixture to be preferentially adsorbed within the pore structure of porous adsorbent materials relative to a second component or components in the gas mixture. The total amount adsorbed of each component in the material (i.e., the adsorption capacity) and the selectivity of the adsorption for a specific component over another component may often be improved by operating the process under specific pressure and temperature conditions since both pressure and temperature influence the adsorption loading of the components to a different extent. The efficiency of the PSA process may be further improved by the implementation of processing steps, such as the use of purge stream(s) that have optimally chosen composition, pressures and temperatures. However, relatively few adsorbent materials have separation selectivities, adsorption capacities and other beneficial properties (such as chemical and physical inertness and durability) so as to be able to function as commercially viable and cost-efficient adsorbents in a PSA process.

Some adsorbent materials are able to adsorb a greater amount of one component than another component under certain conditions. Certain components may not be selectively adsorbed or may not be adsorbed to an acceptable level that would lead to an economically viable process. However, if sizable differences in adsorption properties exist for selective components in an adsorbent material, PSA processes can be used to effectively separate certain component gases from a mixture. For example, if a gas mixture such as air is passed at some pressure and temperature through a vessel containing an adsorbent material that selectively adsorbs more oxygen than nitrogen, at least a portion of the oxygen contained in the feedstream will stay in the adsorbent and the gas coming out of the vessel will be enriched in nitrogen. When the bed reaches a selected fraction of its total capacity to adsorb oxygen, it can be regenerated by various pressure swing techniques, thereby releasing the adsorbed oxygen (and any other associated gas components), which can then be captured and isolated as a separate product stream. The adsorbent material which has now been "desorbed" of the oxygen can then be reutilized and the various steps of the PSA process cycle are repeated so as to allow a continuous operation.

However, finding suitable materials that specifically discriminate between difficult to separate gases in both an efficient and effective manner (that is that they have both good separation selectivity and a high adsorption capacity) are not easily found. Additionally, many adsorbent materials known in the art do not hold up well to the additional components in the streams or are unable to sustain the severe pressure and/or temperature conditions, including cyclic conditions, required by the processes. Therefore, commercially suitable, and more importantly, commercially valuable adsorbent materials are not very readily available. Researchers in the industry continually look for improved adsorbent materials, process configurations and operating conditions to make these separation processes economically viable.

An early teaching of a PSA process having a multi-bed system is found in U.S. Pat. No. 3,430,418 wherein a system having at least four beds is described. This '418 patent describes a cyclic PSA processing sequence that includes in each bed: (1) higher pressure adsorption with release of product effluent from the product end of the bed; (2) co-current depressurization to intermediate pressure with release of void space gas from the product end thereof; (3) countercurrent depressurization to a lower pressure; (4) purge; and (5) repressurization. The void space gas released during the co-current depressurization step is commonly employed for pressure equalization purposes and to provide purge gas to a bed at its lower desorption pressure. Another conventional PSA processes using three sorbent beds is disclosed in U.S. Pat. No. 3,738,087.

Another industrially important gas separation process is temperature swing adsorption ("TSA"). TSA processes, when operated under certain pressure and temperature conditions, allow some components to be selectively adsorbed over others within the pore structure of an adsorbent material. In this process, a stream containing components to be separated flows through an adsorbent material wherein one or more of the components are selectively adsorbed over another component or components. An effluent stream, reduced in concentration of the selectively adsorbed component(s) is obtained during this adsorption "stage" or "step" of the TSA process. In this process, after the adsorbent material has adsorbed a certain amount of the desired component(s), the temperature of the adsorbent is increased, and the selectively adsorbed component(s) is released, or desorbed from the adsorbent materials and can be collected separate from the effluent stream in this step of the overall TSA process cycle. By cyclically swinging the temperature of adsorbent beds, TSA processes can be used to separate components in a mixture when used with an adsorbent that selectively adsorbs one or more of the stream components in the feed mixture relative to one or more different stream components comprising the feed mixture.

PSA and TSA processes do not need to be mutually exclusive. A combined PSA/TSA process may be utilized, for example, by increasing the temperature of the adsorbent materials during the lower pressure purge step of a conventional PSA process to improve the desorption of the selectively adsorbed component(s) in the process. The bed temperature can then be reduced (or allowed to be reduced) during the adsorption portion of the PSA cycle to improve the adsorption characteristics and/or adsorption capacity of the material.

Besides using pressure and temperature to regenerate the adsorption bed, the adsorbent can be regenerated with a purge that is flowed through the adsorbent bed in a manner that displaces adsorbed molecules from the adsorbent. Processes that are conducted with this type of adsorbent regeneration technique are often called partial pressure purge displacement processes ("PPSA"). Processes such as PSA, TSA, purge displacement, and combination thereof are referred to herein as swing adsorption processes. These swing adsorption processes can be conducted with rapid cycles (i.e., cycles of short duration) in which case they are referred to as rapid cycle thermal swing adsorption ("RCTSA"), rapid cycle pressure swing adsorption ("RCPSA"), and rapid cycle partial pressure swing or displacement purge adsorption ("RCPPSA") technologies.

Additionally, membrane separation processes can be used for the separation of gas components in a mixture. In a membrane separation process, one or more components of the mixed stream contact one side of a membrane material and a portion of the mixed stream permeates through the membrane and is retrieved from the other side of the membrane material as a "permeate" stream. In this process, the permeate stream has a higher concentration (in mole %, weight %, or volume % as defined by the process) of a select component than the mixed stream that initially contacts the membrane. A "retentate" stream is also obtained from the first side of the membrane which has a lower concentration (in mole %, weight %, or volume % as defined by the process) of a select component than the mixed stream that initially contacts the membrane. In this manner, a separation of components is made resulting in a higher value for the two separated streams (i.e., the retentate and the permeate streams) than the original mixed stream that is fed to the membrane separations process. The physical conditions on the permeate side of the membrane (for example pressure, temperature, and purge conditions) are chosen so that there is a gradient of chemical potential across the membrane that is favorable to drive the select component from the feed side to the permeate side of the membrane.

There is a need in the art for improved swing adsorption and/or membrane processes utilizing adsorbent materials for the selective separation of hydrocarbon components. In particular, there is a need in the art for improved swing adsorption and/or membrane processes utilizing adsorbent materials for the selective separation and removal of methane from hydrocarbon streams containing methane (containing one carbon atom) and higher carbon number hydrocarbons (or "heavy hydrocarbons", also designated herein as "HHCs").

United States Patent Publication No. US2007/0202038A1 discloses a family of materials which shall be referred to herein as zeolitic imidazolate frameworks (or "ZIF"s) materials. This publication describes in detail the synthesis and structural and pore volume characterization of various ZIF materials. It includes the low temperature physisorption characterization ($N_2$ and $H_2$ at 77K and Ar at 87K) of selected ZIF structures but it does not disclose adsorption properties of these materials at pressure and temperature conditions that would be relevant to separation processes of gases and hydrocarbons of interest in industrial applications.

SUMMARY OF THE INVENTION

The present invention is a separation process utilizing ZIF-containing materials to effectively separate methane ("$CH_4$"), from higher carbon number hydrocarbons ("HHCs") in process feedstreams comprised of both components. As utilized herein, the term "methane" is defined as a methane molecule of composition $CH_4$ which compound contains only one carbon atom. As utilized herein, the terms "higher carbon number hydrocarbons", "heavy hydrocarbons", "HHCs", and "$C_{2+}$ hydrocarbons" are considered as equivalents and are defined herein as any hydrocarbon compound containing two or more carbon atoms and at least four hydrogen atoms.

In accordance with one embodiment of the present invention there is provided a process for separating $CH_4$ from a process feedstream, comprising:
  a) contacting an adsorbent material comprised of a zeolitic imidazolate framework material with a process feedstream comprising $CH_4$ and at least one $C_{2+}$ hydrocarbon compound at a first pressure and first temperature;
  b) adsorbing at least a portion of the $C_{2+}$ hydrocarbon compound in the adsorbent material;
  c) producing a $CH_4$-rich product stream, wherein the $CH_4$-rich product stream has a higher concentration of $CH_4$ by mol % than the process feedstream; and
  d) producing a $CH_4$-lean product stream at a second pressure and second temperature, wherein the $CH_4$-lean product stream has a lower concentration of $CH_4$ by mol % than the process feedstream;
  wherein the zeolitic imidazolate framework material has a framework structure wherein each vertex of the framework structure is comprised of a single metal ion and each pair of connected adjacent vertices of the framework structure is linked by nitrogen atoms of an imidazolate anion or its derivative, and wherein the zeolitic imidazolate framework material has an adsorptive loading ratio for the $C_{2+}$ hydrocarbon compound over $CH_4$ of at least 5.

In a more preferred embodiment of the present invention the zeolitic imidazolate framework material is selected from ZIF-7, ZIF-9, and ZIF-1.

In another preferred embodiment, the $C_{2+}$ hydrocarbon compound is selected from $C_2H_4$ (ethylene), $C_2H_6$ (ethane), $C_3H_6$ (propylene), $C_3H_8$ (propane), $C_4H_8$ (1-butene), and $C_4H_{10}$ (n-butane).

In another embodiment of the present invention process is a swing adsorption process wherein the difference between the maximum and minimum $C_{2+}$ hydrocarbon compound partial pressures achieved in the adsorbent bed during a cycle is less than 43.5 psia (300 kPaa).

In accordance with one embodiment of the present invention there is provided a process for separating $CH_4$ from a process feedstream, comprising:
  a) contacting a first side of a membrane comprised of a zeolitic imidazolate framework material with a process feedstream comprising $CH_4$ and at least one $C_{2+}$ hydrocarbon compound at a first pressure and first temperature;
  b) retrieving a first permeate stream from a second side of the membrane at a second pressure and second temperature, wherein the first permeate stream consists of components that selectively permeate through the membrane and the first permeate stream has a lower concentration of $CH_4$ by mol % than the process feedstream; and c) retrieving a first retentate stream;

wherein the zeolitic imidazolate framework material has a framework structure wherein each vertex of the framework structure is comprised of a single metal ion and each pair of connected adjacent vertices of the framework structure is linked by nitrogen atoms of an imidazolate anion or its derivative, and wherein the zeolitic imidazolate framework material has an adsorptive loading ratio for the $C_{2+}$ hydrocarbon compound over $CH_4$ of at least 5.

DETAILED DESCRIPTION OF THE INVENTION

Figure 1:
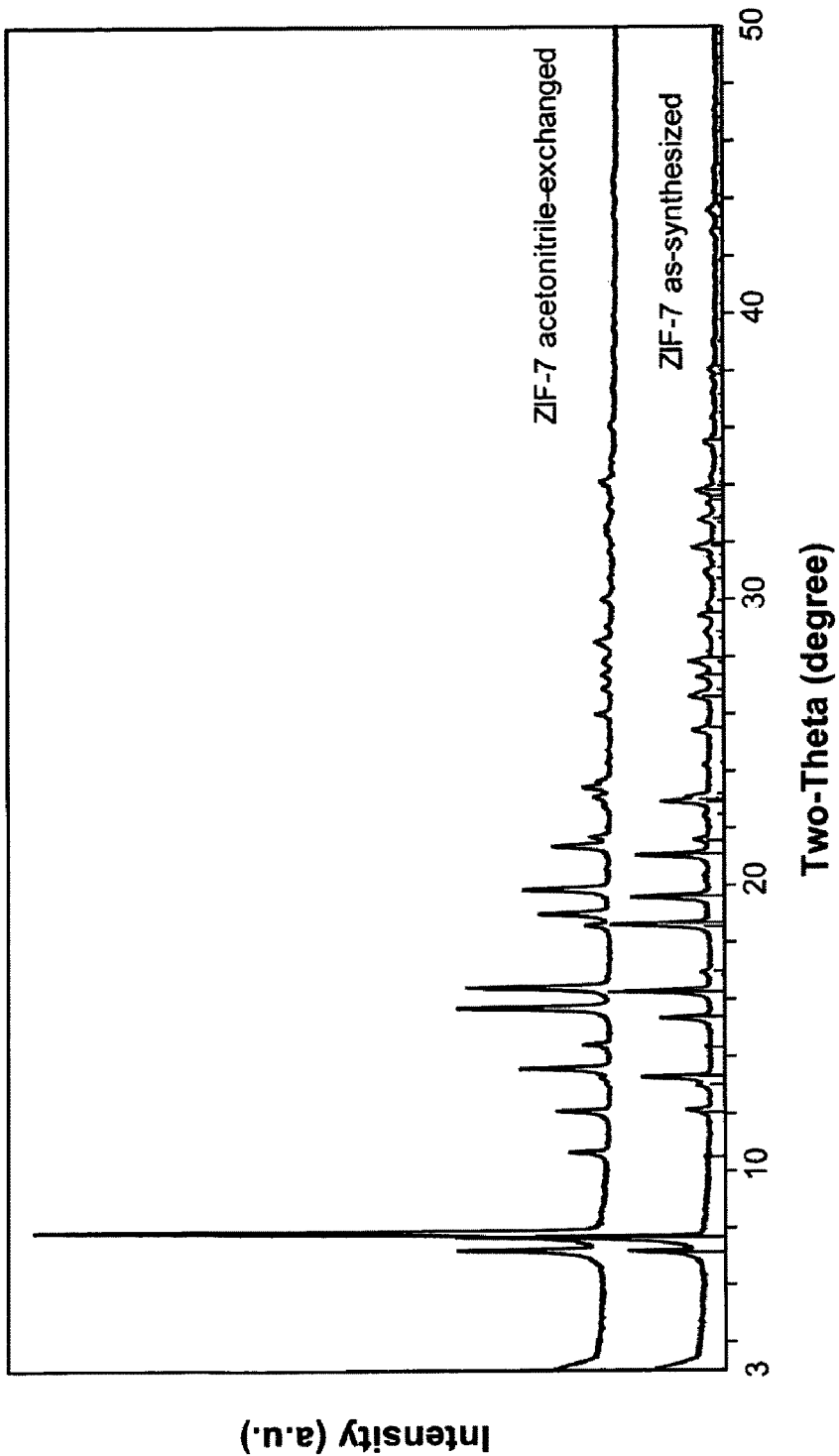
FIG. 1 is the experimental powder X-ray diffraction ("PXRD") patterns of the as-synthesized and acetonitrile-exchanged ZIF-7 samples of Example 1 herein. The calculated PXRD pattern (shown as the vertical stick patterns in the figure) for ZIF-7 based on the single crystal structure of ZIF-7 reported in the "Park Reference" as referenced herein is also shown in the figure.

The present invention is directed to processes for the separation of methane ("$CH_4$") from higher carbon number hydrocarbons ("HHCs") in process feedstreams comprised of both components with a process utilizing adsorbents comprised of zeolitic imidazolate framework ("ZIF") materials. As utilized herein, the term "methane" is defined as a methane molecule of composition $CH_4$ which compound contains only one carbon atom. As utilized herein, the terms "higher carbon number hydrocarbons", "heavy hydrocarbons", "HHCs", "$C_{2+}$ hydrocarbons", and "$C_{2+}$ components" are considered as equivalents and are defined herein as any hydrocarbon compound containing two or more carbon atoms and at least four hydrogen atoms.

Preferably the zeolitic imidazolate frameworks are utilized in a swing adsorption process. The general term "swing adsorption process" as used herein shall be taken to include Pressure Swing Adsorption ("PSA") processes, Temperature Swing Adsorption ("TSA") processes, Pressure Purge Displacement Processes ("PPSA"), Rapid Cycle Pressure Swing Adsorption ("RCPSA") processes, Rapid Cycle Temperature Swing Adsorption ("RCTSA") processes, Rapid Cycle Pressure Purge Displacement Processes ("RCPPSA") as well as combinations of these swing adsorption processes. In a preferred embodiment, the stream to be separated is fed to the process in a substantially gaseous state.

In other preferred embodiments of the present invention, zeolitic imidazolate framework ("ZIF") adsorbent materials are incorporated into a membrane material for the selective separation of higher carbon number hydrocarbons ("HHCs") from methane ("$CH_4$") in streams containing both components. The ZIF materials will preferably be utilized in a matrixed membrane material to facilitate the separation of HHCs from $CH_4$. In a preferred embodiment, the feedstream to be separated will contact the membrane wherein the HHCs and the $CH_4$ in the feedstream will be substantially in a gaseous phase.

"Zeolitic imidazolate framework" (or "ZIF") materials are defined herein as microporous crystalline structures having framework topologies commonly found in zeolites and/or in other crystalline materials wherein each vertex of the framework structure is comprised of a single metal ion and each pair of connected adjacent vertices of the framework structure is linked by nitrogen atoms of an imidazolate anion or its derivative. The terms "micropore" or "microporous" as utilized herein is defined as a pore diameter or a material containing pore diameters of less than or equal to 2.0 nm (20 Å), respectively. Descriptions and the synthesis of some of the ZIF materials that can be utilized in the present invention are disclosed in United States Patent Publication No. US 2007/0202038A1 to Yaghi et al., which is hereby incorporated by reference.

The applicants of the present invention have discovered that ZIF materials can selectively separate HHCs from $CH_4$ in streams containing both of these components. Furthermore, this may be accomplished at conditions of pressure, temperature and compositions that are relevant to industrial processes. In order to separate two components from a mixture, the adsorption loading (e.g., in mmole/g) for the first component must be greater than the adsorption loading (e.g., in mmole/g) for the second component. Even though process schemes can be designed to operate at low ratios of adsorption loading (in mmole/g) for the first component vs. the adsorption loading (in mmole/g) for the second component, it is preferred that this "adsorptive loading ratio for an HHC component over $CH_4$" of the ZIF material utilized be at least 5.

Since the required equipment size, cost and operating expenses tend to be significantly lowered at higher adsorptive loading ratios, the separations processes become much more attractive utilizing materials and conditions that lead to higher adsorptive loading ratios. In more preferred embodiments of the present invention, the ZIF material utilized in the present invention has an adsorptive loading ratio for at least one $C_{2+}$ hydrocarbon (or "HHC") component over $CH_4$ of at least about 10, even more preferably at least about 15, and most preferably at least about 20. In a preferred embodiment of the present invention, the ZIF material utilized in the present invention is selected from ZIF-7, ZIF-9, and ZIF-1. In a more preferred embodiment of the present invention, the ZIF material utilized in the present invention is selected from ZIF-7 and ZIF-9.

In preferred embodiments, of the invention as described above, the $C_{2+}$ hydrocarbon (or "HHC") component is selected from ethylene ($C_2H_4$), ethane ($C_2H_6$), and propylene ($C_3H_6$). In a more preferred embodiment, the $C_{2+}$ hydrocarbon (or "HHC") component is ethylene ($C_2H_4$). In another more preferred embodiment, the $C_{2+}$ hydrocarbon (or "HHC") component is ethane ($C_2H_6$).

As utilized herein, the term "carbon number" when utilized herein as referred to a hydrocarbon compound is defined as referring to the total number of carbon atoms in the hydrocarbon compound referenced. For example, a hydrocarbon compound referenced herein to have a carbon number of "3" means that the compound contains three carbon atoms. Similarly, as utilized herein the term "$C_x$" means that the compound referenced has X carbon atoms. For example a hydrocarbon contains three carbon atoms may be referred to herein as a "$C_3$ hydrocarbon". "Hydrocarbons" are compounds comprised of at least one carbon atom and at least one hydrogen atom.

The ratio described above is a property for a specific adsorbate-adsorbent pair, at given conditions of pressure and temperature. This ratio is referred to herein as the "adsorptive loading ratio". This ratio is defined herein as a unitless quantity that is equal to the adsorption loading (in mmole/g) for the first component divided by the adsorption loading (in mmole/g) for the second component for a specific adsorbent material at a specific pressure and temperature. As used herein, although it is preferred that the adsorption loading for each component on a particular ZIF material be measured under the operating component partial pressure and temperature conditions for the system, it is often more advantageous to measure the adsorption loading for a particular ZIF for each component material at more "standard" conditions of pressure and temperature. Therefore, for the purposes of this invention and the scope of the present invention, the adsorptive loading ratio for two components (e.g., $C_2H_4$ and $CH_4$) can be measured at either operating partial pressure for the specific components and operating temperature conditions for the feedstream contacting the ZIF-containing adsorbent, or at single component testing conditions chosen herein to be 301 K (28° C.) and 106.6 kPa (800 torr). Unless stated otherwise, these latter conditions were used in the testing of the samples in the examples herein, which can be readily duplicated in a laboratory test facility.

ZIF materials that exhibit significantly large adsorptive loading ratios may be used in swing adsorption processes of the present invention to effectively and economically separate HHC components from $CH_4$ in streams containing both components. Each of these swing adsorption processes are comprised of a number of "steps" that include a variety of adsorption and desorption steps that in combination lead to a complete swing adsorption "cycle" that is periodically repeated. Since multiple adsorbent beds are typically used, their appropriate time synchronization leads to the continuous production of products. A complete swing adsorption cycle on a particular adsorbent bed, therefore, comprises all of the adsorption and desorption steps that are taken, beginning with the very first contacting of the feed gas mixture with the adsorbate-free or substantially adsorbate-free adsorbent and continuing through the last desorption stage that regenerates the adsorbent into its adsorbate-free or substantially adsorbate-free state and further including any additional repressurizing and/or purging steps that may occur thereafter to bring the "cycle" back to the first contacting of the feed gas mixture with the adsorbate-free or substantially adsorbate-free adsorbent which has begun the "cycle". At this point, the next swing adsorption "cycle" is started and the cycle is subsequently repeated.

Typically, there is at least one adsorption step wherein a process feedstream is contacted with the adsorbent material in a swing adsorption process. The equivalent terms "process feedstream" or "inlet stream" as used herein in swing adsorption embodiments of the present invention is the mixed component stream comprising at least two components to be separated which is contacted with the adsorbent material during the adsorption cycle. During this step of the process, the process feedstream contacts the adsorbent material under certain process temperature and pressure conditions and as the process feedstream flows through the adsorbent material at least a portion of the "first component" (or "strongly adsorbed component") of the process feedstream is preferentially adsorbed by the adsorbent material with respect to a "second component" (or "weakly adsorbed component"). During this step an "effluent stream" (or "$CH_4$-rich product stream" herein) is drawn from the swing adsorption process wherein the total number of moles of the first component into the swing adsorption process is higher than the total number of moles of the first component out of the swing adsorption process during this adsorption step. Although it is not necessary, it is preferred that the molar concentration of the first component in the process feedstream be greater than the molar concentration of the first component in the effluent stream.

The swing adsorption process is also comprised of at least one desorption step wherein at least a portion of the first component that has been preferentially adsorbed by the adsorbent material is recovered in what is termed herein as a "desorbed stream" (or "$CH_4$-lean product stream" herein). During this step, the process conditions in the swing adsorption process are changed to allow at least a portion of the first component to be desorbed from the adsorbent material and collected as a "desorbed stream". This desorption can be induced by a pressure swing, a temperature swing, the introduction of a partial pressure purge displacement stream, or a combination thereof. In a preferred embodiment, the molar concentration of the first component in the desorbed stream is greater than the molar concentration of the first component in the process feedstream. In another preferred embodiment, the molar concentration of the first component in the desorbed stream is greater than the molar concentration of the first component in the effluent stream.

Although at least these two steps (i.e., adsorption and desorption) are required in the swing adsorption processes of the current invention, additional steps may be utilized in the swing adsorption processes. These steps include, but are not limited to, concurrent purge steps, counter-current purge steps, and/or multiple partial pressurization or depressurization steps. These additional steps may be utilized to improve first and/or second component recovery, improve first or second component purity, and/or obtain multiple product streams in addition to the effluent stream and desorbed stream described above.

One embodiment of the swing adsorption process of the present invention utilizes a Pressure Swing Adsorption ("PSA") process wherein the adsorbent material is comprised of a ZIF material and the "first component" as described above is a $C_{2+}$ hydrocarbon (or "HHC") compound (e.g., ethylene, ethane, or propylene) and the "second component" as described above is $CH_4$. In this PSA process, the partial pressure of the first component during the adsorption step is higher than the partial pressure of the first component during the desorption step which allows at least a portion of the adsorbed first component to be recovered in the desorption step and the adsorbent material to be regenerated by depletion of the adsorbed components for reuse in a subsequent adsorption step. This is accomplished in part by exposing the adsorbent material to lower partial pressure conditions in the desorption step than the partial pressure conditions in the adsorption step. This desorption can be further assisted by utilizing a purge gas (as in a "Pressure Purge Displacement" process) to lower the partial pressure of the first component during the desorption step, a purge step, a partial pressurization step, or a partial depressurization step as described above. It should also be noted that the swing adsorption process described herein may include PSA, TSA, PPSA, RCPSA, RCTSA, RCPSA processes or combinations therein wherein the pressure is lowered to below atmospheric pressure (i.e., to a vacuum pressure) during at least one of a desorption step, a purge step, a partial pressurization step, or a partial depressurization step in the swing adsorption process cycle.

Figure 30:
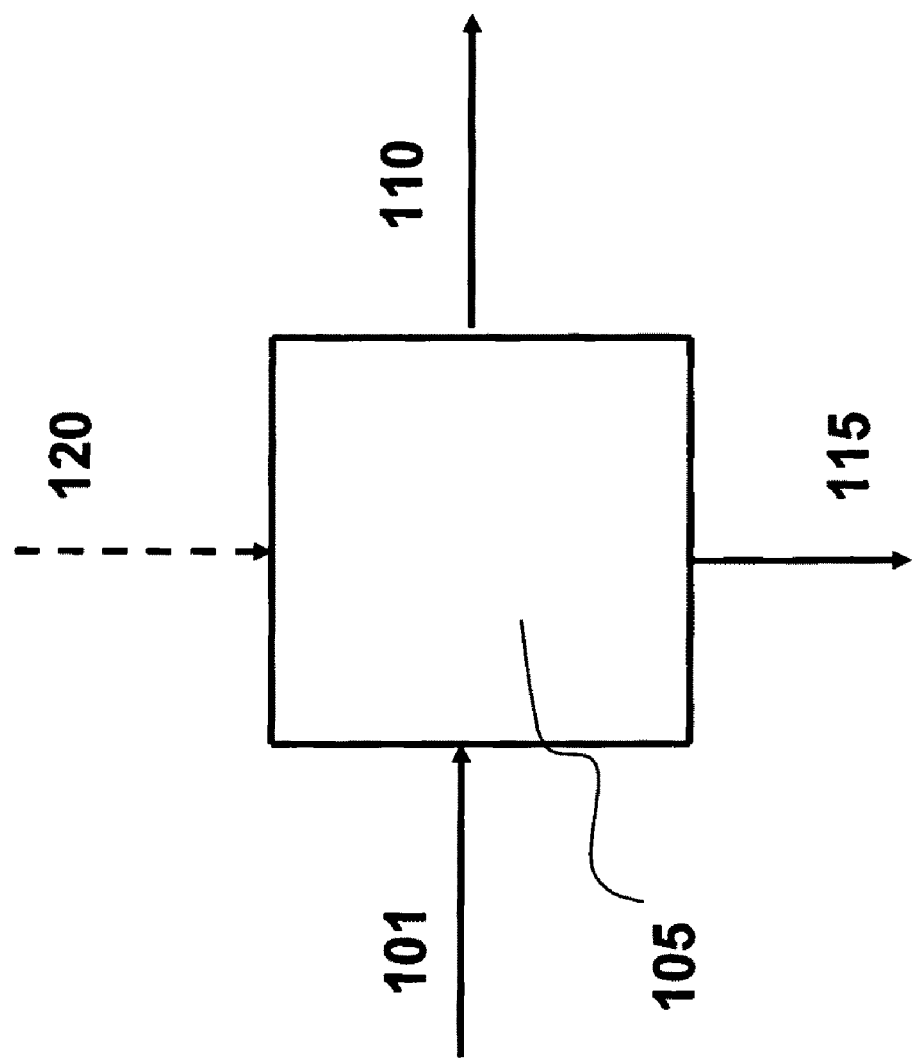
FIG. 30 is a simplified diagram showing a process embodiment of the current invention which utilizes a swing adsorption process with a ZIF-containing adsorbent material for the selective separation of a heavy hydrocarbon component ("HHC") from methane ($CH_4$).

FIG. 30 shows a schematic of a preferred embodiment of the present invention wherein a process feedstream (101) comprising $CH_4$ and at least one $C_{2+}$ hydrocarbon is fed to a process of the present invention wherein a Pressure Swing Adsorption ("PSA") unit (105) is utilized wherein the PSA unit is comprised of an adsorbent material wherein the adsorbent material is comprised of a ZIF material that has an adsorptive loading ratio for the at least one $C_{2+}$ hydrocarbon component (preferably $C_2H_4$) over $CH_4$ of greater than 5. Here, the $C_{2+}$ component (preferably $C_2H_4$) as well as other $C_{2+}$ components are preferentially adsorbed by the ZIF material in the PSA unit with respect to $CH_4$. During at least one stage in the PSA unit cycle, a $CH_4$-rich stream (110) is drawn from the PSA unit (105) wherein the $CH_4$-rich stream (110) has a higher content of $CH_4$ by mol % than the process feedstream (101). Additionally, during at least one other stage in the PSA unit cycle, a $CH_4$-lean stream (115) is drawn from the PSA unit (105) wherein the $CH_4$-lean stream (115) has a lower content of $CH_4$ by mol % than the process feedstream (101). In a preferred embodiment, the $CH_4$-lean stream (115) also has a higher content of $C_{2+}$ component by mol % than the process feedstream (101).

It should also be noted that a purge stream (120) may optionally be fed to the PSA unit (as in the "Pressure Purge Displacement" processes described prior) during at least one desorption stage of the overall PSA cycle to assist in removing the adsorbed process feedstream components from the adsorbent material. Although purge stream (120) is shown in FIG. 30 to be co-current with the flow of the desorbed $CH_4$- lean stream (115), it is known to those of skill in the art that the flow arrows as drawn in FIG. 30 are not meant to show directional flow within the PSA unit, but that the flow directions of the various streams may be designed as co-current, counter-current, cross-current, or otherwise in order to maximize the functionality of the process.

As described prior, by operating the PSA unit with multiple alternating beds/stages in the cycle, a process with a "near continuous" flow can be achieved. This simulated continuous flow can also be achieved by utilizing a multitude of stage PSA units (e.g., multiple parallel PSA units) or a combination of multiple PSA units each with multiple alternating beds/stages. This is true for all process embodiments as described herein and is within the skills of one of skill in the art to design with the information as disclosed herein.

In the PSA processes described herein, it is desired to capture a significant percentage (or "recovery") of the $CH_4$ in the feedstream in the $CH_4$-rich stream from the PSA unit. In preferred embodiments of the present invention, the $CH_4$-rich stream contains at least 70 mol % of the $CH_4$ present in the feedstream to the PSA process. More preferably, the $CH_4$-rich stream contains at least 80 mol % of the $CH_4$ present in the feedstream to the PSA process, and even more preferably, the $CH_4$-rich stream contains at least 85 mol % of the $CH_4$ present in the feedstream to the PSA process.

Another type of swing adsorption process of the present invention is a Temperature Swing Adsorption ("TSA") process wherein the adsorbent material is comprised of a ZIF material and the "first component" as described above is a $C_{2+}$ hydrocarbon (or "HHC") compound (e.g., ethylene, ethane, or propylene) and the "second component" as described above is $CH_4$. The TSA processes operate similar to the PSA processes above wherein the partial pressure of the first component during the adsorption step is higher than the partial pressure of the first component during the desorption step which allows at least a portion of the adsorbed first component to be recovered in the desorption step and the adsorbent material to be regenerated by depletion of the adsorbed components for reuse in a subsequent adsorption step. However, in the TSA processes, this is accomplished in part by exposing the adsorbent material to higher temperature conditions in the desorption step than the temperature conditions in the adsorption step. This desorption can be further assisted by utilizing a purge gas to lower the partial pressure of the first component and/or provide heating of the adsorbent material during the desorption step, a purge step, a partial pressurization step, or a partial depressurization step as described above.

An embodiment of the basic TSA process of the present invention is also illustrated by FIG. 30, except that the basic difference is that instead of raising the partial pressures of the stream/adsorbed components during to the adsorption step(s) and lowering the partial pressures of the stream/adsorbed during to the desorption step(s) via a change in pressure, these component partial pressures are raised and lowered, respectively, by lowering and raising the temperature of the components in contact with the adsorptive media.

It should also be noted that the steps of the PSA and TSA processes can also be combined in a PSA/TSA process of the present invention. In these combined processes, both pressure and temperature changes or "swings" are made between the adsorption steps and desorption steps of the process, resulting in a desired separation of at least a portion of the first component from the second component of the mixed component process feedstream fed to the inlet of the PSA/TSA process.

In embodiments of the swing adsorption processes of the present invention, the ZIF materials may be incorporated into the adsorption swing process in many structural forms and/or in combination with additional components. The ZIF materials may be incorporated as crystallites of preferred size and shape of substantially uniform dimensions or with dimensions suitably distributed according to a preferred distribution. The crystallites may be used directly as produced in the synthesis steps or be more preferably formulated into larger aggregates or incorporated into a structured or matrix material to provide form, stability, and/or in combination with other complementary co-adsorbent materials that can fulfill a variety of other beneficial functions to the overall process. Non-limiting examples include incorporating the ZIF material with a binder material to form a matrix comprising a binder material selected from a crystalline polymer, a non-crystalline polymer, an epoxy, a thermoplastic, a clay, a silica-containing material, an alumina-containing material, and a titania-containing material. The binder material may also exhibit either a microporous or a mesoporous structure. Additionally, it may be advantageous to add suitably chosen additives into this binder material. These additives can be used to improve the adsorption/desorption and transport properties of the selected components within the ZIF materials. Non-limiting examples of these additional additives include zeolites and microporous crystalline materials such as pure silicates, silicoaluminophosphates ("SAPO"s), aluminophosphates ("AlPO"s). In a preferred embodiment, the additional additive is a zeolite. Other additives such as metals or other high heat capacity and high heat conductivity materials may also be incorporated into the matrix to assist in the capture and transfer of at least a portion of the heat that is generated during the exothermic adsorption step(s) of the swing adsorption process, thereby shortening the duration of the cycling process, increasing throughput, and further improving the overall efficiency of the ZIF material for adsorbing the select component or components.

When the ZIF materials are incorporated with a binder, the adsorbent material can be formulated into optimal geometric shapes or be applied onto supporting substrates which further improve the durability of the adsorbent and the rate at which the selected adsorbing components are brought into contact with the adsorption sites of the ZIF material. Non-limiting examples include beads, extrudates, formed pellets, structured beds, monoliths and hollow fibers, as well as coatings applied to plates or monolithic structures fibers or hollow fibers. Depending upon the specific situation, inlet stream composition as well as product stream compositions, process conditions and equipment design for the process of the present invention, certain structures and/or matrix compositions can provide improved separation efficiencies and/or selectivities for the overall process.

Any of the steps described above (i.e., structuring, additives, co-adsorbents, etc) that allow a reduction in the duration of a complete swing adsorption cycle or simply "cycle" are of utmost practical importance since shorter cycle times result in higher throughputs and/or can reduce equipment cost. Whereas conventional swing adsorption processes typically operate at cycles with durations of the order of minutes, with the materials of the present invention and the above mentioned process modifications, it is possible to significantly reduce the duration of a complete cycle by more than 50% over conventional swing adsorption processes. These rapid cycle swing adsorption processes that are enabled by the materials and process conditions of the present invention are particularly advantageous from an economic standpoint. In preferred embodiments of the present invention, the ZIF material is utilized in a swing adsorption process wherein the cycle time is less than about 1 minute, and more preferably, the ZIF material is utilized in a swing adsorption process wherein the cycle time is less than about 30 seconds. In an even more preferred embodiment of the present invention, these short cycle times are incorporated into a rapid cycle pressure swing adsorption ("RCPSA") process embodiment of the present invention.

In another embodiment of the present invention, the ZIF material can be incorporated into a membrane separations process for the selective separation of a $C_{2+}$ hydrocarbon (or "HHC") compound (e.g., ethylene, ethane, or propylene) from methane, $CH_4$, in streams comprising a mixture of these components. In this embodiment, a ZIF material is incorporated within or coated onto an inorganic substrate or a polymer material and utilized in a membrane separation process, thereby producing a "ZIF-containing membrane". The ZIF material of the membrane, has a net permeation affinity for a $C_{2+}$ hydrocarbon (compound over $CH_4$. The permeation rate can be typically described in terms of two multiplicative factors, one related to the diffusion rate and another related to the adsorption loadings of the components of the mixture on the ZIF material. With respect to this latter factor, a ZIF material incorporated into the membrane which has a higher adsorptive loading ratio for a $C_{2+}$ hydrocarbon compound over $CH_4$, improves the concentration gradient for the $HHCC_{2+}$ hydrocarbon compound either at the membrane surface (if coated onto the membrane surface) and/or in the membrane (if incorporated into the membrane matrix). This improved concentration gradient enhances the selective permeation of the $C_{2+}$ hydrocarbon compound relative to $CH_4$ through the membrane, resulting in an improved recovery of $CH_4$ in the membrane process retentate stream.

In this embodiment of the present invention, a process feedstream comprising a $C_{2+}$ hydrocarbon (or "HHC") compound and $CH_4$ contacts a first side of a ZIF-containing membrane and at least a portion of the process feedstream permeates through the membrane and is retrieved from a second side of the membrane material as a permeate stream. The permeate stream (or "$CH_4$-lean product stream") is obtained from the second side of the membrane and the permeate stream thus obtained has a lower mol % of $CH_4$ than the process feedstream. The equivalent terms "process feedstream", "feedstream", or "inlet stream" as used herein in membrane process embodiments of the present invention is the mixed component stream comprising at least two components to be separated which is contacted with the first side of the ZIF-containing membrane. It should be noted that in some embodiments, a "sweep stream" may be utilized on the permeate side of the ZIF-containing membrane in the membrane separation process of the present invention. It should also be noted that the term "permeate stream" as used herein and its composition properties are measured based solely upon the composition of the stream that permeates through the ZIF-containing membrane. For purposes of this invention, if any additional stream, such as a sweep stream, is added on the permeate side of the membrane process, the composition of this sweep stream must be excluded from the compositional analysis of the permeate stream.

Continuing with this process embodiment of the present invention, at least one retentate stream (or "$CH_4$-rich product stream") is also obtained from the first side of the membrane which has a higher mol % of $CH_4$ than the process feedstream that initially contacts the membrane. In this manner, a separation of components is made resulting in a higher value for the two separated streams (i.e., the retentate and the permeate streams) than the original mixed stream that is fed to the membrane separations process.

Figure 31:
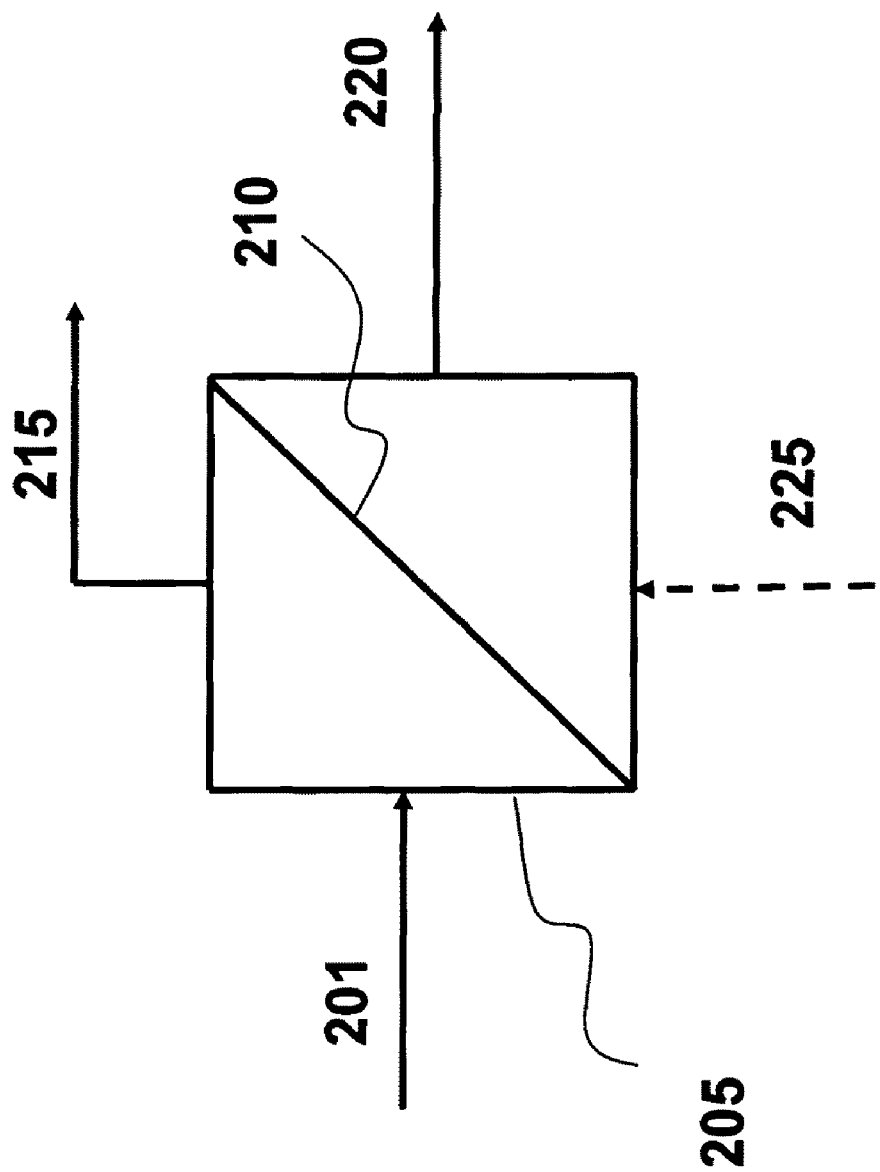
FIG. 31 is a simplified diagram showing a process embodiment of the current invention which utilizes a membrane separations process with a ZIF-containing selective membrane for the selective separation of a heavy hydrocarbon component ("HHC") from methane ($CH_4$).

FIG. 31 illustrates this concept in a schematic of a preferred embodiment of the present invention wherein a process feedstream (201) comprising $CH_4$ and at least one $C_{2+}$ hydrocarbon is fed to a process of the present invention wherein a membrane separations unit (205) is utilized wherein the membrane separations unit contains a selective membrane material (210) which is comprised of a ZIF material that has an adsorptive loading ratio for the at least one $C_{2+}$ component (preferably $C_2H_4$) over $CH_4$ of greater than 5. Here, the $C_{2+}$ component (preferably $C_2H_4$) as well as other $C_{2+}$ components are preferentially adsorbed by the ZIF material in the selective membrane with respect to $CH_4$. Here, a $CH_4$-rich stream (215) is continuously drawn as a "retentate" from the membrane separations unit (205) wherein the $CH_4$-rich stream (215) has a higher content of $CH_4$ by mol % than the process feedstream (201). A $CH_4$-lean stream (220) that is comprised of selective components that permeate through the ZIF-containing membrane is continuously drawn as a "permeate" from the membrane separations unit (205) wherein the $CH_4$-lean stream (220) has a lower content of $CH_4$ by mol % than the process feedstream (201). In a preferred embodiment, the $CH_4$-lean stream (220) also has a higher content of $C_{2+}$ component by mol % than the process feedstream (201).

It should also be noted that a sweep stream (225) may optionally be fed to the membrane separations unit during the process to assist in removing the $CH_4$-lean stream components that have permeated from the selective membrane from the permeate (or "back") side of the selective membrane. This may be utilized to improve the concentration gradient of the selectively permeated materials across the membrane thus improving the overall process benefits. In a preferred embodiment, a sweep stream is utilized which can be easily separated from the $CH_4$-lean stream components of the process and be recycled for reuse as a sweep stream.

In preferred embodiments, the ZIF material utilized in the membrane separations process of the present invention has an adsorptive loading ratio for at least one $C_{2+}$ component hydrocarbon component over $CH_4$ of at least about 5; more preferably, the adsorptive loading ratio is at least about 10, and even more preferably, at least about 20. In a preferred embodiment of the present invention, the ZIF material utilized in the present invention is selected from ZIF-7, ZIF-9, and ZIF-1. In a more preferred embodiment of the present invention, the ZIF material utilized in the present invention is selected from ZIF-7 and ZIF-9.

In more preferred embodiments, as described above, the $C_{2+}$ hydrocarbon (or "HHC") component in the process feedstream to the membrane separation process is selected from ethylene ($C_2H_4$), ethane ($C_2H_6$), and propylene ($C_3H_6$). In an even more preferred embodiment, the $C_{2+}$ hydrocarbon (or "HHC") component is ethylene ($C_2H_4$). In another even more preferred embodiment, the $C_{2+}$ hydrocarbon (or "HHC") component is ethane ($C_2H_6$).

The membranes utilized in embodiments of the present invention can be asymmetric and can be comprised of several layers of different materials. To improve the mass transfer characteristics of these asymmetric membrane structures one or more of these layers can be a porous material. A thin selective layer imparts most of the molecular selectivity in the asymmetric membrane structure and in a preferred embodiment this selective layer contains the ZIF material. On the feed side molecules are selectively adsorbed in the selective layer and on the permeate side the molecules are desorbed. The selective ZIF-containing layer can optionally include other materials. One of the materials that can be present in the ZIF-containing layer is a polymer. When the ZIF containing layer contains more than 10 vol % of another material the selective layer is called a mixed matrix. To mitigate the effect of any defects or pinholes in the selective layer, a reparation coating or reparation layer can be incorporated in the membrane structure.

The ZIF-containing membrane will typically be part of a membrane module that includes a pressure housing. Non-limiting examples of ZIF-containing membrane structures that can be incorporated into the membrane module are hollow-fiber membrane structures, flat sheet membrane structures, and monolithic membrane structures. The membrane module will typically contain seals to isolate the retentate and permeate zones of the module and to prevent flow bypass or cross-contamination of the retentate stream(s) to the permeate stream(s). The seals may also serve as a device for holding the membrane in place within the membrane module.

There are many applications in the industry which can benefit the process of the present invention which enables such an efficient separation of methane, $CH_4$, from higher carbon number hydrocarbons, preferably, but not limited to, in a gas phase stream.

On such application is the separation of heavy hydrocarbons ("HHCs") from $CH_4$ in a natural gas stream. The present invention may be utilized to separate HHCs from $CH_4$ in a natural gas stream either at or near the wellhead, prior to bulk transportation of the natural gas and other hydrocarbon products, or to provide a very efficient cleanup of natural gas streams at points in the market chain downstream from the wellhead.

Natural gas is often produced from wells under very high wellhead pressures. Typical natural gas recovery pressures usually range from about 500 psig (3,447 kPa) to up to about 5,000 psig (34,474 kPa). Since most PSA and TSA processes can be designed to produce a better separation at lower operating pressures (typically below about 500 psig (3,447 kPa) for the inlet stream in the adsorption step in the process), it is desirable to have adsorbent materials with high adsorptive loading ratios that can perform separations efficiently at higher pressures than conventionally performed.

It is preferred if the natural gas is comprised of a significant content of methane, $CH_4$. Depending upon the point of refining and sale, it is preferred the methane content be greater than about 70 mol %, more preferably greater than about 80 mol % and for commercial sales and residential uses, more preferably greater than about 90 mol %. Often, and particularly in the first phases of natural gas production, the raw natural gas often contains significant amounts of water and heavy hydrocarbons. Although the water and some of the very heavy hydrocarbons can be separated out from the saleable natural gas through liquid/gas separation at commercially reasonable temperatures and pressures, much of the light HHCs, such as, but not limited to, the $C_2$, $C_3$ and $C_4$ hydrocarbons, are in the form of gases that cannot be easily extracted. Many of the present methods utilized today for separation rely on costly compression and liquefaction techniques including cryogenics.

It is desired to remove these HHC components because they can usually be sold as higher value hydrocarbon products such as ethylene, ethane, propylene, propane, butylene, and butane, etc. than they are worth as natural gas components. Additionally, these components often need to be removed to meet natural gas standards. These HHC components, if recoverable by economically viable means, generally have a higher value of product for use as separate fuels or chemical feeds than as components of natural gas.

In a preferred embodiment of the present invention, the process feedstream as exemplified by the swing processes (PSA or TSA) of FIG. 30 is comprised of a natural gas wherein the $CH_4$ in the process feedstream is selectively separated from the HHC components in the process feedstream. In another preferred embodiment of the present invention, the process feedstream as exemplified by the membrane separations process of FIG. 31 is comprised of a natural gas wherein the $CH_4$ in the process feedstream is selectively separated from the HHC components in the process feedstream. In additional preferred embodiments of the present invention, the $CH_4$-rich stream contains at least 70 mol % of the $CH_4$ present in the natural gas feedstream. More preferably, the $CH_4$-rich stream contains at least 80 mol % of the $CH_4$ present in the natural gas feedstream, and even more preferably, the $CH_4$-rich stream contains at least 85 mol % of the $CH_4$ present in the natural gas feedstream.

Another preferred process embodiment of the current invention is utilizing a PSA, TSA, or similar unit containing a ZIF material as described herein for removal of methane, $CH_4$, contaminants from the product stream of ethylene or propylene steam crackers. In particular, it is beneficial to the industry to separate methane, $CH_4$ (undesired component) from the ethylene, $C_2H_4$ (desired component) in a hydrocarbon product stream from an ethylene production plant (i.e., an ethylene steam cracker product). Similarly, it is beneficial to the industry to separate methane, $CH_4$ (undesired component) from the propylene, $C_3H_6$ (desired component) in a hydrocarbon product stream from a propylene production plant (i.e., an propylene steam cracker product).

Similarly, another preferred process embodiment of the current invention is utilizing a PSA, TSA, or similar unit containing a ZIF material as described herein for removal of methane, $CH_4$, contaminants from polymer production feedstreams. In particular, it is beneficial to the industry to separate methane, $CH_4$ (undesired component) from the ethylene, $C_2H_4$ (desired component) in a hydrocarbon feedstream for a polyethylene production plant. Similarly, it is beneficial to the industry to separate methane, $CH_4$ (undesired component) from the propylene, $C_3H_6$ (desired component) in a hydrocarbon feedstream for a polypropylene production plant.

In a preferred embodiment of the present invention, the process feedstream as exemplified by the swing processes (PSA or TSA) of FIG. 30 is comprised of methane, $CH_4$, and propylene, $C_3H_6$, wherein the methane, $CH_4$, in the process feedstream is selectively separated from the propylene, $C_3H_6$, in the process feedstream. In another preferred embodiment of the present invention, the process feedstream as exemplified by the membrane separations process of FIG. 31 is comprised of methane, $CH_4$, and propylene, $C_3H_6$, wherein the methane, $CH_4$, in the process feedstream is selectively separated from the propylene, $C_3H_6$, in the process feedstream. In additional preferred embodiments of the present invention, the $CH_4$-rich stream contains at least 70 mol % of the $CH_4$ present in the process feedstream. More preferably, the $CH_4$-rich stream contains at least 80 mol % of the $CH_4$ present in the process feedstream, and even more preferably, the $CH_4$-rich stream contains at least 85 mol % of the $CH_4$ present in the process feedstream.

It should also be noted that the same processes as shown in FIGS. 30 and 31 can be utilized in an embodiment for the separation of methane, $CH_4$, from propylene, $C_3H_6$, from a process feedstream comprising both methane and propylene.

Another very valuable process embodiment of the present invention involves the use of a PSA unit containing a ZIF material for the separation and recovery of hydrocarbon components in what is commonly known in the petroleum/petrochemical industry as an LPG (Light Plant Gas) recovery system. In an LPG recovery system, light hydrocarbon gas streams (usually comprising mostly $C_5$ and lower carbon number hydrocarbon components, including methane) that are generated by individual process units in petroleum and/or petrochemical plants are sent to an LPG recovery system for processing. In most cases, the goal of the LPG recovery system is to separate the valuable light gases ($C_2$, $C_3$, and higher carbon number hydrocarbons) from the methane ($CH_4$) in the LPG recovery system feedstream. These valuable light gases can then be sent for further processing, used as feedstocks to conversion units, or even segregated for saleable products (such as propane and butane). It is generally desired to separate the methane from these more valuable heavier hydrocarbon products and send the $CH_4$-enriched product stream to a "fuel gas" system where the methane enriched product can be used as a fuel supply to the petroleum and/or petrochemical plant units. This methane containing fuel gas is often used to fire steam boilers, hydrocarbon heaters, or can also be used to generate power via steam turbines or other power recovery devices. In some cases, where there is an overcapacity of fuel gas or a fuel gas system is not employed, the recovered methane can also be sent to a flare disposal system.

Conventionally, the LPG recovery systems are comprised of a compression and condensation system where the LPG recovery feedstream is compressed and then cooled to a point wherein most of the $C_2$ and heavier (or conversely $C_3$ and heavier) hydrocarbon components form a liquid phase while the methane component is still in a gas phase, thereby allowing the separation of these components by subsequent liquid/gas separation. However, this conventional recovery technique requires a significant amount of energy to compress and cool the gas stream as well as a significant cost in compression machinery and related hardware. It would be desirable to make such a separation in a significantly gas phase regime through the molecular separation process as per an embodiment of the present invention. As used herein, the term "LPG feedstream" is defined as a hydrocarbon-containing stream comprised of $C_1$, $C_2$, and $C_3$ hydrocarbons.

In a preferred embodiment of the present invention, the process feedstream as exemplified by the swing processes (PSA or TSA) of FIG. 30 is comprised of an LPG feedstream wherein the $CH_4$ in the process feedstream is selectively separated from the HHC components in the process feedstream. In another preferred embodiment of the present invention, the process feedstream as exemplified by the membrane separations process of FIG. 31 is comprised of an LPG feedstream wherein the $CH_4$ in the process feedstream is selectively separated from the HHC components in the process feedstream. In additional preferred embodiments of the present invention, the $CH_4$-rich stream contains at least 70 mol % of the $CH_4$ present in the LPG feedstream. More preferably, the $CH_4$-rich stream contains at least 80 mol % of the $CH_4$ present in the LPG feedstream, and even more preferably, the $CH_4$-rich stream contains at least 85 mol % of the $CH_4$ present in the LPG feedstream.

A significant benefit in the separations process of the present invention can be achieved over convention PSA processes by utilizing adsorbent materials comprised of certain ZIFs. It has been discovered herein that some of the ZIF materials exhibit a valuable feature in the design and operation of PSA processes, as well as a high adsorptive loading ratio for HHC components over $CH_4$.

Figure 13:
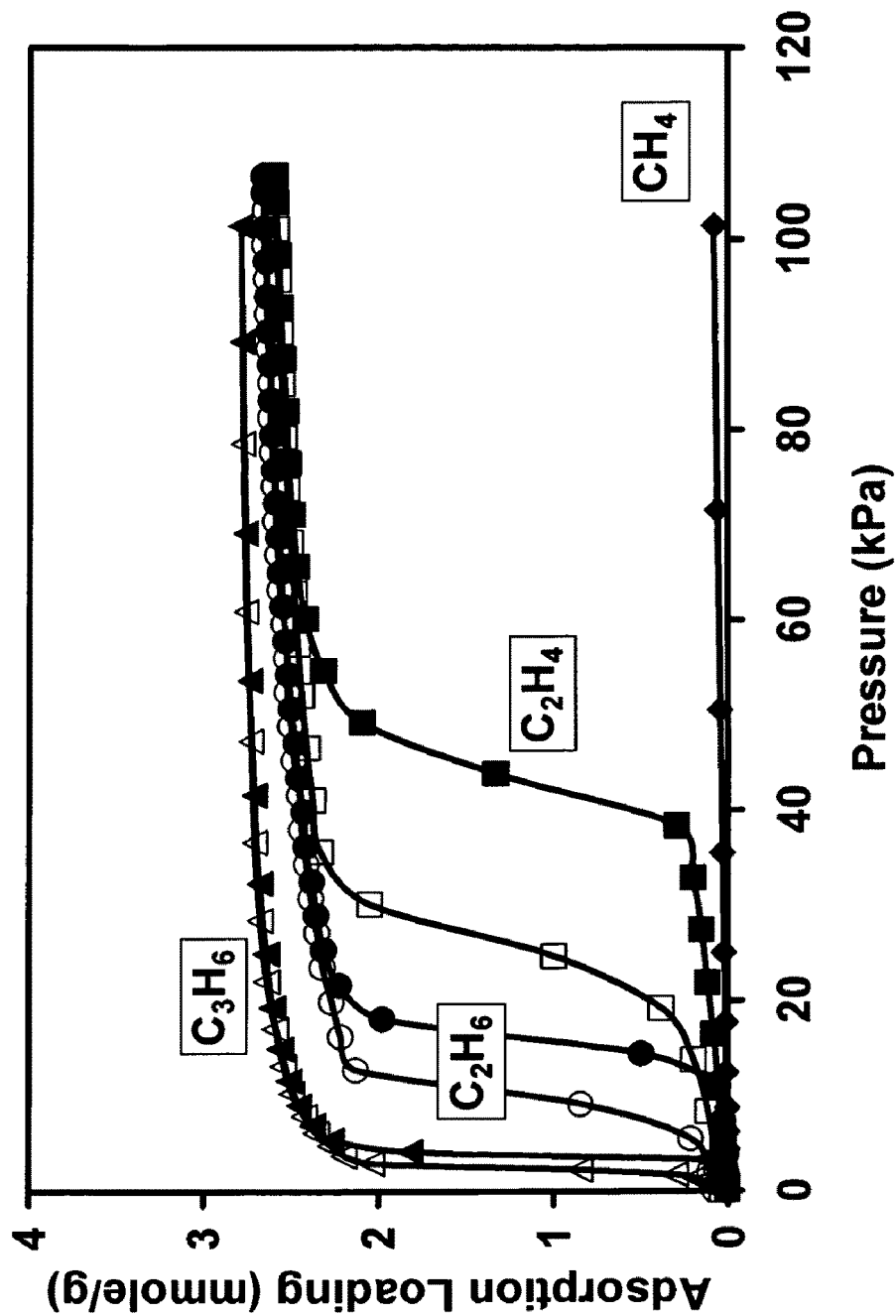
FIG. 13 shows the $CH_4$ (methane) adsorption isotherm and the $C_2H_4$ (ethylene), $C_2H_6$ (ethane), and $C_3H_6$ (propylene) adsorption isotherms at 301 K for a ZIF-7 sample of Example 6.
Figure 14:
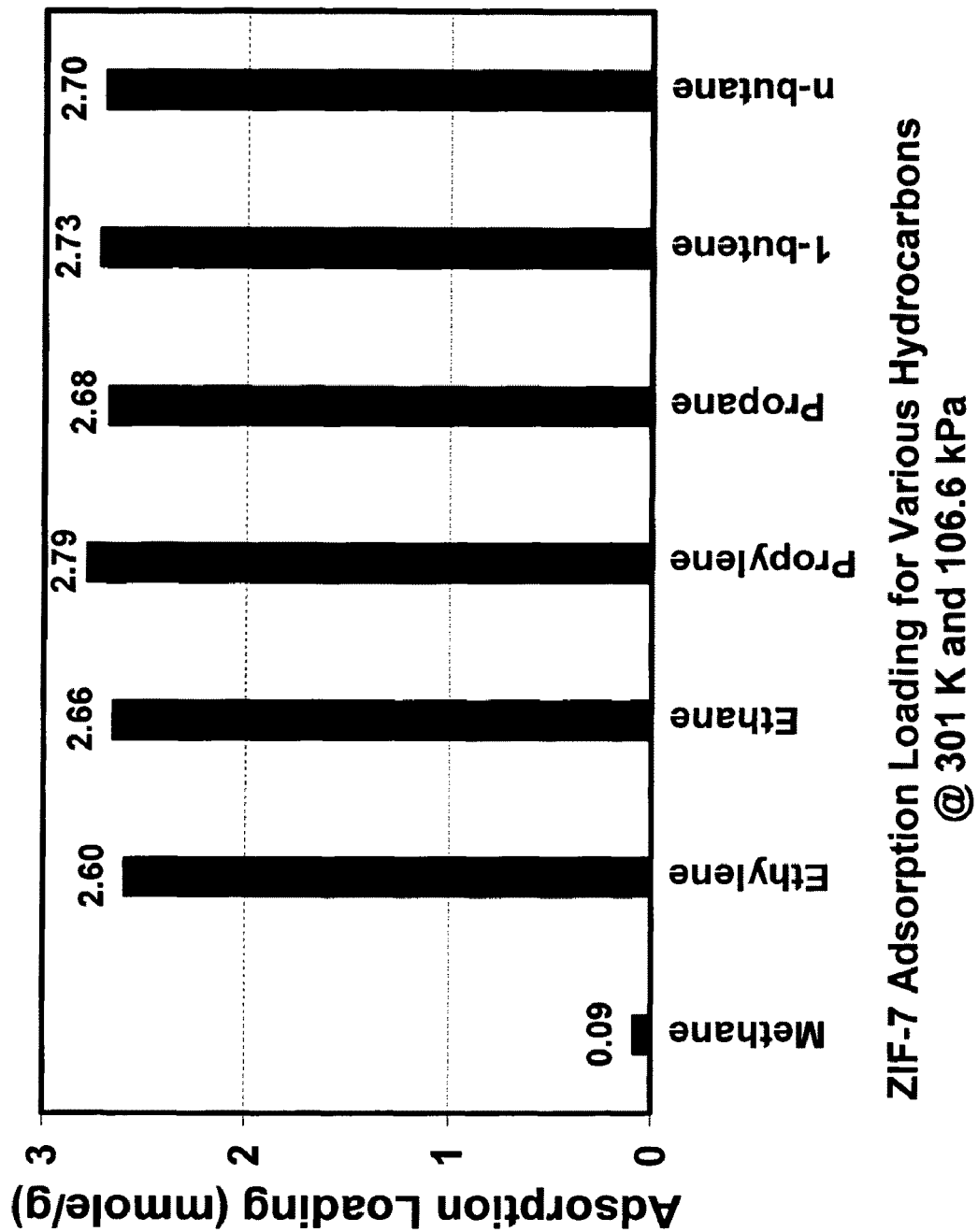
FIG. 14 is a bar graph comparing the adsorption loadings of a ZIF-7 sample of Example 5 for $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at 301 K and 106.6 kPa.

For an example, FIG. 13 shows the adsorption isotherms for ZIF-7 for $CH_4$ (methane) adsorption isotherm as well as $C_2H_4$ (ethylene), $C_2H_6$ (ethane), and $C_3H_6$ (propylene) adsorption isotherms at 301 K. The overall adsorption loading of these components at standard test conditions of 301 K and 106.6 kPa is shown in the bar graph of FIG. 14. As can be seen in FIG. 14, under these standard test conditions, ZIF-7 has an adsorption loading for $C_2H_4$ (ethylene), $C_2H_6$ (ethane), and $C_3H_6$ (propylene) of about 2.60 mmole/g, 2.66 mmole/g, and 2.79 mmole/g, respectively. In contrast, ZIF-7 has an adsorption loading for $CH_4$ of only about 0.08 mmole/g. As can be seen in FIG. 14, the adsorptive loading ratio for the lowest molecular weight $C_2$ compound shown (ethylene, $C_2H_4$) over $CH_4$ is greater than about 30. Such high adsorptive loading ratios render these ZIF materials very effective adsorbent materials of the processes of the present invention.

It is also noted that ZIF-7 (as well as ZIF-9) exhibits a unique isotherm shape not typically found in microporous crystalline materials such as zeolites. As described herein, this unique isotherm shape for hydrocarbons in ZIF-7 has important implications and distinctively enables embodiments of the present invention. FIG. 13 shows that the isotherms for the $C_{2+}$ hydrocarbons $C_2H_4$, $C_2H_6$, and $C_3H_6$ at 301 K display a hysteretic behavior characterized by unique adsorption (solid squares) and desorption (open squares) branches. It should be noted that although the isotherm for methane, $CH_4$, in FIG. 13 does not show this hysteretic behavior in the pressure range from 0 to 106.6 kPa as tested, it is believed that the isotherm for methane, $CH_4$, would show similar hysteresis characteristics at higher pressures.

Continuing with FIG. 13, the transition from low to high loading in the adsorption branch for ethylene, $C_2H_4$, in the range of from about 40 to about 60 kPa signals a more favorable accommodation of the $C_2H_4$ within the ZIF-7 structure than in the Henry's law-like region below about 20 kPa. Similarly, the transition from high to low loading in the desorption branch for ethylene, $C_2H_4$, in the range of from about 20 to about 40 kPa signals the less favorable accommodation of the $C_2H_4$ within the ZIF-7 structure. This behavior is the result of unique energetic interactions between the adsorbed $C_2H_4$ and the ZIF-7 structure that, as described herein, advantageously enables embodiments of the pressure swing adsorption processes of the present invention. With this particular isotherm shape, it is possible to develop an effective pressure swing adsorption cycle that requires a narrow pressure swing that is only of the order of the pressure gap that exists between the rising adsorption branch and the decreasing desorption branch (i.e., a pressure swing of approximately 20 to 40 kPa in this example). It can be seen that this holds true for the higher molecular weight hydrocarbon compounds, and in fact improves in desired results for higher molecular weight hydrocarbons. As it can be seen from the adsorption/desorption plot of propylene, $C_3H_6$, in FIG. 13 (wherein the pressure difference is very small between the adsorption/desorption points in the hysteresis around 5 kPa), the present invention can allow the employment of very small pressure swings to achieve the significant loading and unloading of propylene in the ZIF-7 material which is very advantageous in a PSA process cycle.

It is also worth noticing that such a cycle would be associated with a fairly large "working capacity" (and thus aid the economics of the process), as seen from the large difference between the loadings at the low and high pressures at which the cycle would operate. The "working capacity" of an adsorbate material is defined herein as the difference between the adsorbate loading in the adsorption step and the adsorbate loading in the desorption step of the "strongly adsorbed component" (which unless otherwise defined herein is the highest molecular weight $C_{2+}$ hydrocarbon compound in the feedstream). Larger values of the working capacity are desirable. With more standard adsorbent materials that do not exhibit the type of hysteresis behavior shown in FIG. 13 (i.e., exhibit a more conventional gradual increase in loading with pressure at a constant temperature), the pressure swing has to be significantly broader to achieve an equivalent level of working capacity, with concomitant implications for a higher cost operation.

From the previous discussion on the uniqueness of the isotherm shape, particularly the transition from low to high loading, it follows that in preferred embodiments of the present invention, the ZIF material is utilized in a swing adsorption process, wherein the applied pressure swing is less than about 300 kPaa. In preferred embodiments of the present invention, the ZIF material is utilized in a swing adsorption process wherein the applied pressure swing is less than about 200 kPaa; and even more preferably, the ZIF material is utilized in a swing adsorption process wherein the applied pressure swing is less than about 100 kPaa. In an even more preferred embodiment of the present invention, these narrow applied pressure swings are incorporated into a pressure swing adsorption ("PSA") process embodiment of the present invention. The term "applied pressure swing" as utilized herein is defined as the difference in the maximum and minimum partial pressures of the highest molecular weight $C_{2+}$ hydrocarbon compound to be separated from $CH_4$ that are experienced in the adsorbent bed during a swing adsorption cycle.

Figure 12:
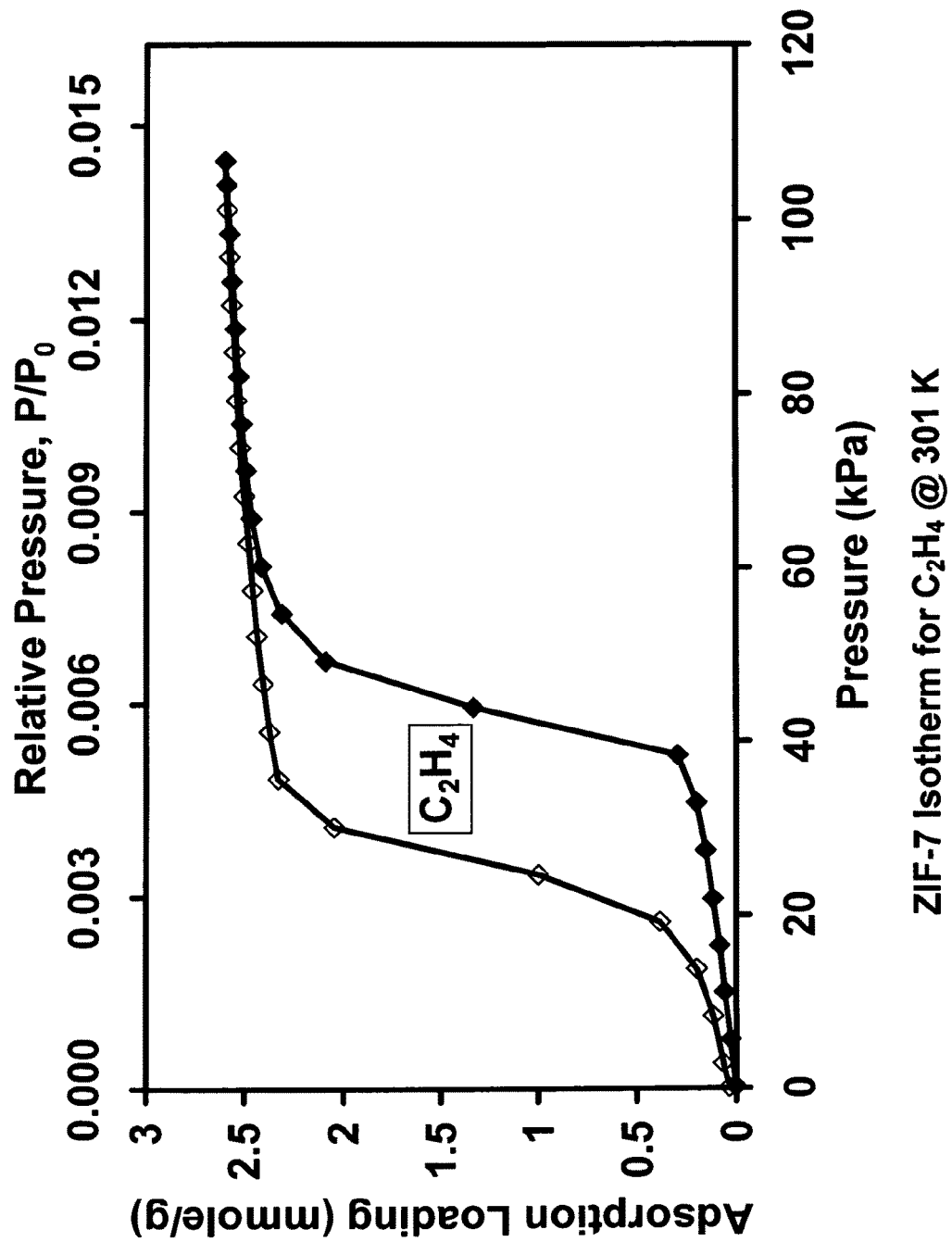
FIG. 12 shows the $C_2H_4$ (ethylene) adsorption isotherm at 301 K for a ZIF-7 sample of Example 6.
Figure 18:
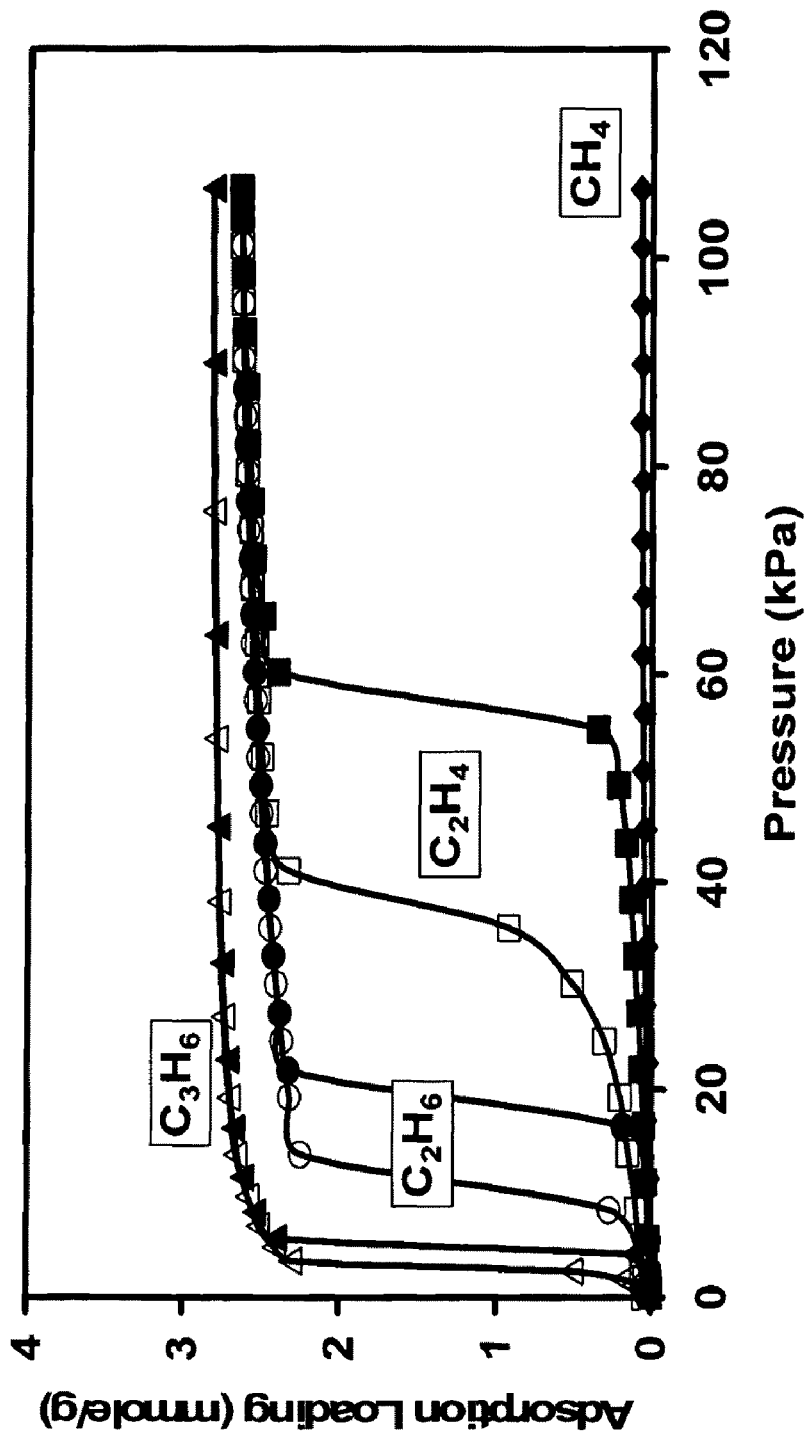
FIG. 18 shows the $CH_4$ (methane) adsorption isotherm and the $C_2H_4$ (ethylene), $C_2H_6$ (ethane), and $C_3H_6$ (propylene) adsorption isotherms at 301 K for a ZIF-9 sample of Example 7.

The adsorption isotherm features displayed in FIG. 13 for ZIF-7 have several other advantageous implications for the swing adsorption processes of the present invention. As also shown in FIG. 12, the absolute $C_2H_4$ partial pressure region at which the low to high adsorption loading transition takes place is fairly low. When such partial pressure (P) is expressed relative to the saturation pressure of $C_2H_4$ at the temperature of the test experiment ($P_0$), the transition takes place at a relative $P/P_0$ value of less than about 0.012 at 301 K (see upper abscissa in FIG. 12), Such low values of $P/P_0$ make ZIF-7 very attractive for adsorbing $C_2H_4$ (as well as other $C_{2+}$ hydrocarbon compounds) from streams that contain low levels of $C_2H_4$ that would be difficult to adsorb with more conventional materials that require a higher partial pressure to achieve an acceptable adsorption loading at the same temperature. Even more important from a $C_2H_4/CH_4$ separations standpoint, it is noticed that at the same conditions of pressure and temperature as for $C_2H_4$, the weaker interactions of $CH_4$ with the ZIF-7 structure do not cause the transition to a high loading state. FIG. 14 shows that when $CH_4$ is contacted with the ZIF-7 material at pressures as high as 106.6 kPa and 301 K, the adsorption loading remains low, in a Henry's law kind of regime, ultimately giving rise to a high adsorptive loading ratio for $C_2H_4$ (as well as other $C_{2+}$ hydrocarbon compounds) relative to $CH_4$ at those conditions. While it is expected that higher $CH_4$ partial pressures could eventually cause the transition to a higher loading state to take place in a material like ZIF-7 at the same temperature of 301 K, one of skill in the art of swing adsorption processes knows that adsorption phenomena are temperature-activated and that the temperature can also be proportionally raised to prevent such transition to occur and thus prevent significant amounts of $CH_4$ from loading into the adsorbent material, which is a key objective of the separation process where it is desired to maximize the enrichment of the adsorbent material with the preferred adsorbate component. It should also be noted that that similar characteristics are exhibited by ZIF-7 for other hydrocarbons, such as $C_2H_6$ (ethane) and $C_3H_6$ (propylene). It should also be noted that similar characteristics are exhibited by the ZIF-9 material shown in Example 7, as well as seen in FIG. 18.

From the previous discussion on the features of the adsorption isotherm, particularly in embodiments desiring the attainment of high loadings of the preferred adsorbate at low pressures, in a preferred embodiment of the present invention, the ZIF material is utilized in a swing adsorption process wherein the partial pressure of the $C_{2+}$ hydrocarbon compound in the gas mixture to be separated is less than about 200 kPaa, and more preferably, the ZIF material is utilized in a swing adsorption process wherein the partial pressure of the $C_{2+}$ hydrocarbon compound in the gas mixture to be separated is less than about 100 kPaa. In an even more preferred embodiment of the present invention, the processing of these process streams with low $C_{2+}$ hydrocarbon component partial pressures are incorporated into a pressure swing adsorption ("PSA") process embodiment of the present invention.

In more preferred embodiments of the invention as described in the paragraph prior, the $C_{2+}$ hydrocarbon (or "HHC") compound is selected from the group consisting of $C_2H_4$ (ethylene), $C_2H_6$ (ethane), and $C_3H_6$ (propylene). In another preferred embodiment, the $C_{2+}$ hydrocarbon (or "HHC") compound is ethylene. In another preferred embodiment, the $C_{2+}$ hydrocarbon (or "HHC") compound is ethane. In yet another preferred embodiment, the $C_{2+}$ hydrocarbon (or "HHC") compound is propylene.

Figure 15:
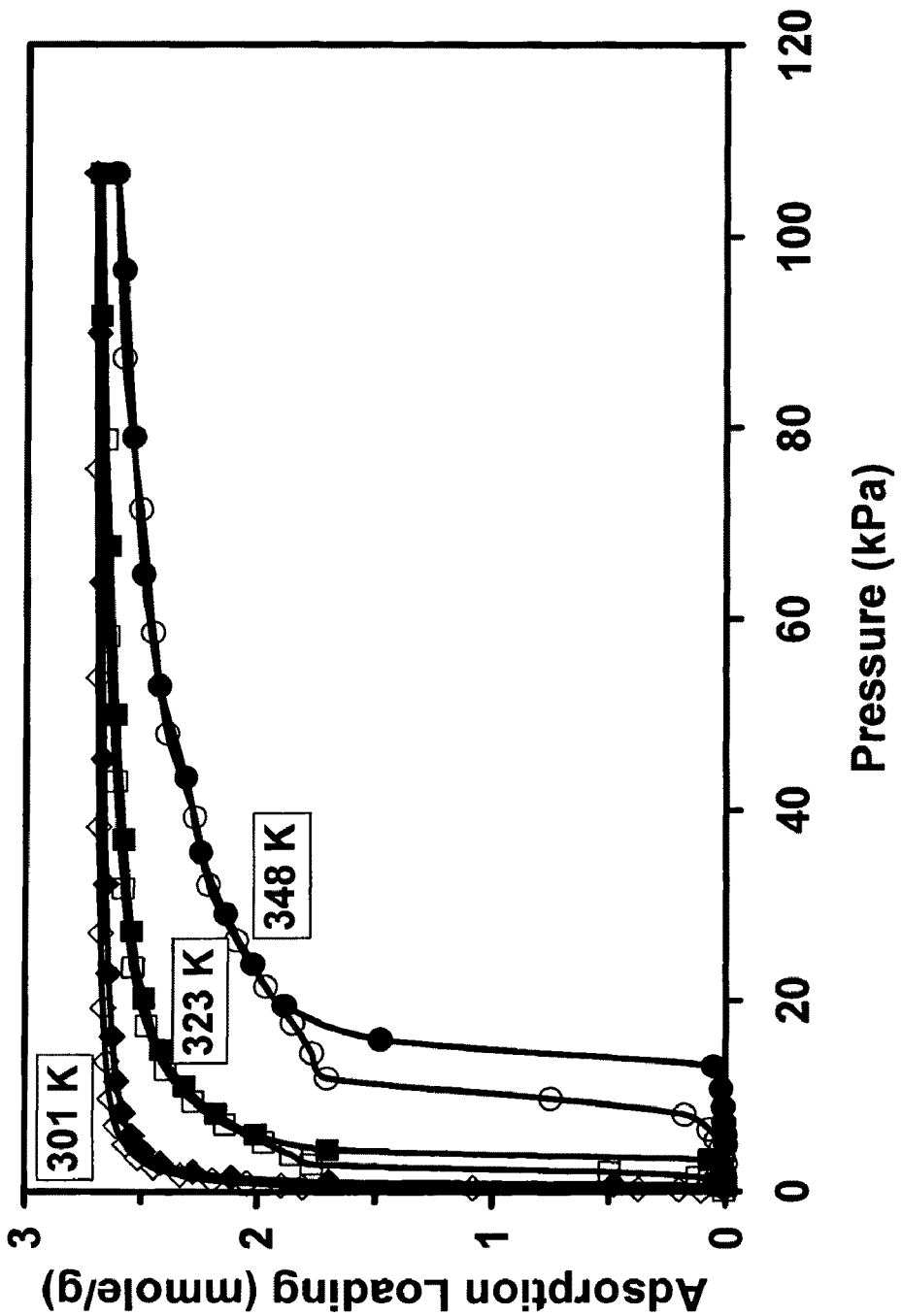
FIG. 15 shows the $C_2H_4$ (ethylene) adsorption isotherms at 301 K, 323 K, and 348 K for a ZIF-7 sample of Example 6.

The use of temperature to prevent the low to high loading transition in the isotherm is illustrated for normal butane, $C_4H_{10}$, in FIG. 15. This figure contrasts the adsorption isotherms for $C_4H_{10}$ in ZIF-7 at three temperatures, namely 301 K, 323 K and 348 K. As the temperature is increased from 301 K to 323 K, both the adsorption and desorption branches remain but are displaced to higher $C_4H_{10}$ pressures. As can further be seen in FIG. 15, when the temperature is further increased to 348 K, both the adsorption and desorption branches remain and are even further displaced to higher $C_4H_{10}$ pressures, thus confirming the temperature-activated nature of the adsorption process on solid adsorbents such as the ZIFs materials of the present invention. Just as the temperature can be increased to displace or even prevent the low to high adsorption loading transition for an adsorbate in a given pressure range (as shown above), the temperature can be alternatively decreased to cause such a low to high adsorption loading transition to take place for an adsorbate in a given pressure range or to displace such transition from a higher pressure to a lower pressure. Such interplay of pressure and temperature can be used to design advantageous swing adsorption schemes incorporating the present invention over a wide range of components pressures in the gaseous process feedstreams. It should be noted that although the experiments whose results are present in FIG. 15 above were only run on normal butane, $C_4H_{10}$, that similar effects are present on the ZIF materials for other $C_{2+}$ hydrocarbon compounds.

Figure 17:
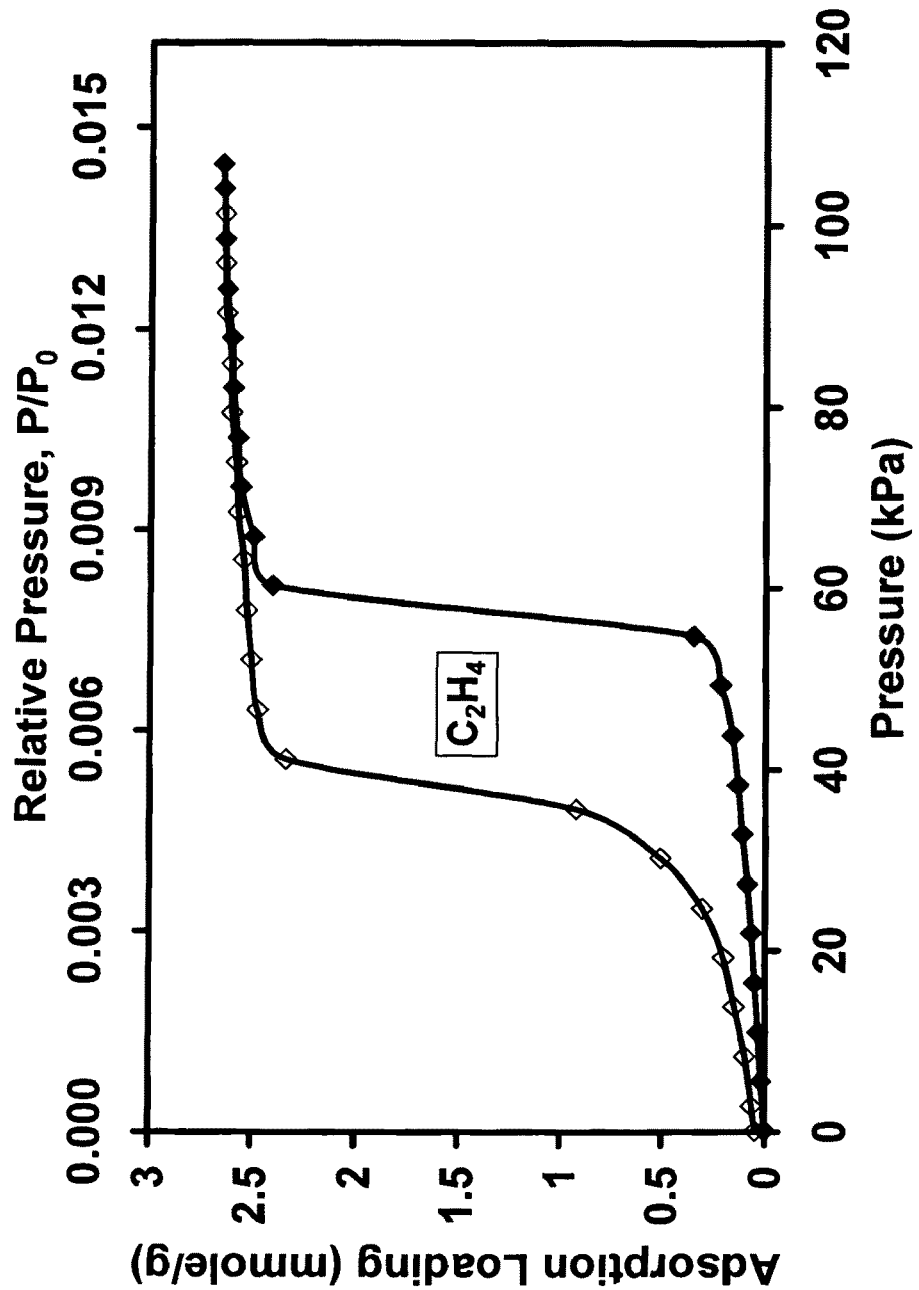
FIG. 17 shows the $C_2H_4$ (ethylene) adsorption isotherm at 301 K for a ZIF-9 sample of Example 7.

In a particular embodiment of the present invention, the temperature of the process feedstream is reduced prior to contacting the ZIF-containing adsorbent material. This embodiment is particularly beneficial when it is desired to separate a HHC compound from $CH_4$ in low pressure process feedstreams, especially when the temperatures of the process feedstream may be significant enough to appreciably shift the adsorption and desorption branches to higher pressures for the HHC compound to be separated from $CH_4$ than those experienced at lower temperatures. As can be seen from FIG. 13 herein, ZIF-7, for example, can achieve a significant separation of $C_2H_4$ from $CH_4$ at near ambient temperatures of about 28° C. (301 K) under low $C_2H_4$ partial pressures conditions of less than about 60 kPa. However, these adsorption/desorption branches shift to higher required partial pressures at elevated temperatures, as exemplified for normal butane, $C_4H_{10}$, as can be seen from FIG. 15. Conversely, by reducing the temperature of the process feedstream prior to contacting the ZIF-containing adsorbent material, significant separation of $C_2H_4$ from $CH_4$ can be achieved at very low pressures due to the corresponding shift of the adsorption and desorption branches to lower pressures. As described, this feature is not limited to $C_2H_4$, and it is noted that that similar characteristics are exhibited by ZIF-7 for other $C_{2+}$ hydrocarbons, such as but not limited to, $C_2H_6$ (ethane) and $C_3H_6$ (propylene). It should also be noted that similar characteristics are exhibited by the ZIF-9 material shown in Example 7, as well as seen in FIG. 17.

The characteristics, and swing process implications, of the unique adsorption isotherms shown for ZIF-7 in FIGS. 12 and 13 are also applicable to other ZIF materials having different compositions of matter, which exhibit similar energetic interactions with components such as $C_2H_4$ and $CH_4$. Thus, while ZIF-7 contains Zn as the single metal ion, ZIF-9 of Example 2, which contains Co as the single metal ion, also exhibits the advantages described herein for ZIF-7 in pressure swing adsorption processes. As described in Examples 1 and 2, both ZIF-7 and ZIF-9 have the same crystal framework structure, SOD. FIGS. 17 and 18 show the corresponding adsorption characterization data for ZIF-9. FIGS. 17 and 18 show that the transition from low to high adsorption loading occurs at a slightly higher $C_2H_4$ pressure in ZIF-9 (i.e., about 50 to 60 kPa) than in ZIF-7 (i.e., about 40 to 60 kPa) at the same temperature of 301 K. This difference between ZIF-9 and ZIF-7 primarily reflects some small differences in energetics between the corresponding adsorbate-adsorbent pairs but the overall adsorption characteristics are substantially the same. Interestingly, as shown by comparing FIGS. 14 and 19, the adsorptive loadings methane, $CH_4$, as well as the $C_{2+}$ hydrocarbon compounds tested, $C_2H_4$ (ethylene), $C_2H_6$ (ethane), $C_3H_6$ (propylene), $C_3H_8$ (propane), $C_4H_8$ (1-butene), and $C_4H_{10}$ (n-butane), are very similar for both ZIF-7 and ZIF-9. Thus, these results further illustrate the advantages and breadth of applications of the ZIFs materials of the present invention for separating gaseous mixtures containing HHC compounds and $CH_4$ through swing adsorption processes.

As discussed prior, a major need in the current industry is for effective gas phase processes for the separation of methane from HHC compounds (i.e., $C_{2+}$ hydrocarbons) in the recovery and production of natural gas from gas fields. While methane is a valuable hydrocarbon component for natural gas, almost all natural gas fields contain some level of higher carbon number hydrocarbons in the gas stream. In some instances, these higher carbon number hydrocarbons need to be removed in order for the natural gas to meet specifications for transport and sale of commercial natural gas products. Additionally, in some non-mutually exclusive instances, it is desired to separate higher carbon number hydrocarbons from the methane, wherein the higher carbon number hydrocarbons sold and/or utilized as more valuable products, such as LPG and other liquid petroleum hydrocarbons product streams. In the processing of natural gas, it is important to remove most of the $C_{2+}$ hydrocarbon materials from the processed natural gas to prevent liquefaction of the natural gas product stream during transportation and use.

Although the composition of the natural gas field streams produced from wells will vary from field to field, many of these natural gas field streams contain a large amount of methane, typically with methane concentrations of greater than about 25 mol %. In some instances these natural gas field streams can have a methane content greater than about 35 mol %, and in some instances the methane content can be even greater than about 50 mol %. In these latter instances, it is very economically attractive to be able to operate a cost efficient process for the separation of large volumes of methane from the natural gas field streams. Unless otherwise noted, all component concentrations expressed herein are on a water-free (dry) basis.

A significant problem that exists in the separation of HHC components from $CH_4$ in natural gas streams is that the natural gas streams are usually obtained from the gas fields under very high wellhead pressures. Typical natural gas recovery pressures usually range from about 500 psig (3,447 kPa) to up to about 5,000 psig (34,474 kPa). Since most PSA and TSA processes can be designed to produce a better separation at lower operating pressures (typically below about 500 psig (3,447 kPa) for the inlet stream in the adsorption step in the process), it is desirable to have adsorbent materials with high adsorptive loading ratios that can perform separations efficiently at higher pressures than conventionally performed. Although the swing adsorption processes of the present invention can run efficiently at inlet stream pressures of less than 250 psig (1,724 kPa), in other embodiments, PSA and TSA processes of the present invention can be operated at inlet stream pressures in excess of about 500 psig (3,447 kPa), or even about 1000 psig (6,895 kPa). Although an effluent stream pressure of less than about 250 psig (1,724 kPa) will normally be desired to maintain a good selectivity of the separation made, effluent stream pressures of greater than about 250 psig (1,724 kPa), or even greater than about 500 psig (3,447 kPa) may be obtained especially when utilizing a ZIF material with adsorptive loading ratios for a HHC component over $CH_4$ of greater than about 10. Maintaining the effluent stream at these higher pressures is economically desired to minimize the repressurization equipment and energy required to ship the purified natural gas via pipeline. Pipeline pressures for transport of the purified natural gas product stream are typically in the range of about 800 (5,516 kPa) to about 2000 psig (13,790 kPa).

The processes of the present invention can utilize the ZIF adsorption materials at these higher pressures by designing the swing adsorption processes to operate at higher temperatures to capture the benefits between the adsorption and desorption of HHCs (i.e., $C_{2+}$ hydrocarbons) in the ZIF material relative to $CH_4$. As described earlier, high adsorptive loading ratios can be maintained at increasing $CH_4$ partial pressures by operating the processes at higher temperatures that ensure operation of the system in the HHC transition from a low to a high adsorption loading state while simultaneously preventing such transition for $CH_4$. Due to the temperature-activated nature of the adsorption processes (see FIG. 15), which is an intrinsic feature to any adsorbate-adsorbent pair, increasing temperature displaces the transition for both an HHC component (e.g., ethylene, ethane, or propylene) and $CH_4$ to higher pressures while keeping substantially the same adsorptive loading ratio for the HHC component over $CH_4$.

An additional benefit of the current processes is that the PSA adsorption process can be operated at very low pressures if required. The results presented in FIGS. 12 and 13 for ZIF-7 and FIGS. 17 and 18 for ZIF-9, which exemplify the ZIF materials of the present invention, clearly show their adequacy for low pressure operation. In other preferred embodiments of adsorption processes of the present invention, the hydrocarbon feed streams contact the ZIF or ZIF-containing adsorbent material at a suitably chosen temperature and process feedstream pressures of less than about 100 psia (690 kPaa). In other embodiments, the hydrocarbon feed streams contact the ZIF or ZIF-containing adsorbent material at a suitably chosen temperature and process feedstream pressures of less than about 50 psia (345 kPaa) or even less than about 30 psia (207 kPaa). The ability of the present swing adsorption processes to make such a substantial separation of methane from $C_{2+}$ hydrocarbon compounds is very attractive especially in such processes as LPG recovery where the process streams may be available at relatively low pressures.

As can be seen from FIG. 15, in addition to the pressure level of the stream, the temperature level is also critical to the designing a swing adsorption process for optimum separation. As the pressure level decreases, the temperature can also be optionally decreased in order to ensure a significant loading of the adsorbate on the adsorbent material. As discussed prior, this characteristic of the ZIF-containing adsorbent materials can be significant in low-pressure applications of the present invention such as separating HHCs from $CH_4$ present in hydrocarbon feed streams where the pressures may be relatively low as noted above. However, the temperatures at which these hydrocarbon feed streams are produced may be significantly high enough to shift the adsorption/desorption branches to HHC partial pressures above those required for optimum separations at low pressures. Therefore, in an embodiment of the present invention, the temperature of hydrocarbon feed stream is reduced prior to contacting the ZIF-containing adsorbent material. In this manner, the compression required to raise the hydrocarbon feed stream to optimum separation conditions for the present invention can be minimized, and in certain embodiments, the need for compression equipment to raise the pressure of the feedstream to the processes of the present invention may be completely eliminated.

With regard to high loadings at low pressures, for example, the sample of ZIF-7 from Example 1 and its corresponding adsorption loading at 301 K and 106.6 kPa from Example 6 shows an extremely large capacity for ethylene of about 2.60 mmole/g of ethylene at these substantially atmospheric pressure and temperature conditions (see FIG. 14). Similarly, the sample of ZIF-9 from Example 2 and its corresponding adsorption loading at 301 K and 106.6 kPa from Example 7 shows a large capacity for ethylene of about 2.65 mmole/g of ethylene at these substantially atmospheric pressure and temperature conditions (see FIG. 19). As discussed prior, ZIF materials, such as ZIF-7 and ZIF-9, can be valuable adsorbent materials for low pressure PSA, TSA, and PSA/TSA processes.

In a preferred embodiment of the process of the present invention, a hydrocarbon feed stream is provided to a swing adsorption process wherein the adsorbent material in the swing adsorption process is comprised of a ZIF material that has adsorptive loading ratio for an HHC component over $CH_4$ of at least about 5 to remove at least a portion of the HHC from the hydrocarbon feed stream. In a more preferred embodiment of the present invention, a hydrocarbon feed stream is provided to a swing adsorption process wherein the adsorbent material in the swing adsorption process is comprised of a ZIF material that has adsorptive loading ratio for an HHC component over $CH_4$ of at least about 10 to remove at least a portion of the HHC component from the hydrocarbon feed stream. In an even more preferred embodiments of the present invention, the ZIF material utilized in this process has an adsorptive loading ratio for an HHC component over $CH_4$ of at least about 20. In other preferred embodiments as described above, the HHC component is selected from ethylene, ethane, and propylene. In more preferred embodiments as described above, the HHC component is ethylene. In another more preferred embodiments as described above, the HHC component is ethane.

It should be noted that although the processes of the present invention for separation of HHC compounds from $CH_4$ in hydrocarbon process feedstreams have been explained above in terms of a swing adsorption configuration, the ZIF-containing membranes described above may also be utilized under similar process inlet conditions to selectively separate HHC compounds from $CH_4$, and produce similar composition product streams as disclosed in the swing adsorption process embodiments above. In the processes utilizing ZIF-containing membranes to separate a HHC compound from $CH_4$ in a process feedstream containing both components, it is desirable that the HHC compound selectively permeates through the ZIF-containing membrane process producing at least one $CH_4$-rich retentate stream wherein the $CH_4$-rich retentate stream has a higher mol % of $CH_4$ than the process feedstream that contacts the ZIF-containing membrane. Additionally, at least one $CH_4$-lean permeate stream is also produced by the process wherein the $CH_4$-lean permeate stream has a lower mol % of $CH_4$ than the process feedstream. The stream compositions, separations selectivities and properties of the final products produced by the ZIF-containing membrane process embodiments of the present invention are similar to those identified in the swing adsorption process embodiments described above.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

The Examples below are provided to illustrate the synthesis and the adsorption properties of a few select zeolitic imidazolate framework materials to illustrate the benefits of the present invention. These Examples only illustrate specific embodiments of the present invention and are not meant to limit the scope of the current invention.

EXAMPLES

In the following Examples 1 through 5, small amounts of Zeolitic Imidazolate Frameworks (or "ZIFs") samples were synthesized for use in testing for adsorption and separations processes that are described in detail in Examples 6 through 10. ZIFs are a unique type of microporous crystalline structures having framework topologies commonly found in zeolites and/or in other crystalline materials wherein each vertex is comprised of a single metal ion and each pair of connected adjacent vertices of the framework structure are linked by the nitrogen atoms of an imidazolate anion or its derivative. Each ZIF material with a specific type of solvent occluded is characterized by a unique X-ray diffraction pattern. However, due to the porous and flexible nature of ZIF framework structures, the X-ray diffraction pattern can be altered upon solvent-exchange or desolvation. The ZIF materials used in the gas adsorption screening studies were prepared according to published procedures with slight modifications in reaction scale and/or sample activation; see reference Park, K. S.; Ni, Z.; Côté, A. P.; Choi, J. Y.; Huang, R.; Uribe-Romo, F. J.; Chae, H. K.; O'Keeffe, M.; Yaghi, O. M. *Proc. Natl. Acad. Sci. U.S.A.* 2006, 103, 10186-10191, which is incorporated herein by reference and herein referred to as the "Park Reference".

The examples of ZIF materials provided herein are not meant to be limiting of the present invention in any manner. The general synthesis and structural characterization of some of the ZIF materials applicable to the present invention are presented in United States Patent Publication No. US2007/0202038A1 which is herein incorporated by reference.

Detailed synthesis procedures are described below in Examples 1 through 5 for selected ZIF materials.

Example 1

In this example, a ZIF-7 material was synthesized. The framework of ZIF-7 has a chemical composition of $ZnL_2$ (wherein L=benzimidazolate, i.e., the anion of benzimidazole) and a topology defined by the Zn cations that is identical to the zeolitic framework type SOD. SOD is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-7 material, 9.00 g of zinc nitrate tetrahydrate ($Zn(NO_3)_2 \cdot 4H_2O$, 34.4 mmol) and 3.00 g of Benzimidazole (25.4 mmol) were dissolved in 900 ml DMF (N,N-Dimethylformamide) in a 1 liter glass jar. The jar was tightly capped and the reaction mixture was heated in an isothermal oven at 373 K for 48 hours. After reaction, the mother liquor was decanted. The solid crystallized on the side wall and the bottom part of the jar was collected, washed with and stored in DMF and labeled "as-synthesized ZIF-7".

In order to activate the ZIF-7, the as-synthesized solid was heated under vacuum at 473 K for 24 hours, transferred to a 120 ml vial, immersed in acetonitrile (c.a. 100 ml) and soaked at 348 K for 48 hours. The acetonitrile-exchange ZIF-7 was loaded in a glass tube and evacuated on a vacuum line apparatus at room-temperature for 16 hours to remove the solvent molecules residing in its pores. 2.10 g of activated ZIF-7 was obtained, corresponding to 55% yield (based on Benzimidazole).

For gas adsorption experiments, the acetonitrile-exchanged ZIF-7 was loaded directly in the sample holder of the gravimetric gas-adsorption unit and activated in-situ by using the conditions described in Example 6.

FIG. 1 shows a comparison of the experimental powder X-ray diffraction ("PXRD") patterns of the as-synthesized and the acetonitrile-exchanged ZIF-7 samples and the calculated PXRD pattern (shown as the stick pattern) based on the single crystal structure of ZIF-7 reported in the "Park Reference" as referenced herein. The PXRD patterns as shown in FIG. 1 are plotted as the diffraction intensity (in arbitrary units) against the diffraction angle two theta (in degrees).

The high purity of the as-synthesized ZIF-7 sample is evidenced by the coincidence of experimental and calculated PXRD patterns. It is worth noting the slight differences between the two experimental PXRD patterns of ZIF-7. The pattern of as-synthesized ZIF-7 is indexed to rhombohedral space group $R\bar{3}$, a=b=22.927 Å, c=15.603 Å whereas the pattern of acetonitrile-exchanged ZIF-7 is indexed to the same space group with a=b=22.522 Å and c=15.760 Å. The data suggest a slight distortion of the unit cell of ZIF-7 upon solvent-exchange.

Figure 2:
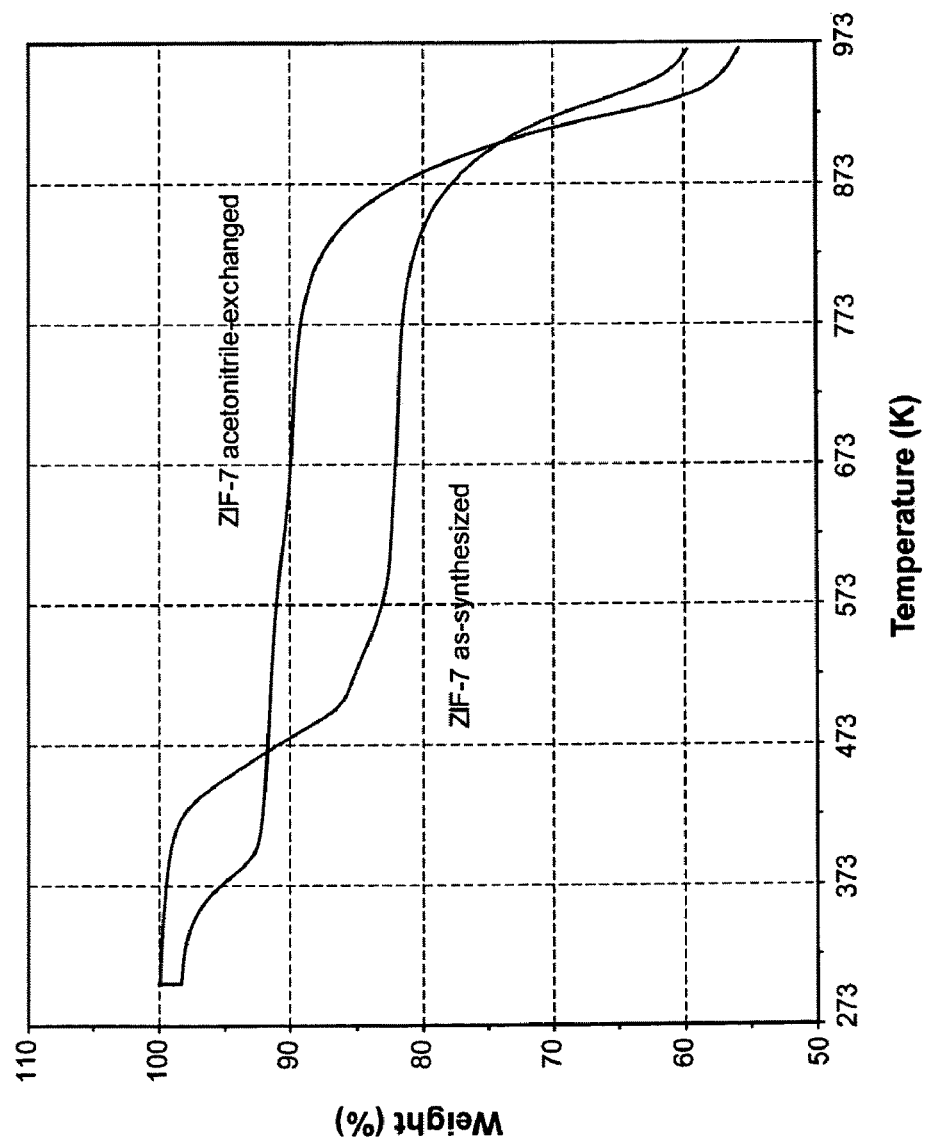
FIG. 2 shows the thermogravimetric analyses ("TGA"s) for the as-synthesized and acetonitrile-exchanged ZIF-7 samples of Example 1 herein.

FIG. 2 shows the thermogravimetric analyses ("TGA") for the as-synthesized and the acetonitrile-exchanged ZIF-7 samples in nitrogen atmosphere. The activation conditions described above were chosen based on TGA data.

Figure 11:
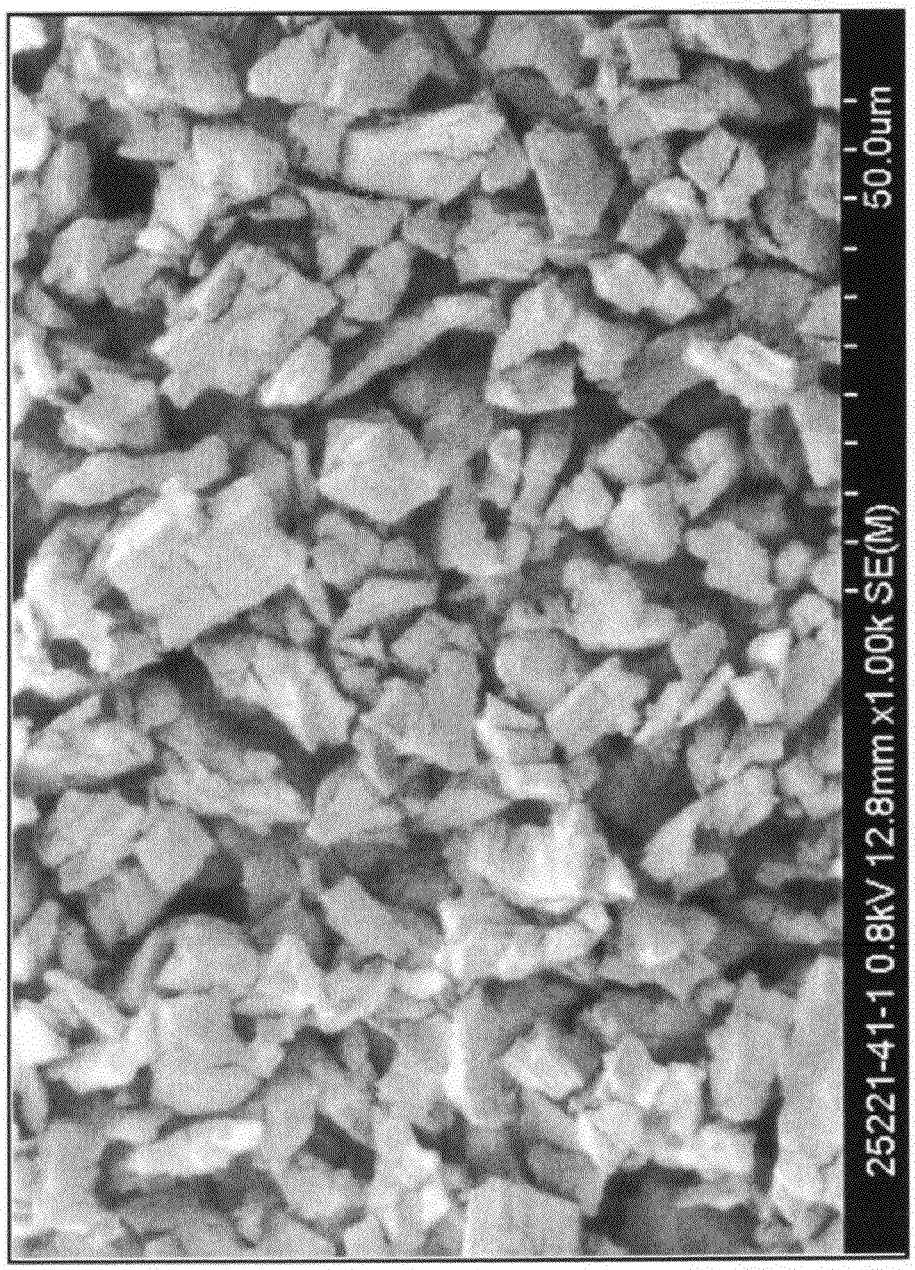
FIG. 11 is a Scanning Electron Microscopy ("SEM") image of a ZIF-7 sample of Example 6.

FIG. 11 is a Scanning Electron Microscopy ("SEM") image of a sample of ZIF-7 produced.

Example 2

In this example, a ZIF-9 material was synthesized. The framework of ZIF-9 has a chemical composition of $CoL_2$ (wherein L=benzimidazolate, i.e., the anion of benzimidazole) and a topology defined by the Co cations that is identical to the zeolitic framework type SOD. SOD is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-9 material, 1.26 g of cobalt nitrate hexahydrate ($Co(NO_3)_2 \cdot 6H_2O$, 4.33 mmol) and 0.360 g of Benzimidazole (3.05 mmol) were dissolved in 108 ml DMF (N,N-Dimethylformamide) in a 120 ml vial. The vial was tightly capped and the reaction mixture was heated in an isothermal oven at 373 K for 96 hours. After reaction, the mother liquor was decanted. The solid crystallized on the side wall and the bottom part of the jar was collected, washed with and stored in DMF and labeled "as-synthesized ZIF-9".

In order to activate the ZIF-9, the as-synthesized solid was heated under vacuum at 473 K for 24 hours, transferred to a 20 ml vial, immersed in acetonitrile (c.a. 15 ml) and soaked at 348 K for 48 hours. The acetonitrile-exchanged ZIF-9 was loaded in a glass tube and evacuated on a vacuum line apparatus at room-temperature for 16 hours to remove the solvent molecules residing in its pores. 0.07 g of activated ZIF-9 was obtained, corresponding to 15% yield (based on Benzimidazole).

For gas adsorption experiments, the acetonitrile-exchanged ZIF-9 was loaded directly in the sample holder of the gravimetric gas adsorption unit and activated in-situ by using the conditions described in Example 7.

Figure 3:
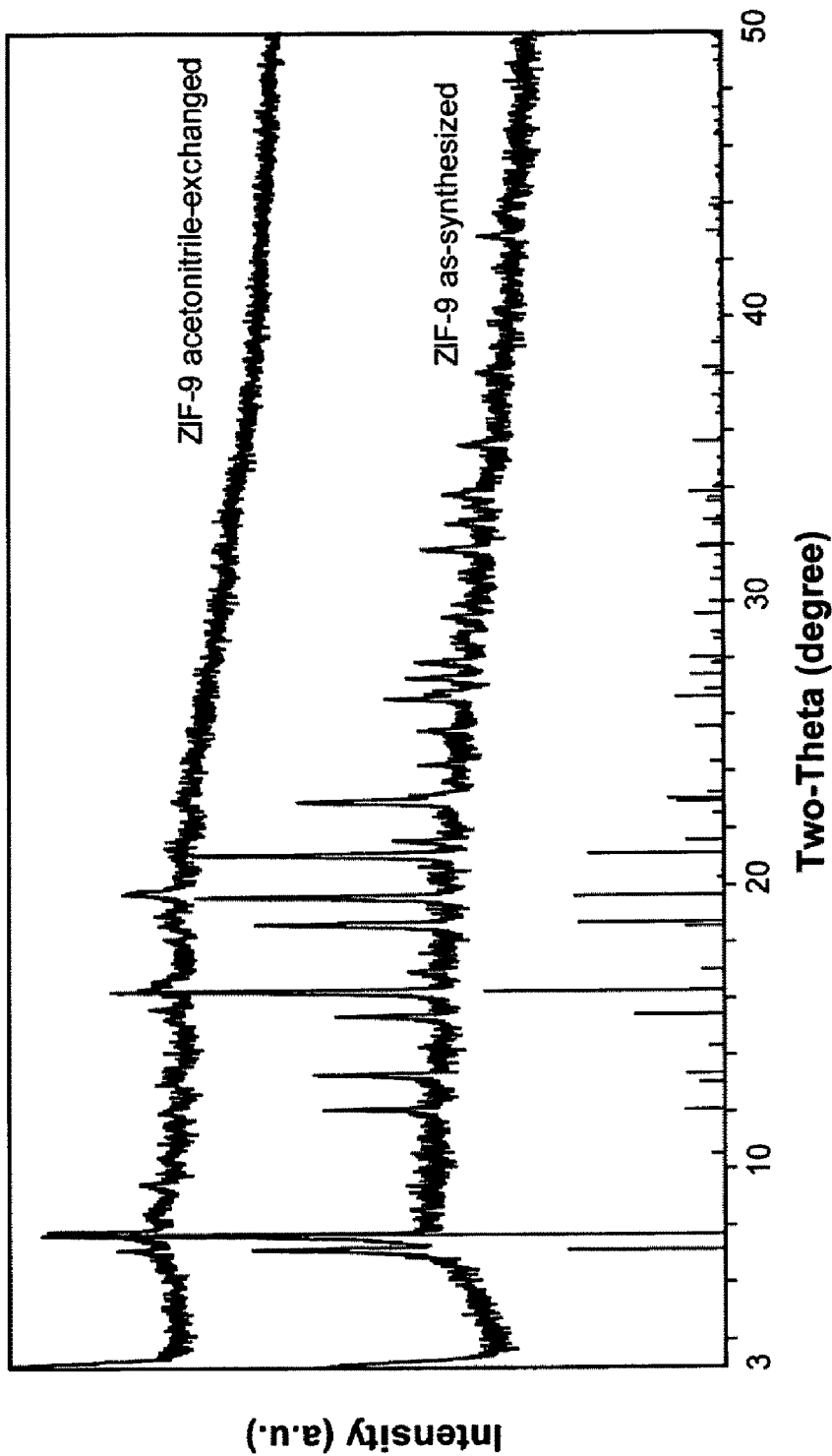
FIG. 3 is the experimental powder X-ray diffraction ("PXRD") patterns of the as-synthesized and acetonitrile-exchanged ZIF-9 samples of Example 2 herein. The calculated PXRD pattern (shown as the vertical stick patterns in the figure) for ZIF-9 based on the single crystal structure of ZIF-9 reported in the "Park Reference" as referenced herein is also shown in the figure.

FIG. 3 shows a comparison of the experimental powder X-ray diffraction ("PXRD") patterns of the as-synthesized and the acetonitrile-exchanged ZIF-9 samples and the calculated PXRD pattern (shown as the stick pattern) based on the single crystal structure of ZIF-9 reported in the "Park Reference" as referenced herein. The PXRD patterns as shown in FIG. 3 are plotted as the diffraction intensity (in arbitrary units) against the diffraction angle two theta (in degrees).

The high purity of the as-synthesized ZIF-9 sample is evidenced by the coincidence of experimental and calculated PXRD patterns. The relatively large background in the PXRD pattern of the as-synthesized ZIF-9 sample cannot be attributed to the existence of amorphous impurities because only purple cubic crystals are observed within the sample by optical microscopy. The PXRD data suggests that Co-containing ZIF-9 is intrinsically of lower crystallinity when compared to its isomorphous Zn-containing material ZIF-7 (comparing FIGS. 1 and 3).

Figure 4:
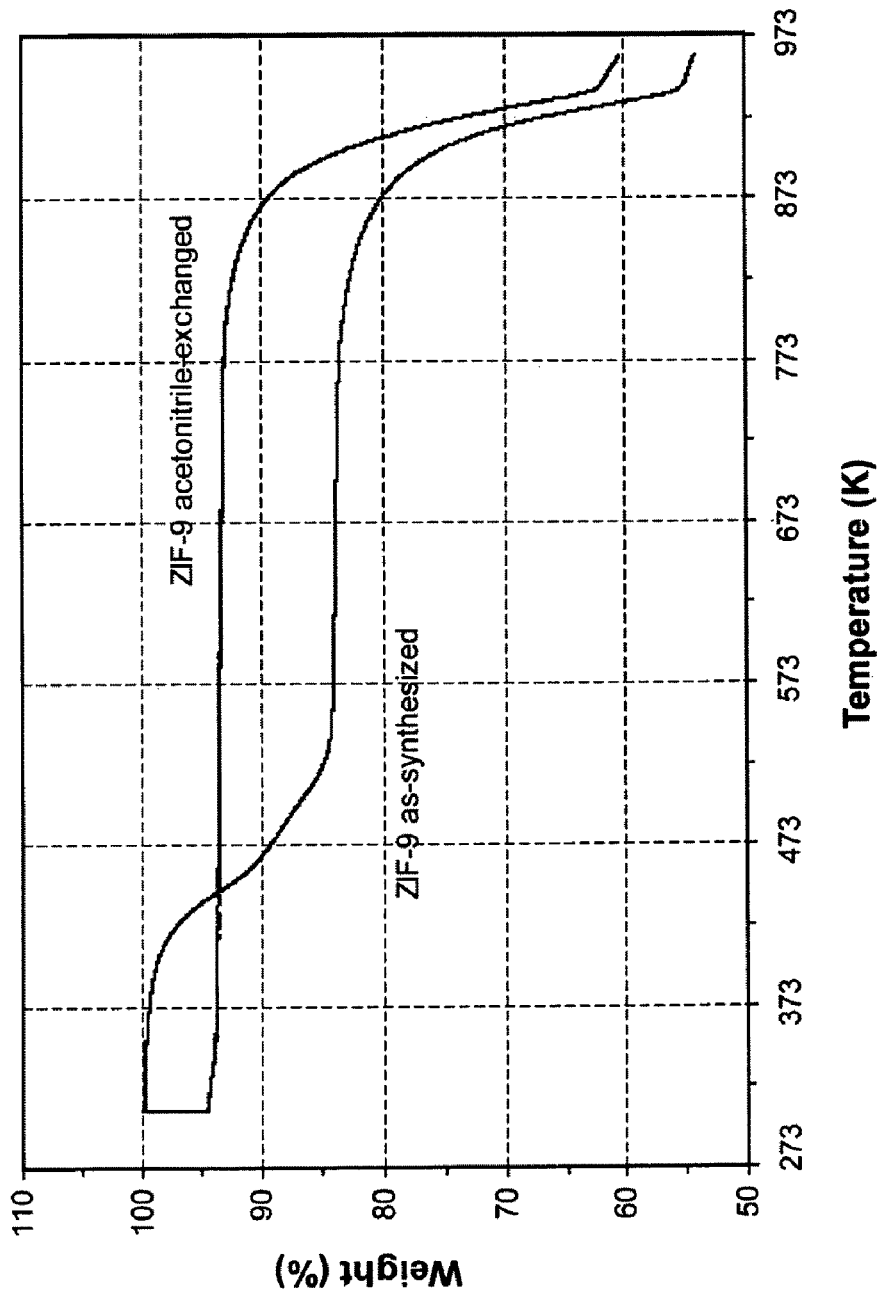
FIG. 4 shows the thermogravimetric analyses ("TGA"s) for the as-synthesized and acetonitrile-exchanged ZIF-9 samples of Example 2 herein.

FIG. 4 shows the thermogravimetric analyses ("TGA") for the as-synthesized and the acetonitrile-exchanged ZIF-9 samples in nitrogen atmosphere. The activation conditions described above were chosen based on TGA data.

Figure 16:
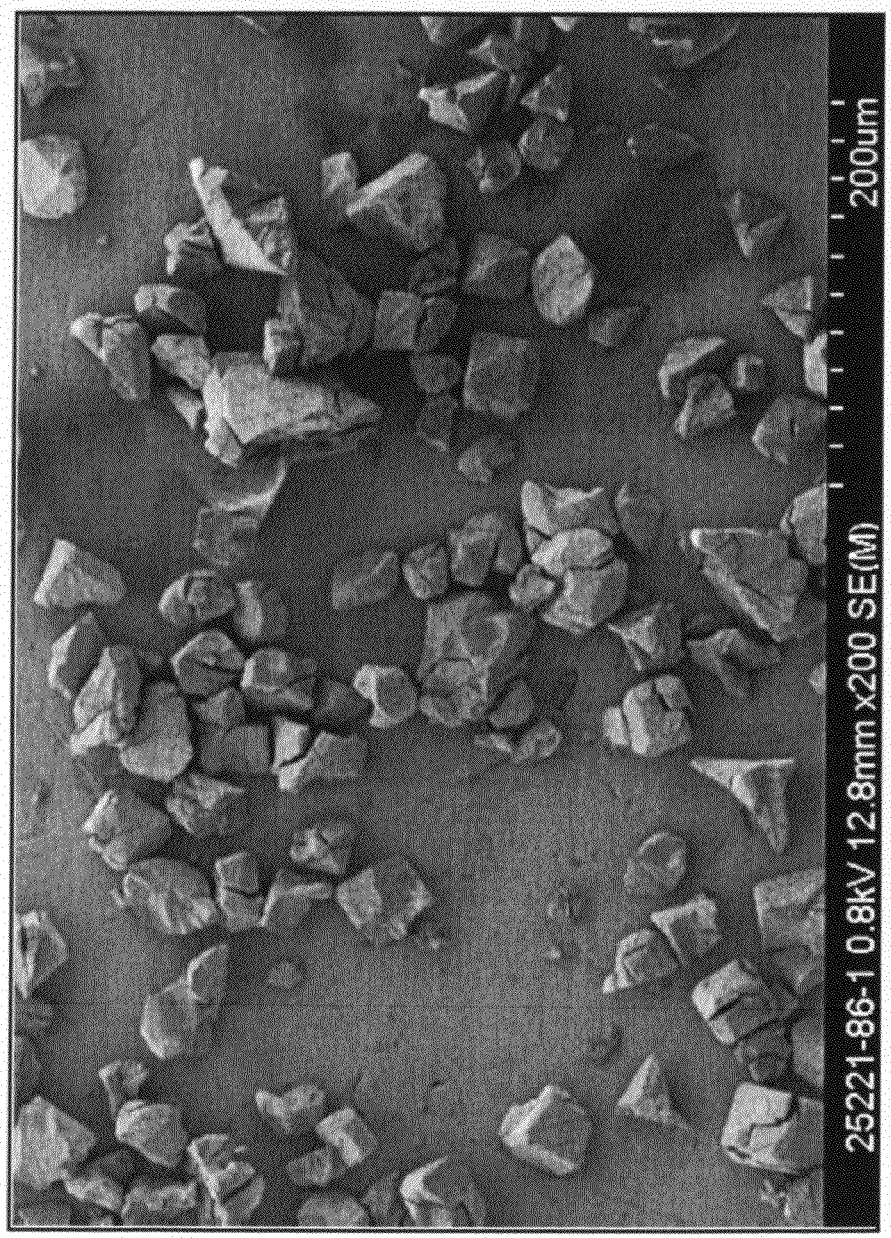
FIG. 16 is a Scanning Electron Microscopy ("SEM") image of a ZIF-9 sample of Example 7.

FIG. 16 is a Scanning Electron Microscopy ("SEM") image of a sample of ZIF-9 produced.

Example 3

In this example, a ZIF-1 material was synthesized. The framework of ZIF-1 has a chemical composition of $ZnL_2$ (wherein L=imidazolate, i.e., the anion of imidazole) and a topology defined by the Zn cations that is identical to the zeolitic framework type BCT. BCT is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-1 material, 1.25 g of zinc nitrate tetrahydrate ($Zn(NO_3)_2 \cdot 4H_2O$, 4.77 mmol) and 2.75 g of Imidazole (40.4 mmol) were dissolved in 100 ml DMAc (N,N-Dimethylacetamide) in a 120 ml glass vial. The vial was tightly capped and the reaction mixture was heated in an isothermal oven at 358 K for 72 hours. After reaction, the mother liquor was decanted. The solid crystallized on the side wall and the bottom part of the vial was collected and washed with DMF (N,N-Dimethylformamide) to remove any residual mother liquor. The product was then transferred to a 20 ml vial, stored in DMF and labeled "as-synthesized ZIF-1".

In order to activate the ZIF-1, the as-synthesized solid was immersed in acetonitrile (c.a. 15 ml) for a total of 72 hours. The solvent volume was replaced every 24 hours. The acetonitrile-exchanged ZIF-1 was loaded in a glass tube and evacuated on a vacuum line apparatus at room temperature for 16 hours to remove the solvent molecules residing in its pores. 0.13 g of activated ZIF-1 was obtained, corresponding to 14% yield (based on zinc nitrate tetrahydrate). Alternatively, the as-synthesized ZIF-1 was activated by exchanging with toluene followed by heating under vacuum at 443 K for 2 hours.

For gas adsorption experiments, the acetonitrile-exchanged or toluene-exchanged ZIF-1 was loaded directly in the sample holder of the gravimetric gas adsorption unit and activated in-situ by using the conditions described in Example 8.

Figure 5:
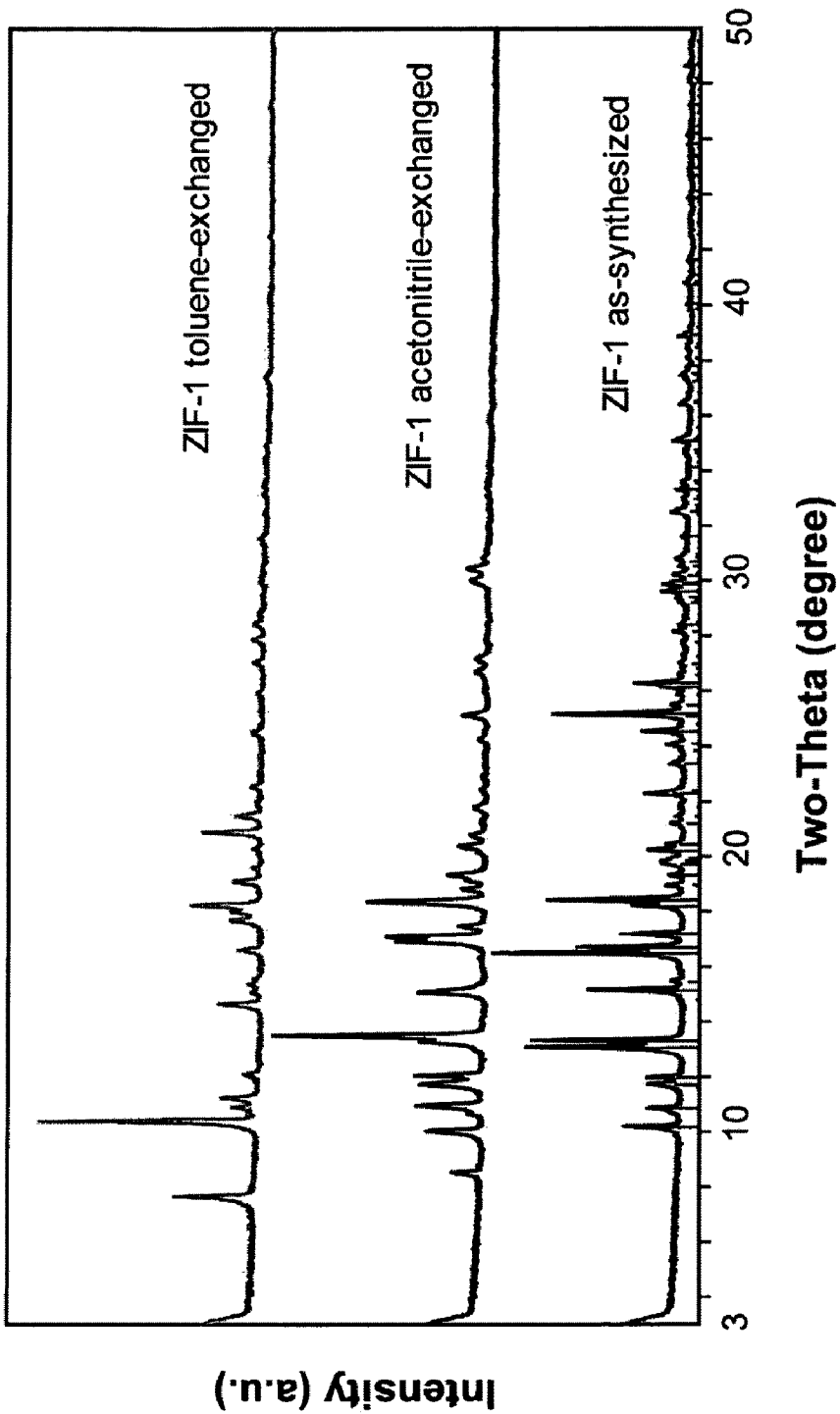
FIG. 5 is the experimental powder X-ray diffraction ("PXRD") patterns of the as-synthesized, the acetonitrile-exchanged and the toluene-exchanged ZIF-1 samples of Example 3 herein. The calculated PXRD pattern (shown as the vertical stick patterns in the figure) for ZIF-1 based on the single crystal structure of ZIF-1 reported in the "Park Reference" as referenced herein is also shown in the figure.

FIG. 5 shows a comparison of the experimental powder X-ray diffraction ("PXRD") patterns of the as-synthesized, the acetonitrile-exchanged and the toluene-exchanged ZIF-1 samples and the calculated PXRD pattern (shown as the stick pattern) based on the single crystal structure of ZIF-1 reported in the "Park Reference" as referenced herein. The PXRD patterns as shown in FIG. 5 are plotted as the diffraction intensity (in arbitrary units) against the diffraction angle two theta (in degrees).

The high purity of the as-synthesized ZIF-1 sample is evidenced by the coincidence of experimental and calculated PXRD patterns. It is worth noting the differences between the three experimental PXRD patterns of ZIF-1. The pattern of as-synthesized ZIF-1 is indexed to monoclinic space group $P2_1/c$, a=9.699 Å, b=15.185 Å, c=16.555 Å, $\beta$=116.9° whereas the pattern of acetonitrile-exchanged ZIF-1 is indexed to the same space group with a=10.098 Å, b=14.649 Å, c=17.300 Å, $\beta$=119.5° and pattern of toluene-exchanged ZIF-1 is indexed to a space group of orthorhombic symmetry Pnn2 with a=15.708 Å. b=9.455 Å, c=16.969 Å. The data suggest distortions of the unit cell of ZIF-1 upon solvent-exchange. We point out that high-symmetry analog of ZIF-1 does exist. The single crystal structure of such a component was reported in the "Park Reference" as referenced herein (ZIF-2 having the same framework topology as ZIF-1, orthorhombic, Pbca, a=9.679 Å. b=24.114 Å, c=24.450 Å).

Figure 6:
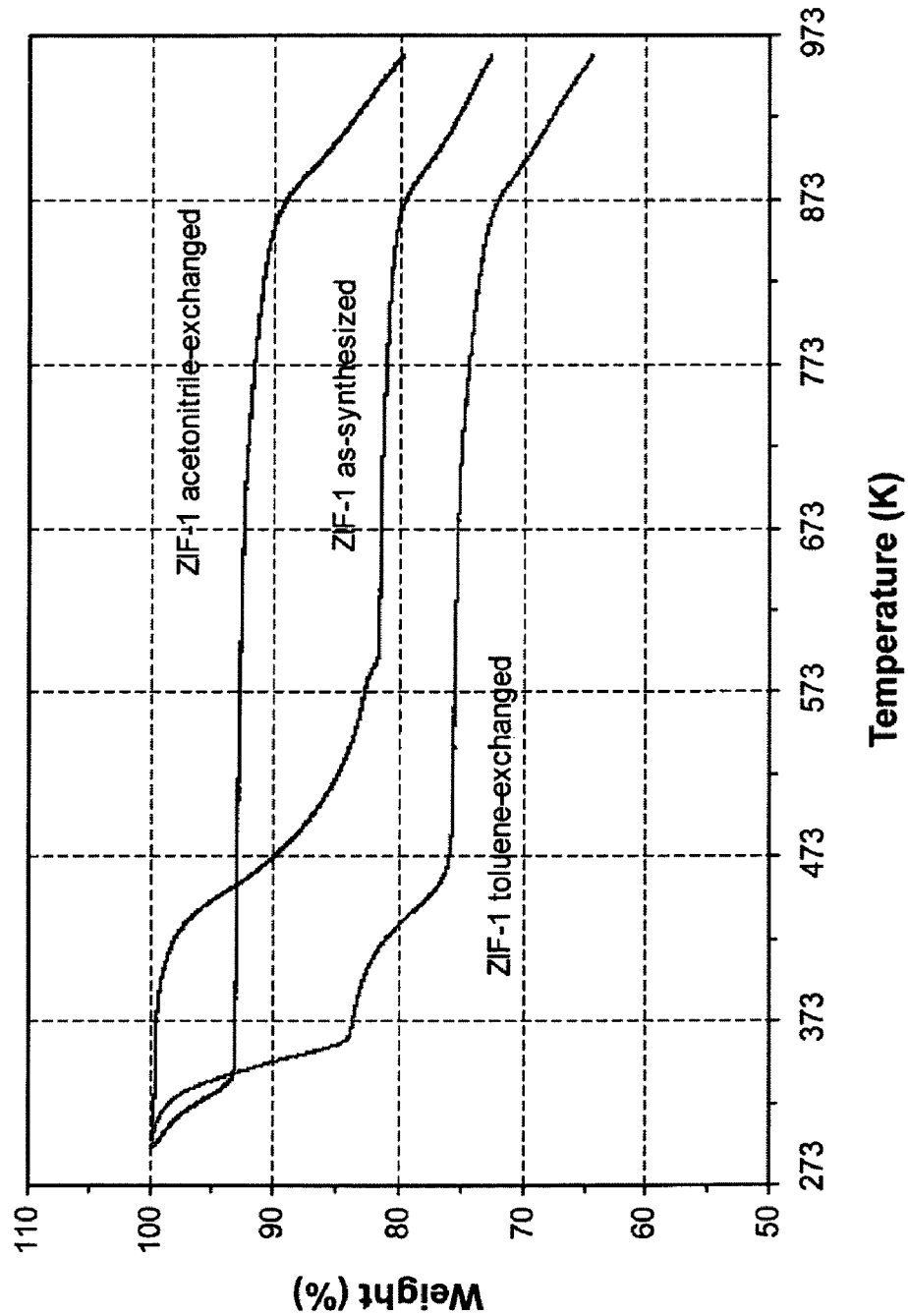
FIG. 6 shows the thermogravimetric analyses ("TGA"s) for the as-synthesized, the acetonitrile-exchanged and the toluene-exchanged ZIF-1 samples of Example 3 herein.

FIG. 6 shows the thermogravimetric analyses ("TGA") for the as-synthesized, the acetonitrile-exchanged and the toluene-exchanged ZIF-1 samples in nitrogen atmosphere. The activation conditions described above were chosen based on TGA data.

Figure 20:
FIG. 20 is a Scanning Electron Microscopy ("SEM") image of a ZIF-1 (acetonitrile-exchanged) sample of Example 8.
Figure 21:
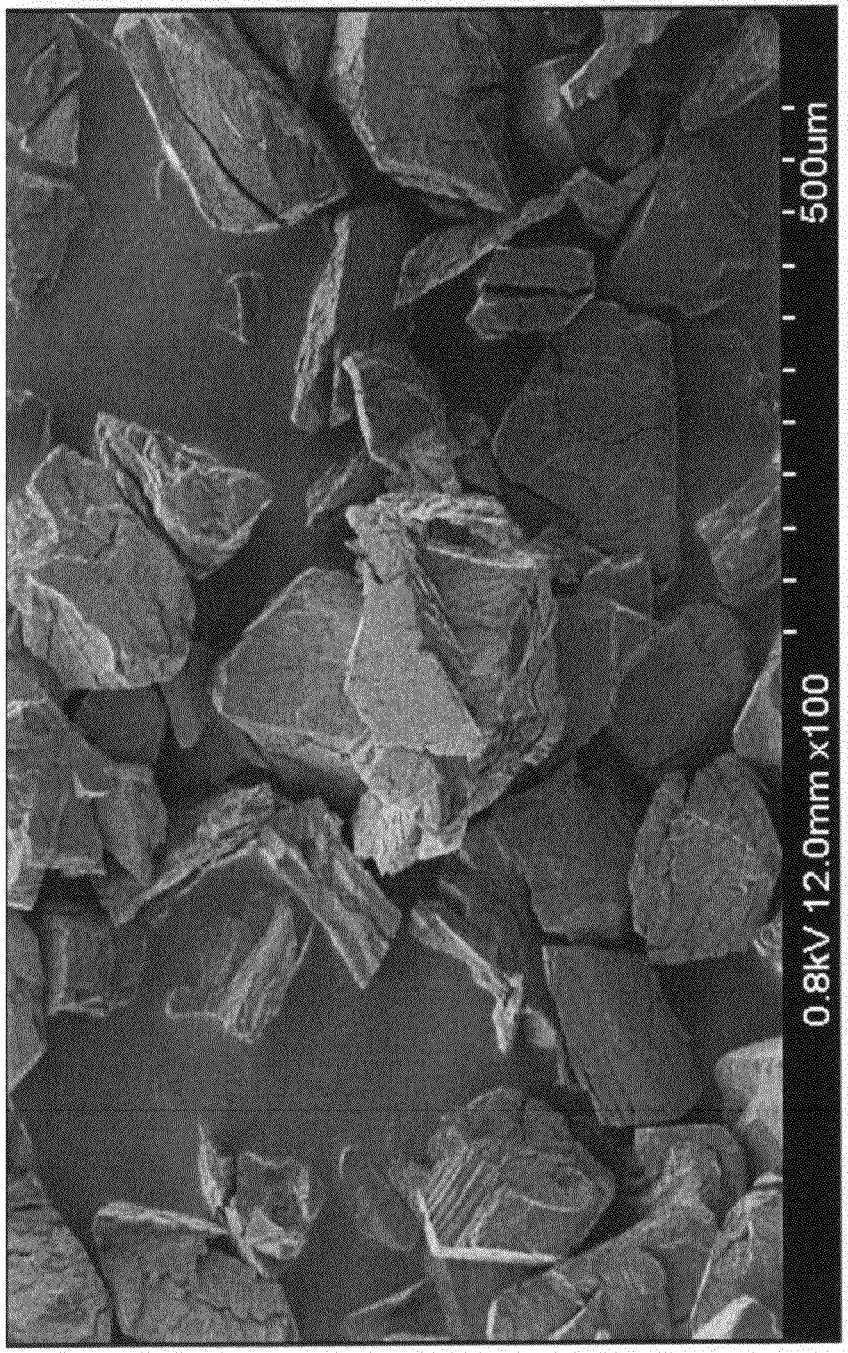
FIG. 21 is a Scanning Electron Microscopy ("SEM") image of a ZIF-1 (toluene-exchanged) sample of Example 8.

FIG. 20 is a Scanning Electron Microscopy ("SEM") image of a sample of ZIF-1 (acetonitrile-exchanged) produced. FIG. 21 is a Scanning Electron Microscopy ("SEM") image of a sample of ZIF-1 (toluene-exchanged) produced.

Example 4

In this example, a ZIF-11 material was synthesized. The framework of ZIF-11 has a chemical composition of $ZnL_2$ (wherein L=benzimidazolate, i.e., the anion of benzimidazole) and a topology defined by the Zn cations that is identical to the zeolitic framework type RHO. RHO is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-11 material, 0.330 g of zinc nitrate hexahydrate ($Zn(NO_3)_2 \cdot 6H_2O$, 1.11 mmol) and 0.990 g of Benzimidazole (8.38 mmol) were dissolved in 100 ml DEF (N,N-Diethylformamide) in a 120 ml glass vial. The vial was tightly capped and the reaction mixture was heated in an isothermal oven at 373 k for 96 hours. After reaction, the mother liquor was decanted. The solid crystallized on the side wall and the bottom part of the vial was collected and washed with DMF (N,N-Dimethylformamide) repeatedly to remove any residual mother liquor and an amorphous by-product. The product was then transferred to a 20 ml vial and the DMF solvent was decanted. After the addition of chloroform (c.a. 15 ml), the vial was capped and the mixture was immersed in an ultrasonic bath for 30 minutes to mechanically detach an unidentified dense-phase from the surfaces of ZIF-11 crystals. Two layers of solids appeared after the vial sat on a level surface undisturbed for 30 minutes. The solid layer floating on the surface of chloroform was carefully collected using a pipette and transferred to another 20 ml vial. The solid was washed with and stored in DMF and labeled "purified ZIF-11".

In order to activate the ZIF-11, the purified solid was immersed in methanol (c.a. 15 ml) for a total of 72 hours. The solvent volume was replaced every 24 hours. The methanol-exchanged ZIF-11 was loaded in a glass tube and evacuated on a vacuum line apparatus. After the removal of external methanol solvent at room temperature, the solid was heated under vacuum at 423 K for 16 hours to remove the solvent molecules residing in the pores of the ZIF-11. A 0.09 g sample of activated ZIF-11 was thus obtained, corresponding to 27% yield (based on zinc nitrate hexahydrate).

For gas adsorption experiments, the methanol-exchanged ZIF-11 was loaded directly in the sample holder of the gravimetric gas adsorption unit and activated in-situ by using the conditions described in Example 9.

Figure 7:
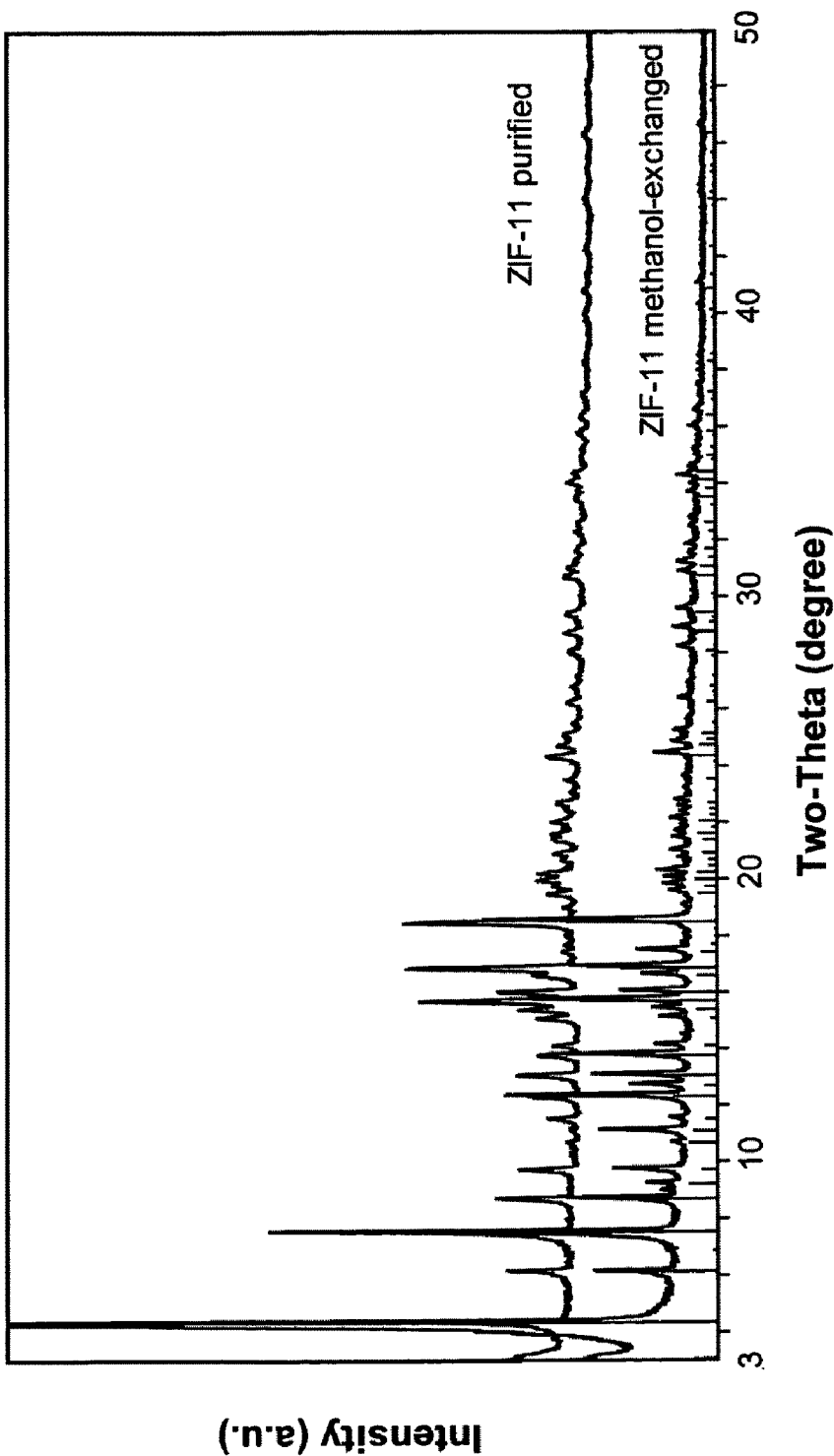
FIG. 7 is the experimental powder X-ray diffraction ("PXRD") patterns of the purified and methanol-exchanged ZIF-11 samples of Example 4 herein. The calculated PXRD pattern (shown as the vertical stick patterns in the figure) for ZIF-11 based on the single crystal structure of ZIF-11 reported in the "Park Reference" as referenced herein is also shown in the figure.

FIG. 7 shows a comparison of the experimental powder X-ray diffraction ("PXRD") patterns of the purified and the methanol-exchanged ZIF-11 samples and the calculated PXRD pattern (shown as the stick pattern) based on the single crystal structure of ZIF-11 reported in the "Park Reference" as referenced herein. The PXRD patterns as shown in FIG. 7 are plotted as the diffraction intensity (in arbitrary units) against the diffraction angle two-theta (in degrees).

The high purity of the sample is evidenced by the coincidence of experimental and calculated PXRD patterns. It is worth noting the slight differences between the two experimental PXRD patterns of ZIF-11. After methanol-exchange, the intensities of the diffraction peaks were altered and the peak positions were systematically shifted to higher two-theta angle (in degrees).

Figure 8:
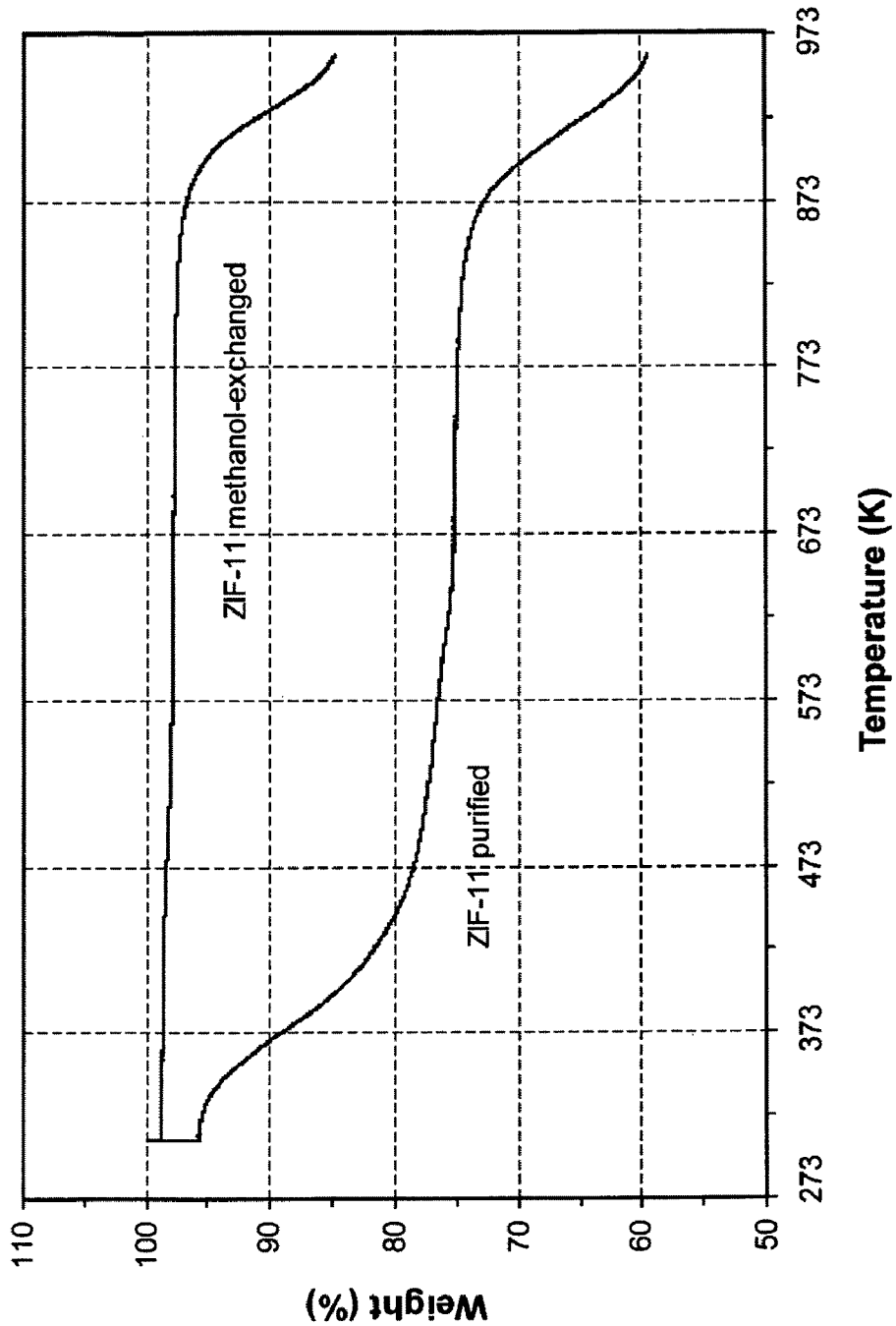
FIG. 8 shows the thermogravimetric analyses ("TGA"s) for the purified and methanol-exchanged ZIF-11 samples of Example 4 herein.

FIG. 8 shows the thermogravimetric analyses ("TGA") for the purified and the methanol-exchanged ZIF-11 samples in nitrogen atmosphere. The activation conditions described above were chosen based on TGA data.

Figure 24:
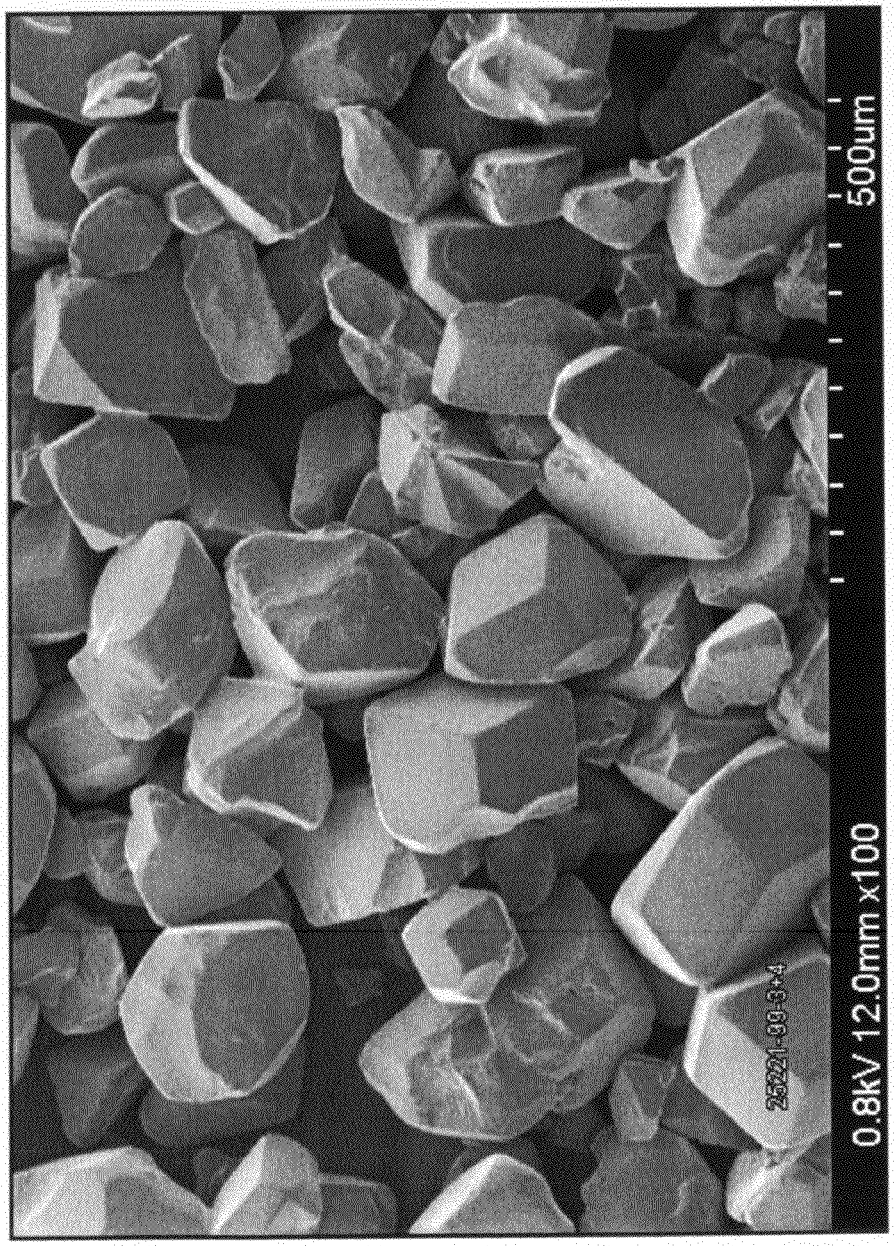
FIG. 24 is a Scanning Electron Microscopy ("SEM") image of a ZIF-11 sample of Example 9.

FIG. 24 is a Scanning Electron Microscopy ("SEM") image of a sample of ZIF-11 produced.

Example 5

In this example, a ZIF-8 material was synthesized. The framework of ZIF-8 has a chemical composition of $ZnL_2$ (wherein L=2-Methylimidazolate, i.e., the anion of 2-Methylimidazole) and a topology defined by the Zn cations that is identical to the zeolitic framework type SOD. SOD is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-8 material, 10.50 g of zinc nitrate tetrahydrate ($Zn(NO_3)_2 \cdot 4H_2O$, 40.2 mmol) and 3.00 g of 2-Methylimidazole (36.5 mmol) were dissolved in 900 ml DMF (N,N-Dimethylformamide) in a 1 liter glass jar. The jar was tightly capped and the reaction mixture was heated in an isothermal oven at 413 K for 24 hours. After reaction, the mother liquor was decanted. The solid crystallized on the side wall and the bottom part of the jar was collected and washed with DMF repeatedly to remove any residual mother liquor and an amorphous by-product. The product was then transferred to a 120 ml vial and the DMF solvent was decanted. After the addition of chloroform (c.a. 100 ml), the vial was capped and the mixture was immersed in an ultrasonic bath for 30 minutes to mechanically detach zinc oxide particles from the surfaces of ZIF-8 crystals. Two layers of solids appeared after the vial sat on a level surface undisturbed for 30 minutes. The solid layer floating on the surface of chloroform was carefully collected using a pipette and transferred to another 120 ml vial. The solid was washed with and stored in DMF and labeled "purified ZIF-8".

In order to activate the ZIF-8, the purified solid was immersed in methanol (c.a. 100 ml) for a total of 72 hours. The solvent volume was replaced every 24 hours. This methanol-exchanged ZIF-8 was loaded in a glass tube and evacuated on a vacuum line apparatus. After the removal of external methanol solvent at room-temperature, the solid was heated under vacuum at 523 K for 16 hours to remove the solvent molecules residing in the pores of ZIF-8. 1.70 g of activated ZIF-8 was obtained, corresponding to 41% yield (based on 2-Methylimidazole).

For gas adsorption experiments, the methanol-exchanged ZIF-8 was loaded directly in the sample holder of the gravimetric gas adsorption unit and activated in-situ by using the conditions described in Example 10.

Figure 9:
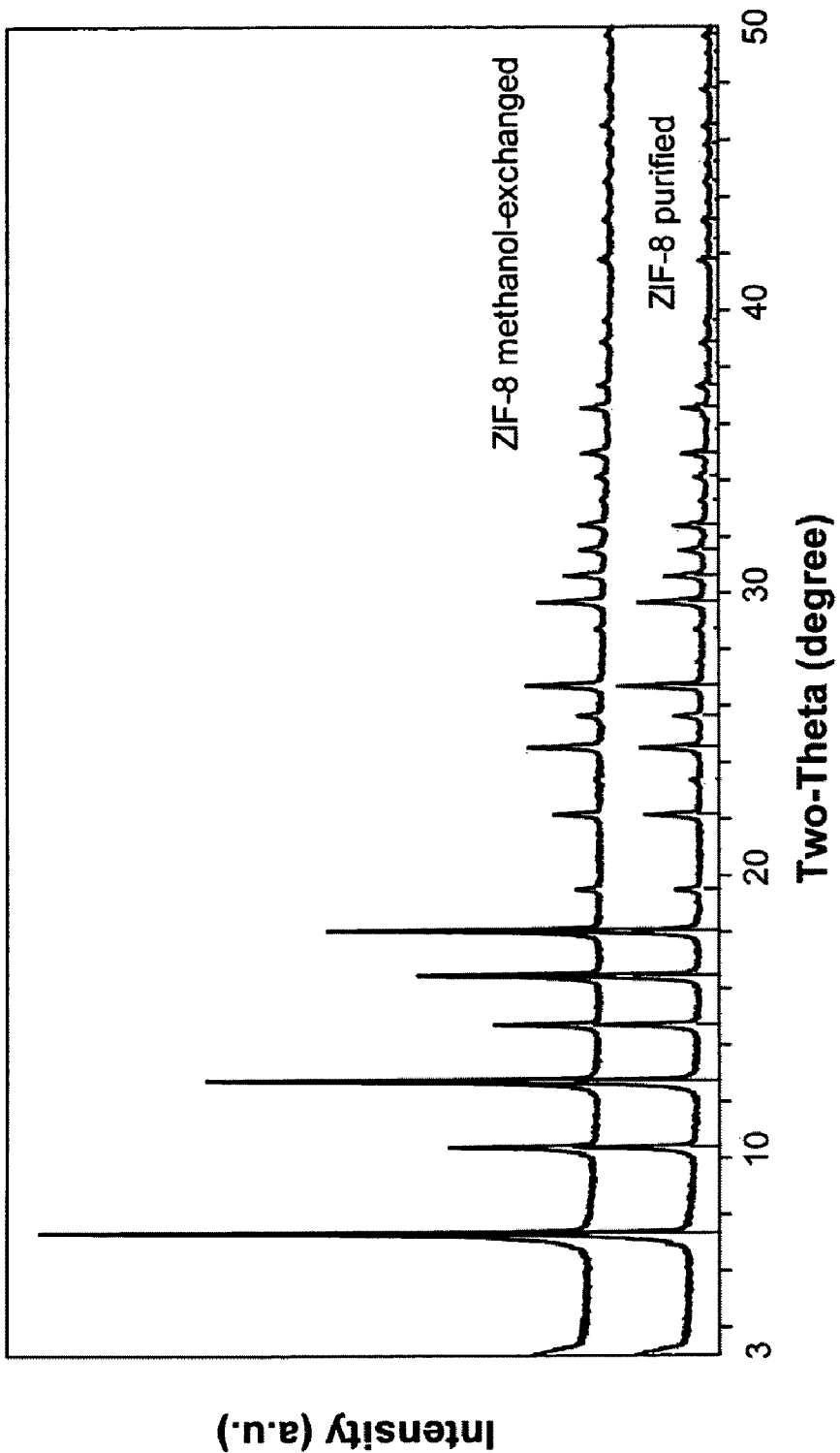
FIG. 9 is the experimental powder X-ray diffraction ("PXRD") patterns of the purified and methanol-exchanged ZIF-8 samples of Example 5 herein. The calculated PXRD pattern (shown as the vertical stick patterns in the figure) for ZIF-8 based on the single crystal structure of ZIF-8 reported in the "Park Reference" as referenced herein is also shown in the figure.

FIG. 9 shows a comparison of the experimental powder X-ray diffraction ("PXRD") patterns of the purified and the methanol-exchanged ZIF-8 samples and the calculated PXRD pattern (stick pattern) based on the single crystal structure of ZIF-8 reported in the "Park Reference" as referenced herein. The high purity of the sample is evidenced by the coincidence of experimental and calculated PXRD patterns. The PXRD patterns as shown in FIG. 9 are plotted as the diffraction intensity (in arbitrary units) against the diffraction angle two theta (in degrees).

Figure 10:
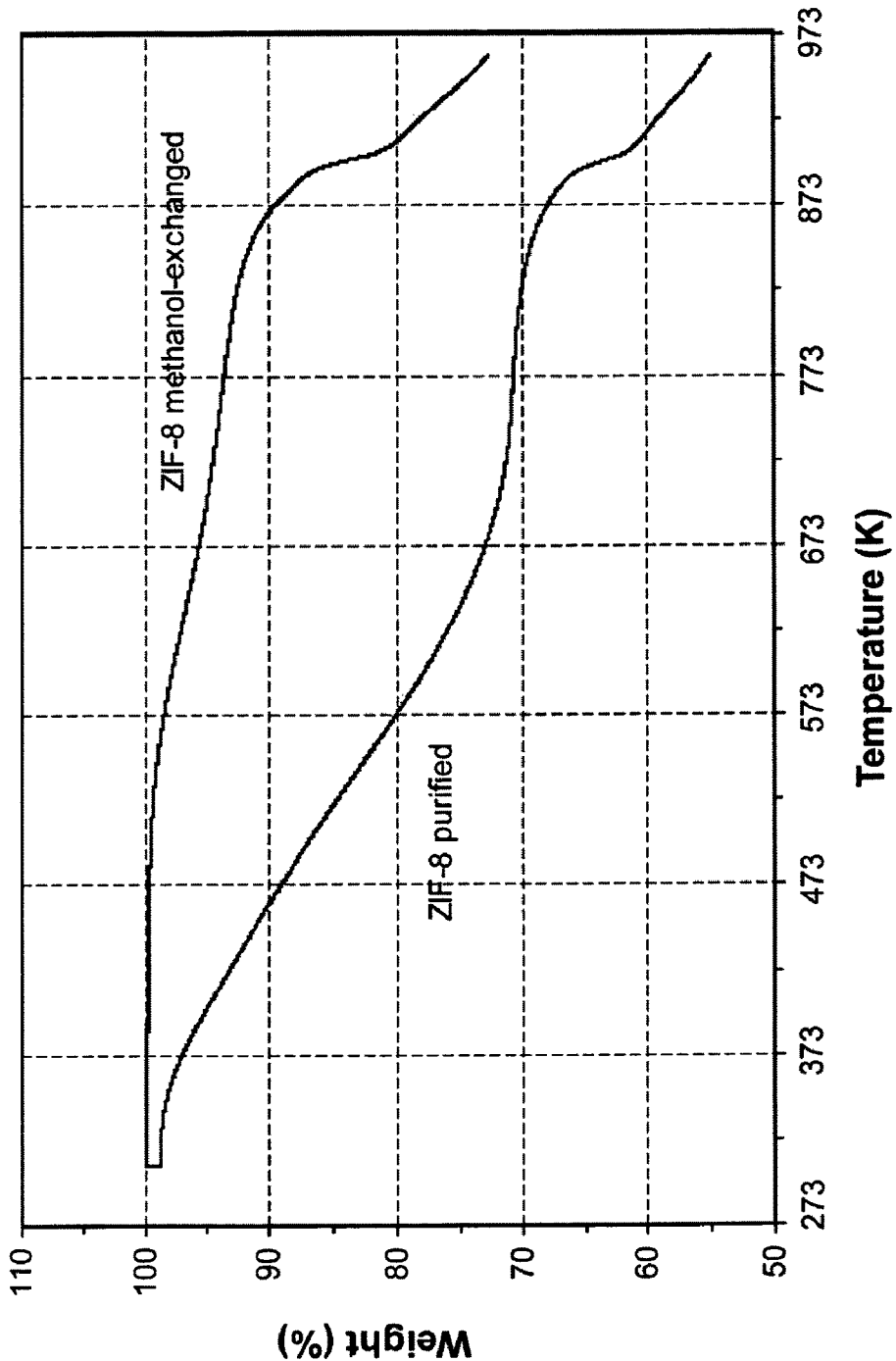
FIG. 10 shows the thermogravimetric analyses ("TGA"s) for the purified and methanol-exchanged ZIF-8 samples of Example 5 herein.

FIG. 10 shows the thermogravimetric analyses ("TGA") for the purified and the methanol-exchanged ZIF-8 samples in nitrogen atmosphere. The activation conditions described above were chosen based on TGA data.

Figure 27:
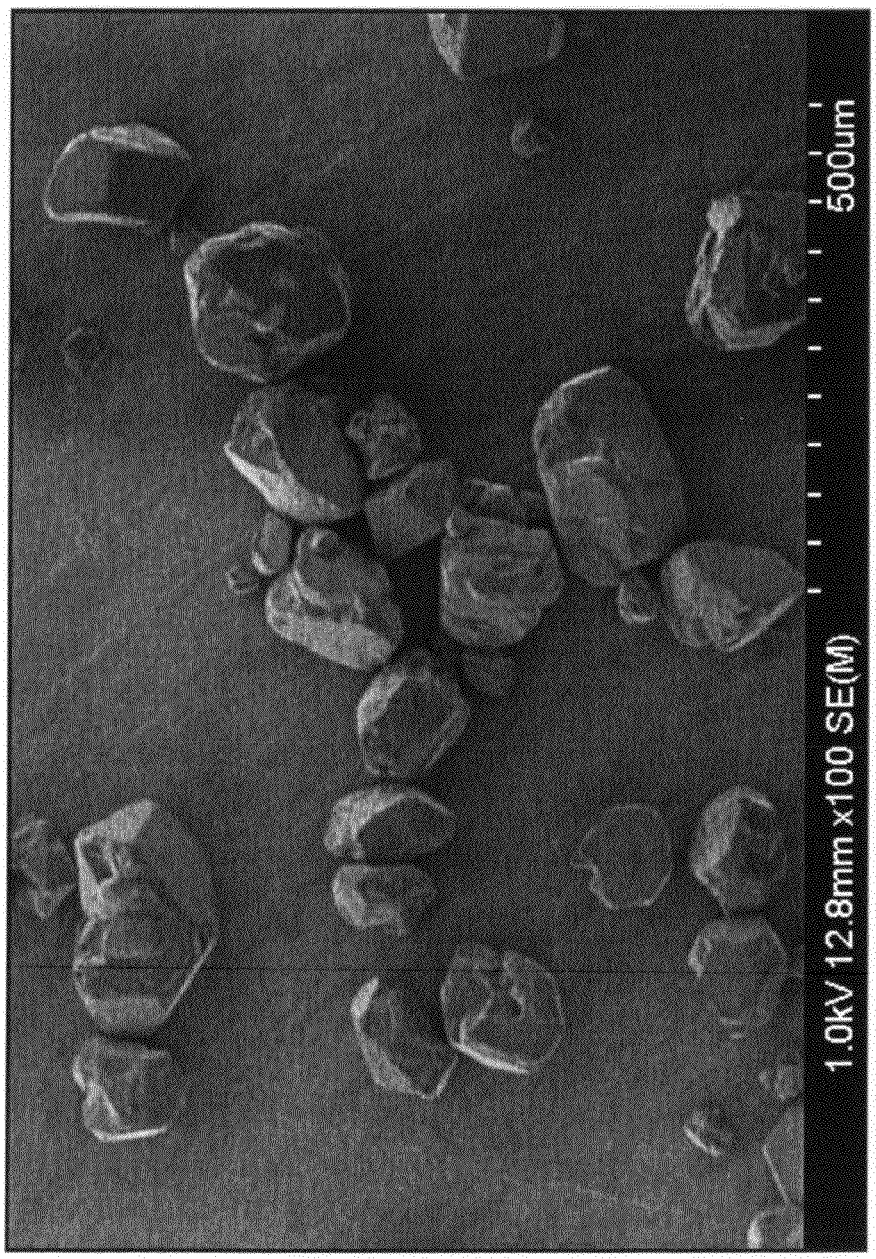
FIG. 27 is a Scanning Electron Microscopy ("SEM") image of a ZIF-8 sample of Example 10.

FIG. 27 is a Scanning Electron Microscopy ("SEM") image of a sample of ZIF-8 produced.

Examples 6-10

In Examples 6 through 10 herein, a Cahn® microbalance apparatus (TG121, 0.1 μg) was used to gravimetrically characterize the adsorption/desorption properties of gases and hydrocarbons (i.e., adsorbates) in various zeolitic imidazolate frameworks (i.e., adsorbents). Experiments were carried out on various adsorbate-adsorbent pairs to determine the adsorption isotherms for the various ZIF materials synthesized in Examples 1 through 5 above. At a constant temperature, the equilibrium adsorbate loading was measured at various adsorbate pressures up to 106.6 kPa. In order to capture any potential hysteretic behavior, for each isotherm half of the experimental points were measured in the adsorption mode (i.e., increasing the pressure from vacuum to the maximum pressure of 106.6 kPa) and the other half of the experimental points were measured in the desorption mode (i.e., decreasing the pressure from the maximum pressure of 106.6 kPa to vacuum). In all experiments, a LabVIEW® computer software was used to automatically set, control and monitor the sequence of steps followed in each experiment.

The adsorbate feed was brought into the feed manifold from lecture bottles or from house supply lines containing high purity gases and hydrocarbons. The feed manifold was in contact with the adsorbent located in the sample holder of the microbalance. The adsorbate pressure within the feed manifold was controlled between vacuum and 106.6 kPa by a MKS® Type 146 Measurement and Control System, which was connected to the computer via RS232 communications. The feed manifold was equipped with three MKS® 120A pressure transducers (0-0.0133 kPa, 0-1.33 kPa and 0-133 kPa) that provided the adsorbate pressure information to the controller. The controller actuated two electronic valves to adjust the adsorbate pressure within the feed manifold. One valve (MKS 0248A, Type 00100RK) was connected to the adsorbate feed supply and the other valve (MKS 0248A, Type 10000RV) was connected to the vacuum line. A Pfeiffer® TSU 261 turbomolecular pump was used to achieve the vacuum conditions.

Typically, prior to the adsorption isotherm measurements, about 15-90 mg of adsorbent was loaded in the microbalance at 301 K. In order to avoid the contacting of the adsorbent with ambient air, the adsorbent was fully immersed in an excess of a specified solvent (i.e., an amount well in excess of that required to fill its internal pore volume). The solvent was removed through the use of dynamic vacuum. In some cases, where the solvent was held more strongly within the interior of the adsorbate, heating was also used. Typically, the following steps (all under dynamic vacuum) were applied: (a) outgassing at 301 K for a prescribed duration, (b) heating to a prescribed temperature and kept there for a prescribed duration, (c) cooling to 301 K. Because the microbalance was tare just prior to loading the sample, the dry weight was directly obtained from the microbalance upon completion of the clean-up procedure. The type of solvent, the heating temperature as well as the duration of the steps was dependent on the particular ZIF material under study. For a given ZIF sample, the same clean-up steps were repeated each time a new successive experiment was conducted. Prior to removing the sample from the microbalance, the first and/or second adsorption experiments were repeated. These repeat experiments revealed excellent reproducibility, confirming the adequacy of the experimental adsorption isotherm procedures as well as the stability of the samples throughout the adsorption experiments. X-ray measurements of the removed samples further confirmed their integrity.

Example 6

In this example, adsorption isotherm experiments were carried out on ZIF-7 samples obtained from the synthesis detailed in Example 1 above in compliance with the general testing procedures for Examples 6-10 described above.

For the testing of each adsorbate in this experiment, a sample of ZIF-7 was loaded with acetonitrile as the solvent. It was out-gassed for 6 hrs at 301 K under dynamic vacuum. No further heating was applied. The dry weight was 46.68 mg. The same clean-up procedure was applied to ZIF-7 prior to all subsequent experiments with other adsorbates. A Scanning Electron Microscopy ("SEM") image of this sample is shown in FIG. 11. FIG. 12 shows the ethylene, $C_2H_4$, adsorption isotherm on ZIF-7 at 301 K. The ordinate displays the equilibrium adsorption loading in typical units of mmole/g. The lower abscissa displays the absolute $C_2H_4$ pressure in kPa. The upper abscissa displays the relative $C_2H_4$ pressure, where the normalizing pressure $P_0$ corresponds to the $C_2H_4$ saturation pressure at 301 K. The filled and open symbols identify the corresponding adsorption and desorption branches, respectively (the adsorption branch is shown with filled diamond legend and the desorption branch is shown with open diamond legend).

In accordance with the testing procedures, adsorption isotherms for $CH_4$ (methane), $C_2H_6$ (ethane), and $C_3H_6$ (propylene) were also generated and are shown together in FIG. 13 with the adsorption/desorption isotherm for $C_2H_4$ (ethylene) from FIG. 12 above. In the testing regime of this example, methane did not exhibit the separate adsorption and desorption branches as was exhibited for the $C_{2+}$ hydrocarbons and therefore, the adsorption and desorption curves for methane in this regime overlap for ZIF-7. As can be seen from FIG. 13, at the upper test pressure of 106.6 kPa @301 K, the adsorption loadings for ethylene, ethane and propylene were all significantly larger than the adsorption loading for methane, $CH_4$, on the ZIF-7 material.

FIG. 14 is a bar graph comparing the corresponding adsorption loadings of the ZIF-7 material for $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at test conditions of 301 K and 106.6 kPa obtained from the tests as described above. As can be seen from this bar graph, the adsorption loadings of the ZIF-7 material for the $C_{2+}$ hydrocarbon compounds at 106.6 kPa @301 K were all greater than approximately 2.60 mmole/g while the adsorption loading for $CH_4$ was only approximately 0.09 mmole/g. At these conditions, the adsorptive loading ratio for the $C_{2+}$ hydrocarbon compounds over $CH_4$ are greater than approximately 28.9, illustrating the high selectivity of the ZIF-7 material for the $C_{2+}$ hydrocarbon compounds over $CH_4$, making ZIF-7 a suitable material for use in the present invention.

Additional isotherms for ZIF-7 were performed at different temperatures to investigate the adsorption/desorption characteristics of ZIF-7 at higher temperatures. The adsorption isotherms of ZIF-7 for normal butane, $C_4H_{10}$, performed at 301 K, 323 K, and 348 K are shown in FIG. 15. As can be seen in FIG. 15, consistent with adsorption-based principles, as the temperature is increased from 301 K to 323 K and further to 348 K, the transition from low to high $C_4H_{10}$ loading is displaced to higher pressures. This figure shows that comparable adsorption loadings of $C_4H_{10}$ on ZIF-7 occur at a correspondingly increased partial pressure.

Example 7

In this example, adsorption isotherm experiments were carried out on ZIF-9 samples obtained from the synthesis detailed in Example 2 above in compliance with the general testing procedures for Examples 6-10 described above.

For the testing of each adsorbate in this experiment, a sample of ZIF-9 was loaded with acetonitrile as the solvent. It was out-gassed for 6 hrs at 301 K under dynamic vacuum. No further heating was applied. The dry weight was 56.35 mg. The same clean-up procedure was applied to ZIF-9 prior to all subsequent experiments with other adsorbates. A Scanning Electron Microscopy ("SEM") image of this sample is shown in FIG. 16. FIG. 17 shows the ethylene, $C_2H_4$, adsorption isotherm on ZIF-9 at 301 K. The ordinate displays the equilibrium adsorption loading in typical units of mmole/g. The lower abscissa displays the absolute $C_2H_4$ pressure in kPa. The upper abscissa displays the relative $C_2H_4$ pressure, where the normalizing pressure $P_0$ corresponds to the $C_2H_4$ saturation pressure at 301 K. The filled and open symbols identify the corresponding adsorption and desorption branches, respectively (the adsorption branch is shown with filled diamond legend and the desorption branch is shown with open diamond legend).

In accordance with the testing procedures, adsorption isotherms for $CH_4$ (methane), $C_2H_6$ (ethane), and $C_3H_6$ (propylene) were also generated and are shown together in FIG. 18 with the adsorption/desorption isotherm for $C_2H_4$ (ethylene) from FIG. 17 above. In the testing regime of this example, methane did not exhibit the separate adsorption and desorption branches as was exhibited for the $C_{2+}$ hydrocarbons and therefore, the adsorption and desorption curves for methane in this regime overlap for ZIF-9. As can be seen from FIG. 18, at the upper test pressure of 106.6 kPa @301 K, the adsorption loadings for ethylene, ethane and propylene were all significantly larger than the adsorption loading for methane, $CH_4$, on the ZIF-9 material.

Figure 19:
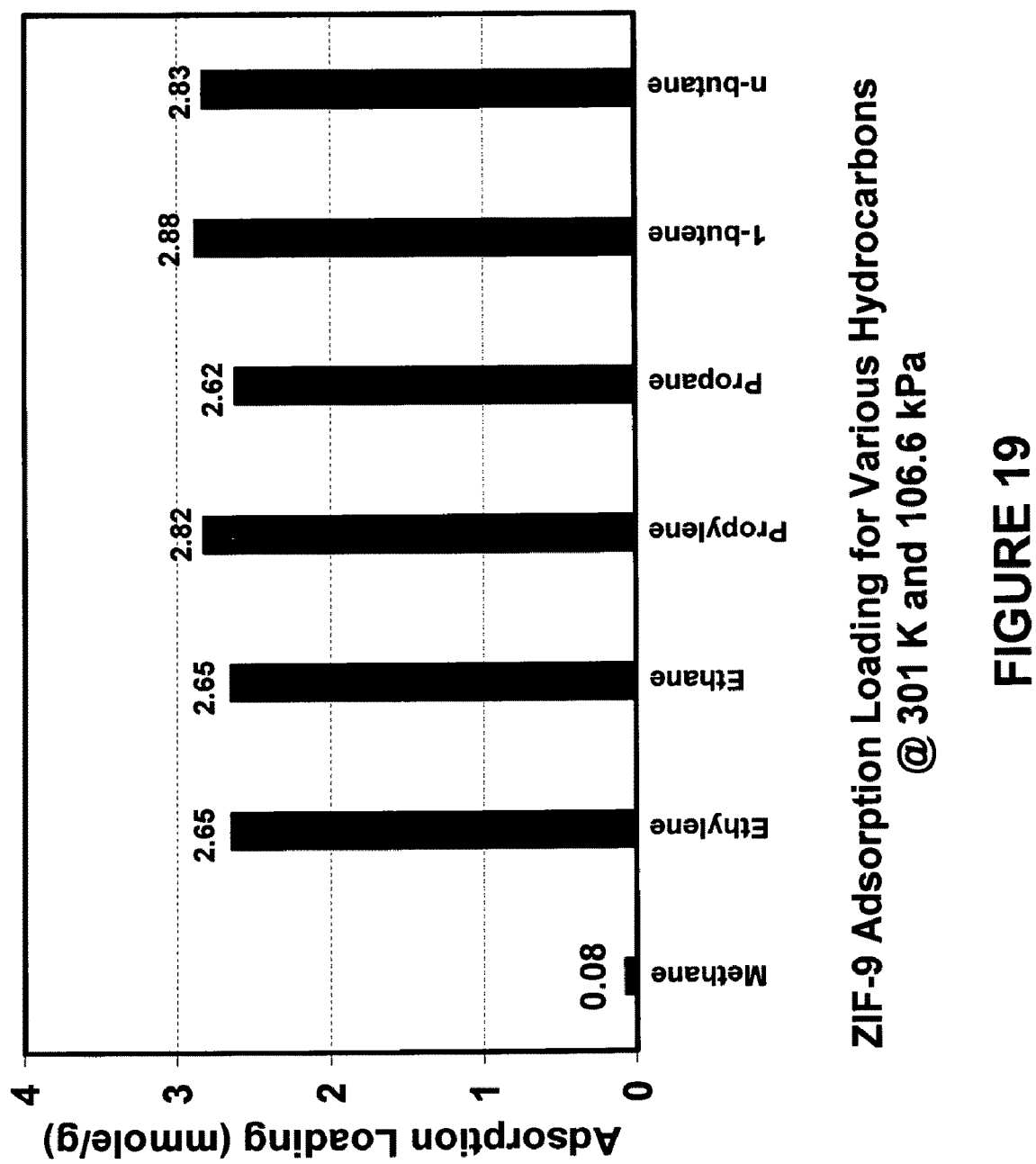
FIG. 19 is a bar graph comparing the adsorption loadings of a ZIF-9 sample of Example 7 for $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at 301 K and 106.6 kPa.

FIG. 19 is a bar graph comparing the corresponding adsorption loadings of the ZIF-9 material for $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at test conditions of 301 K and 106.6 kPa obtained from the tests above. As can be seen from this bar graph, the adsorption loading of the ZIF-9 material for the $C_{2+}$ hydrocarbon compounds at 106.6 kPa @301 K were all greater than approximately 2.62 mmole/g while the adsorption loading for $CH_4$ was only approximately 0.08 mmole/g. At these conditions, the adsorptive loading ratio for the $C_{2+}$ hydrocarbon compounds over $CH_4$ is approximately 32.8 (similar to ZIF-7), illustrating the high selectivity of the ZIF-9 material for $C_{2+}$ hydrocarbon compounds over $CH_4$, making ZIF-9 a suitable material for use in the present invention.

Example 8

In this example, adsorption isotherm experiments were carried out on ZIF-1 samples obtained from the synthesis detailed in Example 3 above in compliance with the general testing procedures for Examples 6-10 described above.

For the testing of the acetonitrile-exchanged ZIF-1 sample, a portion of the ZIF-1 sample produced and activated as in Example 3 was loaded with acetonitrile as the solvent. It was out-gassed for 6 hrs at 301 K under dynamic vacuum. No further heating was applied. The dry weight was 69.64 mg. The same clean-up procedure was applied to the acetonitrile-exchanged ZIF-1 prior to all subsequent experiments with other adsorbates. A Scanning Electron Microscopy ("SEM") image of the acetonitrile-exchanged ZIF-1 sample is shown in FIG. 20.

For the testing of the toluene-exchanged ZIF-1 sample, a portion of the ZIF-1 sample produced and activated as in Example 3 was loaded with toluene as the solvent. It was out-gassed for 6 hrs at 301 K under dynamic vacuum, heated to 443 K for 2 hrs and then cooled to 301 K. The dry weight was 46.21 mg. The same clean-up procedure was applied to the toluene-exchanged ZIF-1 prior to all subsequent experiments with other adsorbates. A Scanning Electron Microscopy ("SEM") image of toluene-exchanged ZIF-1 sample is shown in FIG. 21.

Figure 22:
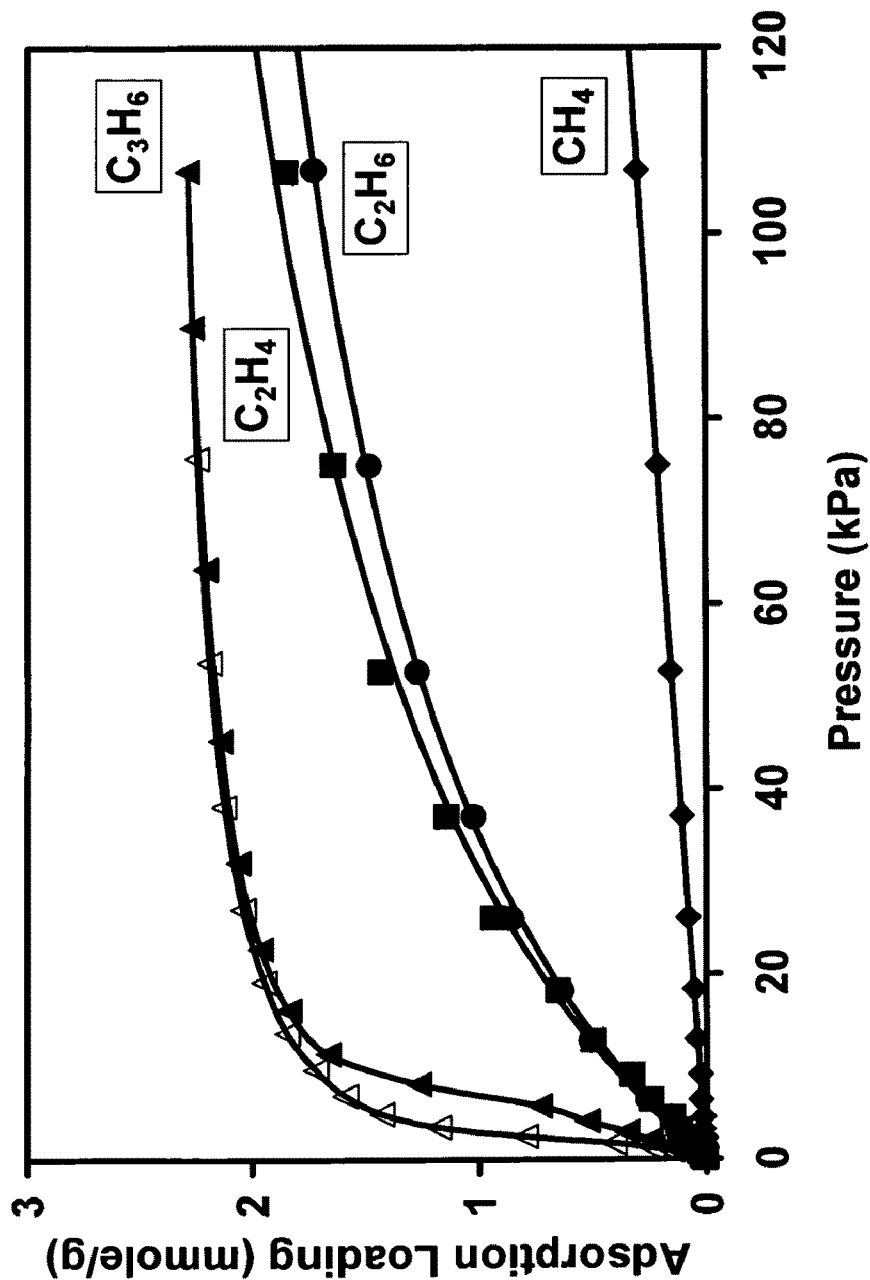
FIG. 22 shows the $CH_4$ (methane) adsorption isotherm and the $C_2H_4$ (ethylene), $C_2H_6$ (ethane), and $C_3H_6$ (propylene) adsorption isotherms at 301 K for a ZIF-1 (acetonitrile-exchanged) sample of Example 8.

FIG. 22 shows the adsorption isotherms of the acetonitrile-exchanged ZIF-1 for $CH_4$ (methane), $C_2H_4$ (ethylene), $C_2H_6$ (ethane), and $C_3H_6$ (propylene) at 301 K. The ordinate displays the equilibrium adsorption loading in typical units of mmole/g. The abscissa displays the absolute pressure of the adsorbate in kPa. As can be seen from FIG. 22, at the upper test pressure of 106.6 kPa @301 K, the adsorption loadings for the $C_{2+}$ hydrocarbon compounds were higher than the adsorption loading for methane, $CH_4$, on the acetonitrile-exchanged ZIF-1 material.

Figure 23:
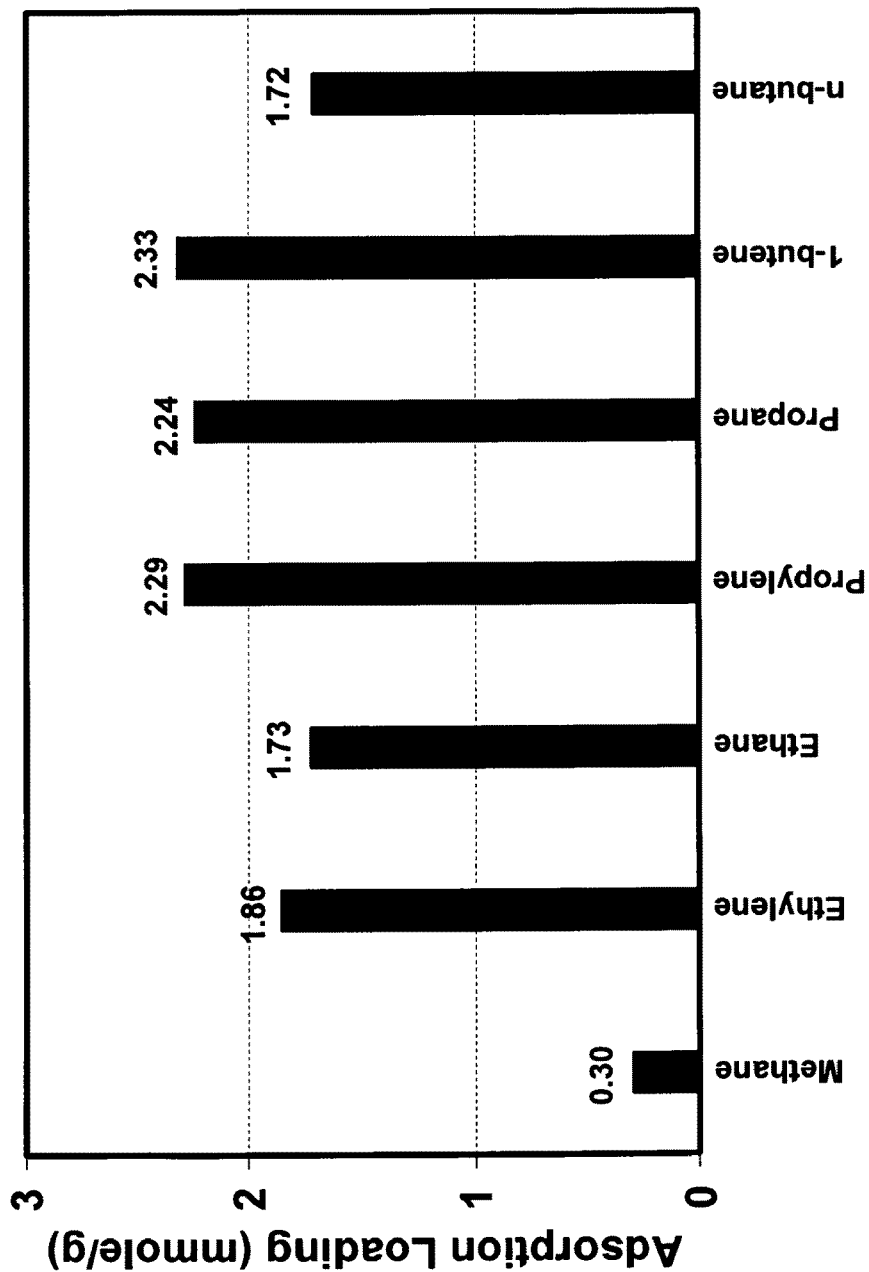
FIG. 23 is a bar graph comparing the adsorption loadings of a ZIF-1 (acetonitrile-exchanged) sample of Example 8 for $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at 301 K and 106.6 kPa.

FIG. 23 is a bar graph comparing the corresponding adsorption loadings of the acetonitrile-exchanged ZIF-1 material for $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at test conditions of 301 K and 106.6 kPa obtained from the tests above. As can be seen from this bar graph, the adsorption loadings of the acetonitrile-exchanged ZIF-1 material for the $C_{2+}$ hydrocarbon compounds at 106.6 kPa @301 K were all greater than approximately 1.72 mmole/g while the adsorption loading for $CH_4$ was only approximately 0.30 mmole/g. At these conditions, the adsorptive loading ratio for the $C_{2+}$ hydrocarbon compounds over $CH_4$ was approximately 5.7. This example illustrates that the acetonitrile-exchanged ZIF-1 possesses an adsorptive loading ratio high enough to meet the requirements of the present invention.

It should be noted that, although not shown, the toluene-exchanged ZIF-1 material exhibits similar adsorption loading characteristics as the acetonitrile-exchanged ZIF-1 material.

Example 9

In this example, adsorption isotherm experiments were carried out on ZIF-11 samples obtained from the synthesis detailed in Example 4 above in compliance with the general testing procedures for Examples 6-10 described above.

Figure 25:
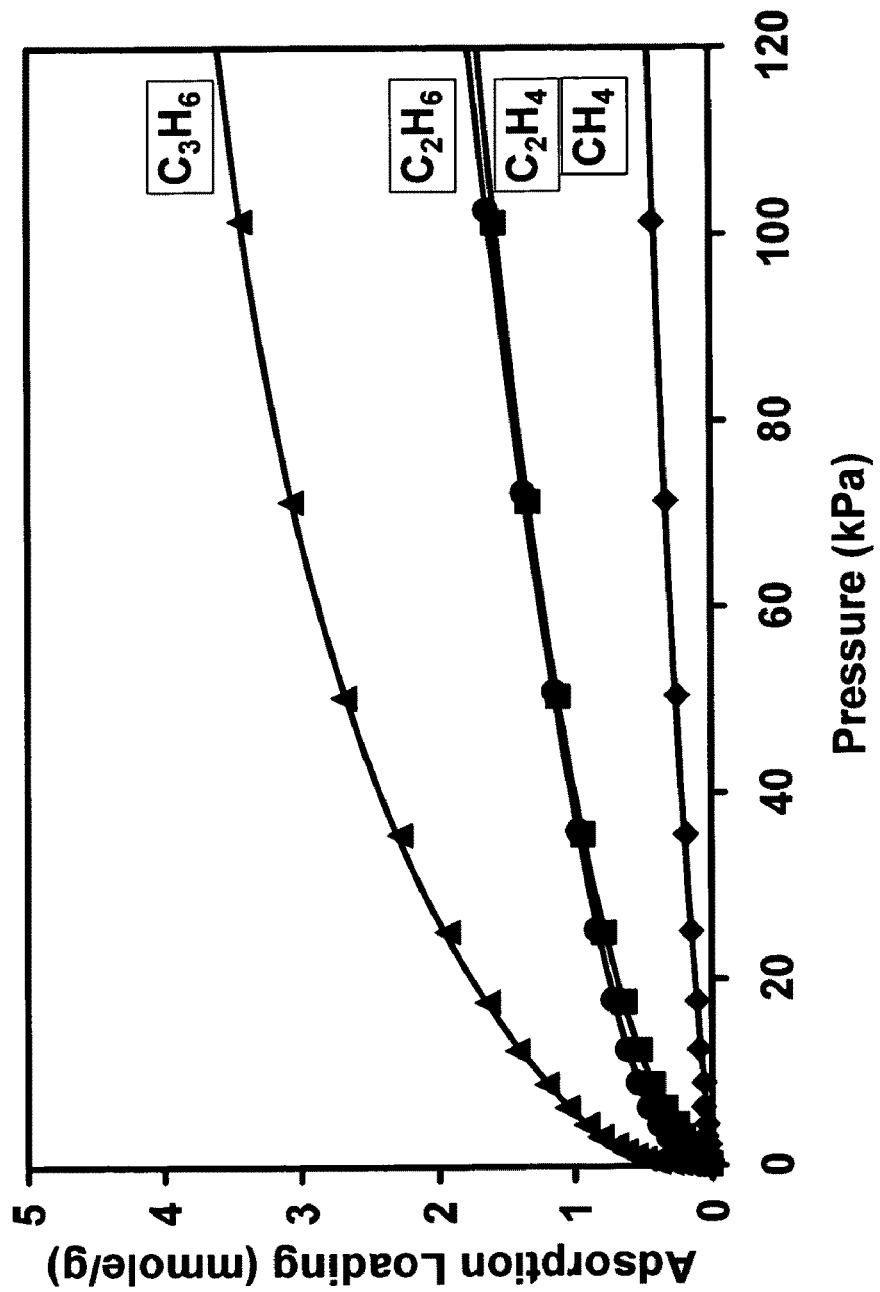
FIG. 25 shows the $CH_4$ (methane) adsorption isotherm and the $C_2H_4$ (ethylene), $C_2H_6$ (ethane), and $C_3H_6$ (propylene) adsorption isotherms at 301 K for a ZIF-11 sample of Example 9.

For the testing of each adsorbate in this experiment, a sample of ZIF-11 was loaded with methanol as the solvent. It was out-gassed for 2 hrs at 301 K under dynamic vacuum, heated to 423 K for 3 hrs, and then cooled to 301 K. The dry weight was 82.07 mg. The same clean-up procedure was applied to ZIF-11 prior to all subsequent experiments with other adsorbates. A Scanning Electron Microscopy ("SEM") image of this sample is shown in FIG. 24. FIG. 25 shows the adsorption isotherms of ZIF-11 for $CH_4$ (methane), $C_2H_4$ (ethylene), $C_2H_6$ (ethane), and $C_3H_6$ (propylene) at 301 K. The ordinate displays the equilibrium adsorption loading in typical units of mmole/g. The abscissa displays the absolute pressure of the adsorbate in kPa. As can be seen from FIG. 25, at the upper test pressure of 106.6 kPa @301 K, the adsorption loading for the $C_{2+}$ hydrocarbon compounds were higher than the adsorption loading for methane, $CH_4$, on the ZIF-11 material.

Figure 26:
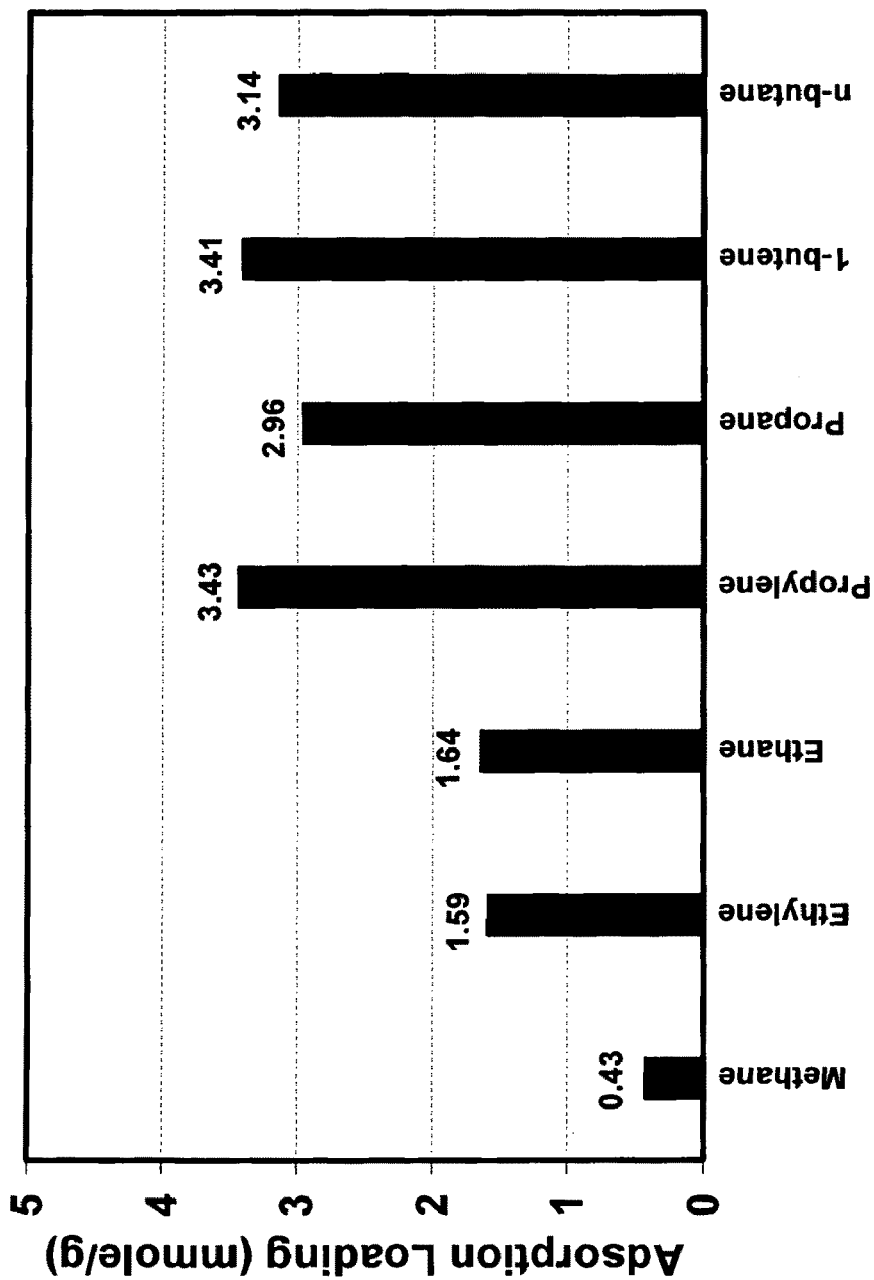
FIG. 26 is a bar graph comparing the adsorption loadings of a ZIF-11 sample of Example 9 for $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at 301 K and 106.6 kPa.

FIG. 26 is a bar graph comparing the corresponding adsorption loadings of the ZIF-11 material for $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at test conditions of 301 K and 106.6 kPa obtained from the tests above. As can be seen from this bar graph, the adsorption loadings of the ZIF-11 material for the $C_{2+}$ hydrocarbon compounds at 106.6 kPa @301 K were all greater than approximately 1.59 mmole/g while the adsorption loading for $CH_4$ was only approximately 0.43 mmole/g. However, at these conditions, the adsorptive loading ratio for the $C_{2+}$ hydrocarbon compounds over $CH_4$ was only approximately 3.7. However, for the $C_{3+}$ adsorbate compounds (propylene and higher), the adsorptive loading ratio for the $C_{3+}$ hydrocarbon compounds over $CH_4$ was at least approximately 6.9. This example illustrates that ZIF-11 possesses an adsorptive loading ratio high enough to meet the requirements of the present invention for $C_{3+}$ hydrocarbon compounds at atmospheric conditions.

Example 10

In this example, adsorption isotherm experiments were carried out on ZIF-8 samples obtained from the synthesis detailed in Example 5 above in compliance with the general testing procedures for Examples 6-10 described above.

Figure 28:
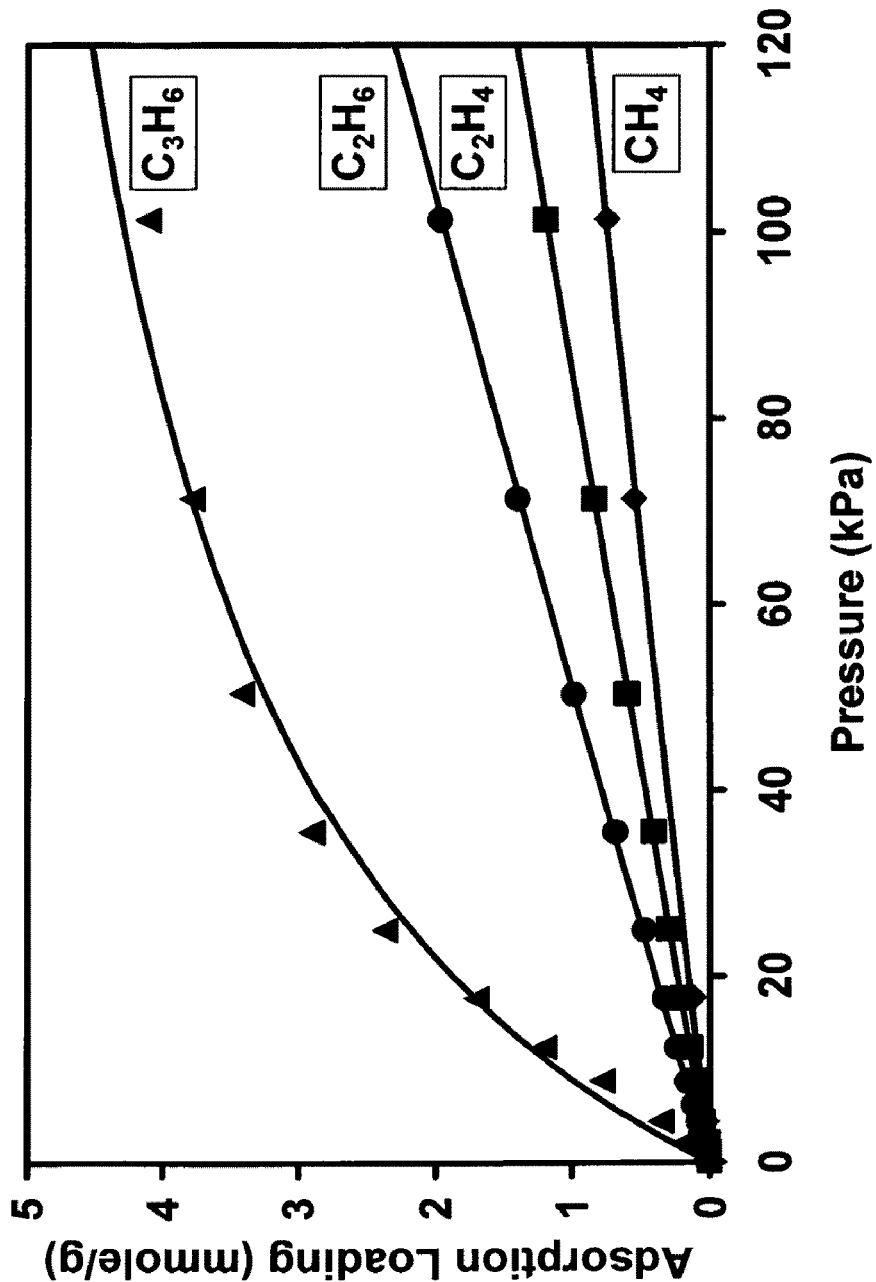
FIG. 28 shows the $CH_4$ (methane) adsorption isotherm and the $C_2H_4$ (ethylene), $C_2H_6$ (ethane), and $C_3H_6$ (propylene) adsorption isotherms at 301 K for a ZIF-8 sample of Example 10.

For the testing of each adsorbate in this experiment, a sample of ZIF-8 was loaded with methanol as the solvent. It was out-gassed for 2 hrs at 301 K under dynamic vacuum, heated to 523 K for 3 hrs, and then cooled to 301 K. The dry weight was 16.37 mg. The same clean-up procedure was applied to ZIF-8 prior to all subsequent experiments with other adsorbates. A Scanning Electron Microscopy ("SEM") image of this sample is shown in FIG. 27. FIG. 28 shows the adsorption isotherms of ZIF-8 for $CH_4$ (methane), $C_2H_4$ (ethylene), $C_2H_6$ (ethane), and $C_3H_6$ (propylene) at 301 K. The ordinate displays the equilibrium adsorption loading in typical units of mmole/g. The abscissa displays the absolute pressure of the adsorbate in kPa. As can be seen from FIG. 28, at the upper test pressure of 106.6 kPa @301 K, the adsorption loading for $C_{2+}$ hydrocarbon compounds were higher than the adsorption loading for methane, $CH_4$, on the ZIF-8 material.

Figure 29:
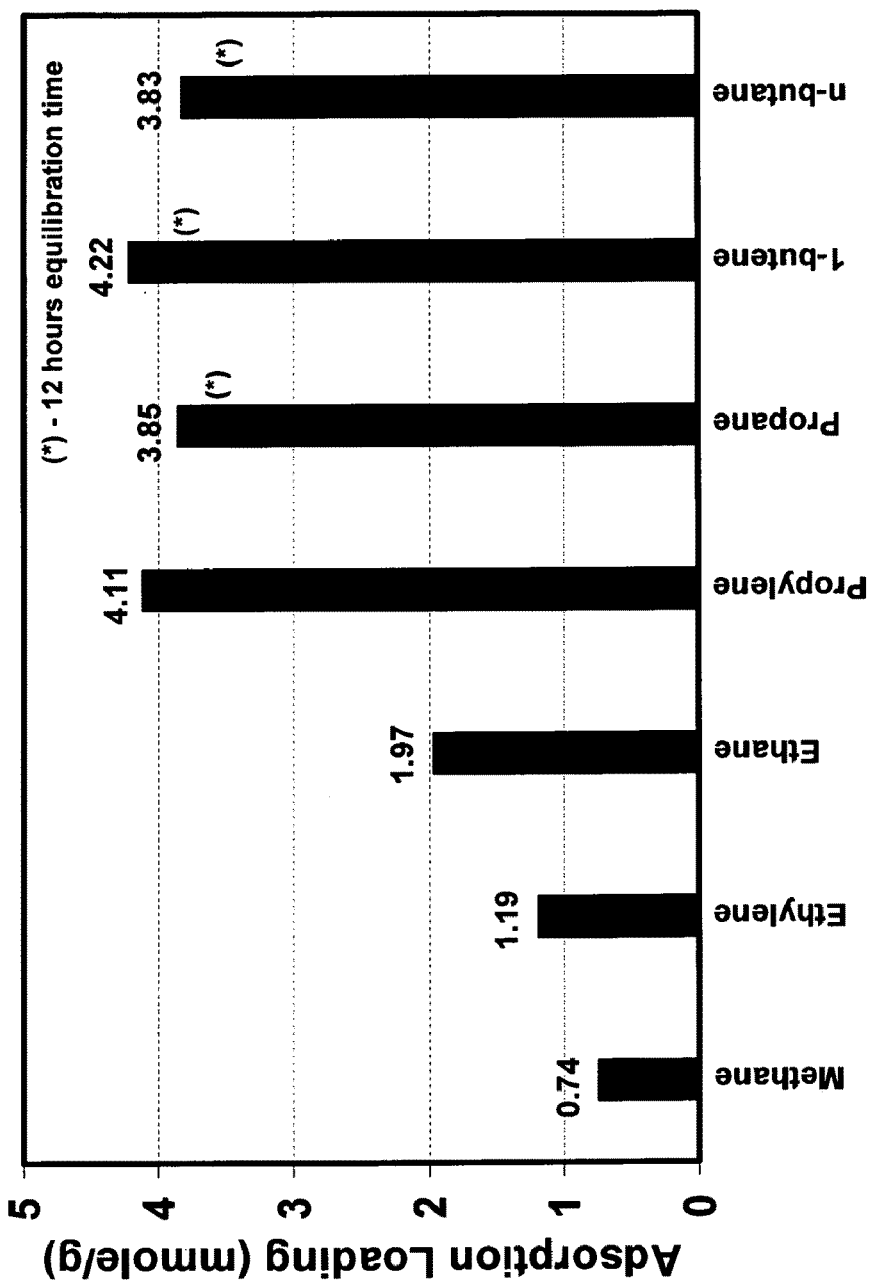
FIG. 29 is a bar graph comparing the adsorption loadings of a ZIF-8 sample of Example 10 for $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at 301 K and 106.6 kPa.

FIG. 29 is a bar graph comparing the corresponding adsorption loadings of the ZIF-8 material for $CH_4$ (methane), $C_2H_4$ (ethylene), $C_2H_6$ (ethane), $C_3H_6$ (propylene), $C_3H_8$ (propane), $C_4H_8$ (1-butene), and $C_4H_{10}$ (n-butane) at test conditions of 301 K and 106.6 kPa obtained from the tests above. As can be seen from this bar graph, the adsorption loadings of the ZIF-8 material for the $C_{2+}$ hydrocarbon compounds at 106.6 kPa @301 K were all greater than approximately 1.19 mmole/g while the adsorption loading for $CH_4$ was only approximately 0.74 mmole/g. However, at these conditions, the adsorptive loading ratio for the $C_{2+}$ hydrocarbon compounds over $CH_4$ was only approximately 1.6. However, for the $C_{3+}$ adsorbate compounds (propylene and higher), the adsorptive loading ratio for the $C_{3+}$ hydrocarbon compounds over $CH_4$ was at least approximately 5.2. This example illustrates that ZIF-8 possesses an adsorptive loading ratio high enough to meet the requirements of the present invention for $C_{3+}$ hydrocarbon compounds at atmospheric conditions.

What is claimed is:

1. A process for separating $CH_4$ from a process feedstream, comprising:
   a) contacting an adsorbent material comprised of a zeolitic imidazolate framework material with a process feedstream comprising $CH_4$ and at least one $C_{2+}$ hydrocarbon compound at a first pressure and first temperature;
   b) adsorbing at least a portion of the $C_{2+}$ hydrocarbon compound in the adsorbent material, thereby producing a $CH_4$-rich product stream, wherein the $CH_4$-rich product stream has a higher concentration of $CH_4$ by mol % than the process feedstream; and
   c) producing a $CH_4$-lean product stream at a second pressure and second temperature, wherein the $CH_4$-lean product stream has a lower concentration of $CH_4$ by mol % than the process feedstream;
   wherein the zeolitic imidazolate framework material has a framework structure wherein each vertex of the framework structure is comprised of a single metal ion and each pair of connected adjacent vertices of the framework structure is linked by nitrogen atoms of an imidazolate anion or its derivative, and wherein the zeolitic imidazolate framework material has an adsorptive loading ratio measured at 301 K and 106.6 kPa for the $C_{2+}$ hydrocarbon compound over $CH_4$ of at least 5.

2. The process of claim 1, wherein the adsorbent material is further comprised of a binder material selected from the group consisting of a crystalline polymer, a non-crystalline polymer, an epoxy, a thermoplastic, a clay, a silica-containing material, an alumina-containing material, and a titania-containing material.

3. The process of claim 1, wherein the zeolitic imidazolate framework material is selected from the group consisting of ZIF-7, ZIF-9, and ZIF-1.

4. The process of claim 3, wherein the $CH_4$-rich product stream contains at least 70 mol % of the $CH_4$ present in the process feedstream.

5. The process of claim 4, wherein the $C_{2+}$ hydrocarbon compound partial pressure in step a) is greater than the $C_{2+}$ hydrocarbon compound partial pressure in step d).

6. The process of claim 5, wherein the first pressure is greater than the second pressure.

7. The process of claim 5, wherein the second temperature is greater than the first temperature.

8. The process of claim 5, wherein the process is a swing adsorption process, wherein the overall swing adsorption cycle time is less than about 1 minute.

9. The process of claim 5, wherein the process is a swing adsorption process and the difference between maximum and minimum $C_{2+}$ hydrocarbon compound partial pressures achieved in the adsorbent bed during a cycle is less than 43.5 psia (300 kPaa).

10. The process of claim 5, wherein the $C_{2+}$ hydrocarbon compound has a partial pressure in the process feedstream in step a) of less than about 29 psia (200 kPaa).

11. The process of claim 1, wherein the process feedstream is comprised of a natural gas.

12. The process of claim 11, wherein at least a portion of the $CH_4$-rich product stream is utilized to make a final natural gas product.

13. The process of claim 11, wherein the first pressure is at least 500 psig.

14. The process of claim 11, wherein the zeolitic imidazolate framework material is selected from the group consisting of ZIF-7, ZIF-9, and ZIF-1.

15. The process of claim 14, wherein the $CH_4$-rich product stream contains at least 70 mol % of the $CH_4$ present in the process feedstream.

16. The process of claim 1, wherein the $C_{2+}$ hydrocarbon compound is selected from the group consisting of $C_2H_4$ (ethylene), $C_2H_6$ (ethane), $C_3H_6$ (propylene), $C_3H_8$ (propane), $C_4H_8$ (1-butene), and $C_4H_{10}$ (n-butane).

17. The process of claim 16, wherein the zeolitic imidazolate framework material is selected from the group consisting of ZIF-7, ZIF-9, and ZIF-1.

18. The process of claim 1, wherein the process feedstream is comprised of ethylene, $C_2H_4$ and methane, $CH_4$; and the $C_{2+}$ hydrocarbon compound is ethylene, $C_2H_4$.

19. The process of claim 1, wherein the process feedstream is comprised of propylene, $C_3H_6$ and methane, $CH_4$; and the $C_{2+}$ hydrocarbon compound is propylene, $C_3H_6$.

20. The process of claim 1, wherein the process feedstream is comprised of a Light Plant Gas feedstream, and the $C_{2+}$ hydrocarbon compound is selected from the group consisting of $C_2H_4$ (ethylene), $C_2H_6$ (ethane), $C_3H_6$ (propylene), and $C_3H_8$ (propane).

21. The process of claim 20, wherein the $C_{2+}$ hydrocarbon compound partial pressure of the process feedstream in step a) is less than about 29 psia (200 kPaa).

22. The process of claim 20, wherein the process feedstream is at a pressure of less than 100 psia.

* * * * *